(12) United States Patent
Takagi

(10) Patent No.: US 7,386,179 B2
(45) Date of Patent: *Jun. 10, 2008

(54) ENCODING APPARATUS AND METHOD, AND DECODING APPARATUS, METHOD AND PROGRAM

(75) Inventor: Satoshi Takagi, Tokyo (JP)

(73) Assignee: Sony Corporation, Tokyo (JP)

( * ) Notice: Subject to any disclaimer, the term of this patent is extended or adjusted under 35 U.S.C. 154(b) by 757 days.

This patent is subject to a terminal disclaimer.

(21) Appl. No.: 10/962,124

(22) Filed: Oct. 8, 2004

(65) Prior Publication Data

US 2005/0094881 A1 May 5, 2005

(30) Foreign Application Priority Data

Oct. 10, 2003 (JP) ............................ P2003-352798

(51) Int. Cl.
*G06K 9/36* (2006.01)
(52) U.S. Cl. ..................................... 382/232
(58) Field of Classification Search ........ 382/232–236, 382/238–250; 358/426.01–426.08, 426.11–426.16; 348/384.1, 419.1–421.1; 375/240, 240.14–240.15, 375/240.24–204.26
See application file for complete search history.

(56) References Cited

U.S. PATENT DOCUMENTS

2005/0001928 A1  1/2005  Takagi

FOREIGN PATENT DOCUMENTS

JP  2002-159009  5/2002

*Primary Examiner*—Jose L. Couso
(74) *Attorney, Agent, or Firm*—Bell, Boyd & Lloyd LLP

(57) ABSTRACT

An encoding apparatus and an encoding method, a decoding apparatus, a decoding method and a decoding program capable of speeding up the encoding or decoding process is provided. The present invention provides with a plurality of pixels corresponding to a processing unit of image information as one word, storing state quantity information to be used while being sequentially updated according to a processing status of an encoding process for the image information in a storage device, and with a predetermined plurality of pixels as the processing unit, performing the encoding process to the image information for each of the processing units by reading the state quantity information corresponding thereto from the storage device in the units of the word and using the read information. The present invention further provides with a plurality of pixels corresponding to a processing unit of encoded image information as one word, storing the state quantity information representing a predetermined state quantity to be used while being sequentially updated according to the processing status of a decoding process for the encoded image information in the storage device, and with a predetermined plurality of pixels as the processing unit, performing the decoding process to the encoded image information for each of the processing units by reading the state quantity information corresponding thereto from the storage device in the units of the word and using the read information.

18 Claims, 39 Drawing Sheets

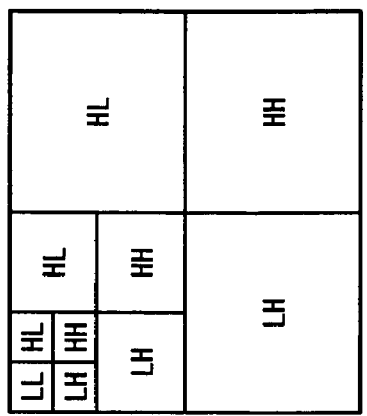
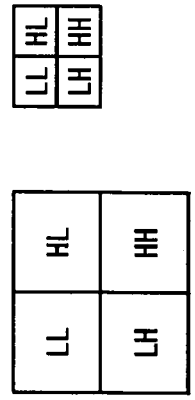
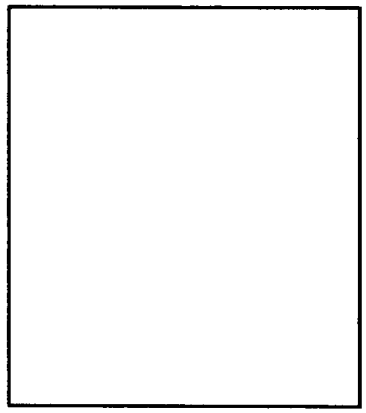
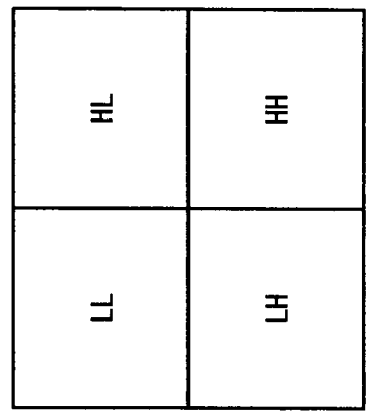
FIG. 2 A (Related Art)
FIG. 2 B (Related Art)

- $X_C$, $Y_C$ ARE THE POWER OF TWO.
- $4 \leq X_C \leq 1024$, $4 \leq Y_C \leq 1024$
- $X_C \times Y_C \leq 4096$

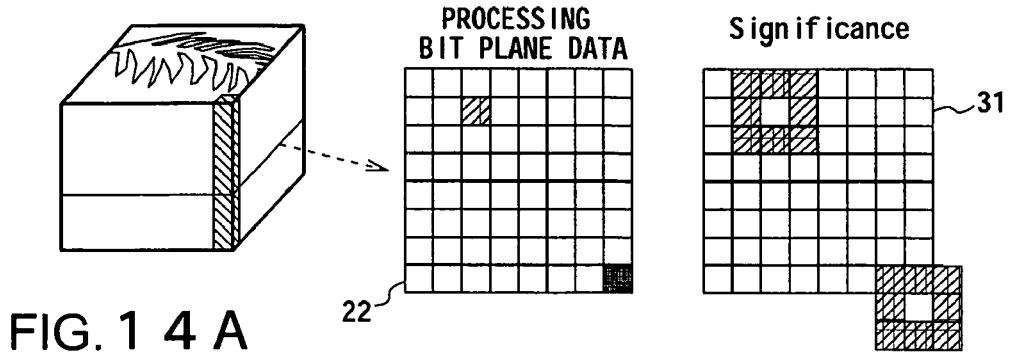
FIG. 14A  FIG. 14B  FIG. 14C
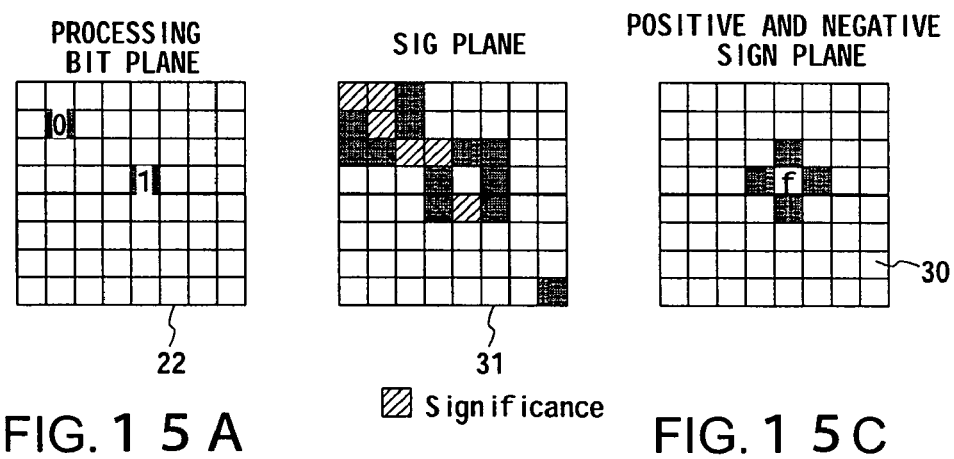
FIG. 15A  FIG. 15B  FIG. 15C
| CONDITION | Context | Symbol |
|---|---|---|
| ITSELF IS INSIGNIFICANT, AND SIGNIFICANT EXISTS IN THE PROXIMITY. DATA IS 0. | Cx | 0 |
| ITSELF IS INSIGNIFICANT, AND SIGNIFICANT EXISTS IN THE PROXIMITY. DATA IS 1. | Cx | 1 |
| IT CHANGES TO SIGNIFICANT DUE TO THE DATA OF 1, AND THEN A SYMBOL IS RENDERED AS A BIT MODEL | Sign cx | f |
FIG. 15D

| LL OR LH COMPONENT | | | HL COMPONENT | | | HH COMPONENT | | CX | BIT |
|---|---|---|---|---|---|---|---|---|---|
| ΣH | ΣV | ΣD | ΣH | ΣV | ΣD | ΣH+ΣV | ΣD | | |
| 2 | - | - | - | 2 | - | - | >=3 | 8 | |
| 1 | >=1 | 1 | >=1 | 1 | - | >=1 | 2 | 7 | |
| 1 | 0 | >=1 | 0 | 1 | >=1 | 0 | 2 | 6 | |
| 1 | 0 | 0 | 0 | 1 | 0 | >=2 | 1 | 5 | |
| 0 | 2 | - | 2 | 0 | - | 1 | 1 | 4 | X |
| 0 | 1 | - | 1 | 0 | - | 0 | 1 | 3 | |
| 0 | 0 | >=2 | 0 | 0 | >=2 | >=2 | 0 | 2 | |
| 0 | 0 | 1 | 0 | 0 | 1 | 1 | 0 | 1 | |
| 0 | 0 | 0 | 0 | 0 | 0 | 0 | 0 | 0 | |

FIG. 1 6

BIT=X xor XR

| VALUE H | VALUE V | CX | XR |
|---|---|---|---|
| 1 | 1 | 13 | |
| 1 | 0 | 12 | |
| 1 | -1 | 11 | 0 |
| 0 | 1 | 10 | |
| 0 | 0 | 9 | |
| 0 | -1 | 10 | |
| -1 | 1 | 11 | |
| -1 | 0 | 12 | 1 |
| -1 | -1 | 13 | |

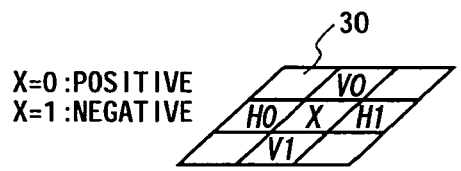

X=0: POSITIVE
X=1: NEGATIVE

| | | VALUE |
|---|---|---|
| {V0,V1} {H0,H1} | POSITIVE SIGNIFICANCE, POSITIVE SIGNIFICANCE POSITIVE SIGNIFICANCE, INSIGNIFICANCE | 1 |
| | POSITIVE SIGNIFICANCE, NEGATIVE SIGNIFICANCE INSIGNIFICANCE, INSIGNIFICANCE | 0 |
| | NEGATIVE SIGNIFICANCE, NEGATIVE SIGNIFICANCE NEGATIVE SIGNIFICANCE, INSIGNIFICANCE | -1 |

FIG. 1 7 B

PROCESSING BIT PLANE 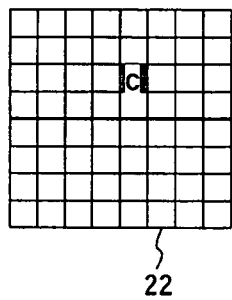

SIG PLANE 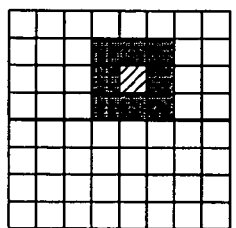

POSITIVE AND NEGATIVE SIGN PLANE 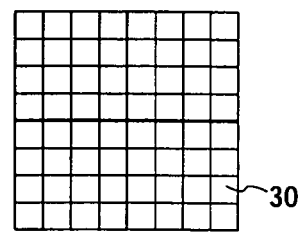

~30

22

31
▨ Significance

FIG. 18A    FIG. 18B    FIG. 18C

| CONDITION | Cx | bit |
|---|---|---|
| RENDER SIGNIFICANT DATA AS THE BIT MODEL RENDER IT AS AN MR PASS ONLY AFTER BECOMING SIGNIFICANT | Cx | c |

FIG. 18D

| $\Sigma H + \Sigma V + \Sigma D$ | RENDER A RELEVANT COEFFICIENT AS A SYMBOL WITH THIS PASS FIRST | Cx | BIT |
|---|---|---|---|
| Don't care | No | 16 | |
| >=1 | Yes | 15 | X |
| ==0 | Yes | 14 | |

FIG. 19A

FIG. 19B 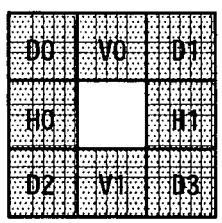

$\Sigma D$ IS A SIGNIFICANT NUMBER OF PIECES IN D0-3

PROCESSING BIT PLANE

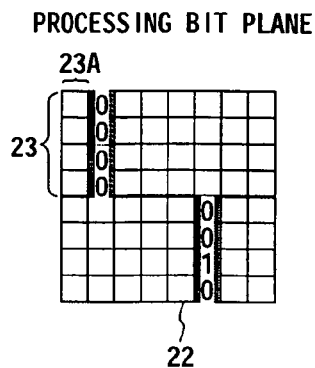

FIG. 2 0 A

SIG PLANE

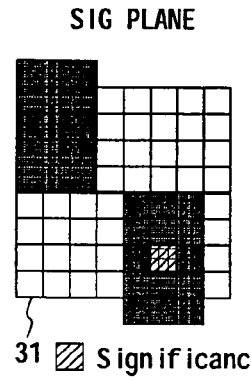

31 ▨ Significance

FIG. 2 0 B

POSITIVE AND NEGATIVE SIGN PLANE

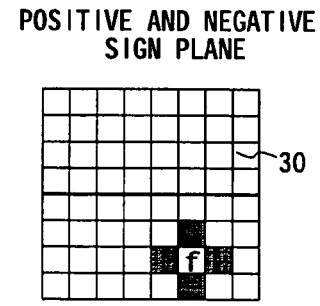

FIG. 2 0 C

| CONDITION | Cx | bit |
|---|---|---|
| ALL THE DATA ON STRIPES IS 0, AND THE PROXIMITY CORRESPONDING THERETO IS NOT ALL SIGNIFICANT. | run | c |
| AT LEAST ONE PIECE OF THE DATA ON THE STRIPES IS 1, AND THERE IS NO SIGNIFICANCE IN THE PROXIMITY. IT BECOMES SIGNIFICANT DUE TO THE DATA OF 1, AND PERFORMS THE SAME PROCESS AS AN SP PASS THEREAFTER. | run | c |
| | uniform | c |
| | uniform | c |
| | Sign CX | f |
| | CX | 0 |

FIG. 2 0 D

FIG. 2 1 A 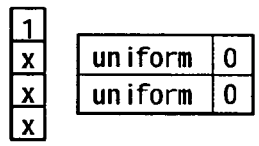

FIG. 2 1 B 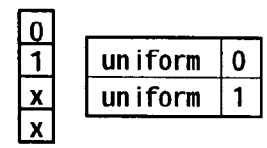

FIG. 2 1 C 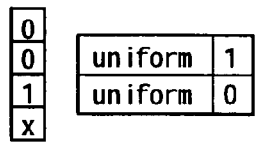

FIG. 2 1 D 

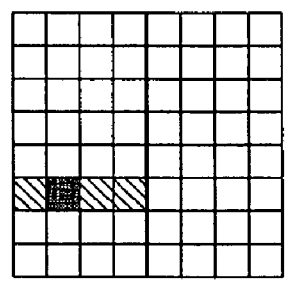
POSITIVE AND NEGATIVE SIGN PLANE
(A-3)
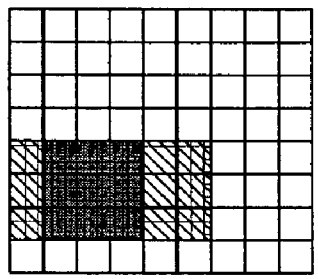
SIG PLANE
(A-2)
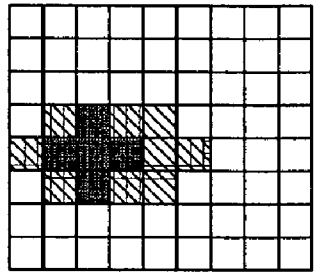
PROCESSING BIT PLANE
(A-1)
FIG. 22A
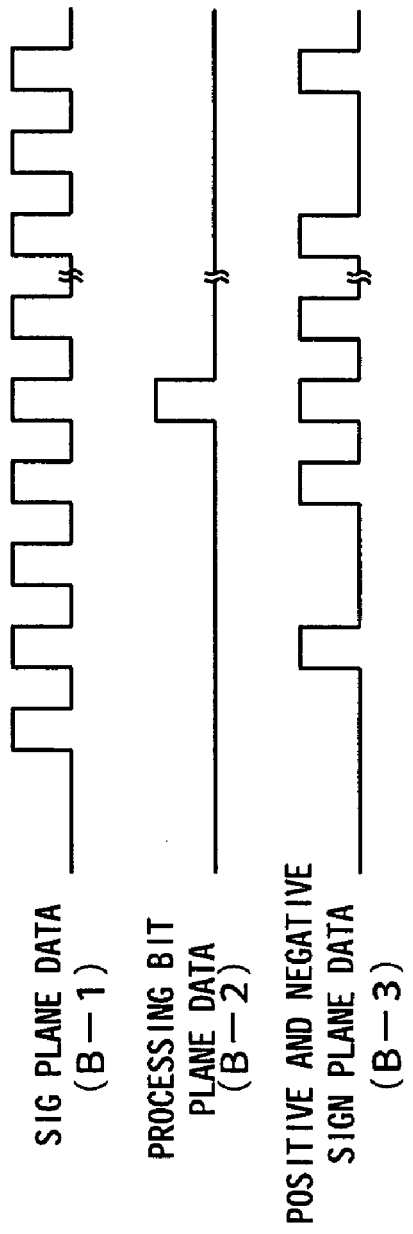
SIG PLANE DATA
(B-1)
PROCESSING BIT PLANE DATA
(B-2)
POSITIVE AND NEGATIVE SIGN PLANE DATA
(B-3)
FIG. 22B

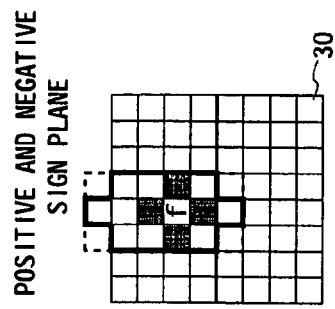
FIG. 27C POSITIVE AND NEGATIVE SIGN PLANE
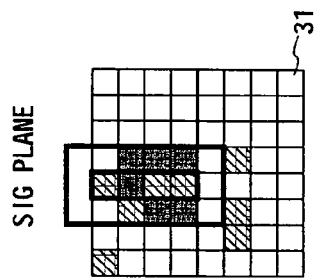
FIG. 27B SIG PLANE
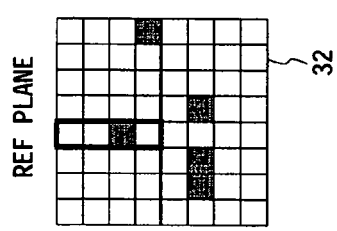
FIG. 27E REF PLANE
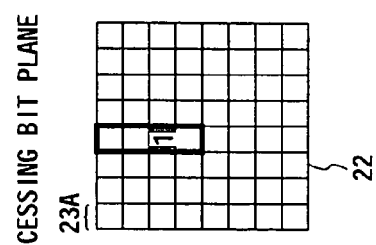
FIG. 27A PROCESSING BIT PLANE
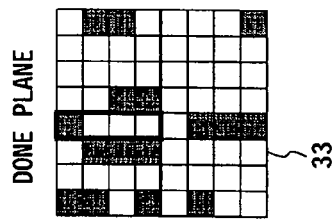
FIG. 27D DONE PLANE

| | CONFIGURATION NAME | OVERLAP READING CONFIGURATION | UPDATED PORTION LIMITED READING CONFIGURATION |
|---|---|---|---|
| 1 | CONVENTIONAL TECHNIQUE | 36,100 | 17,860 |
| 2 | FIRST EMBODIMENT (STRIPE CAM SYNCHRONIZATION) | 8,740 | 2,944 |
| 3 | SECOND EMBODIMENT (STRIPE CAM PHASE DEVIATION) | 6,080 | 2,048 |
| 4 | THIRD EMBODIMENT (STRIPE CAM PHASE DEVIATION + MEMORY INTERLEAVE) | 3,040 | 1,024 |

FIG. 48

ENCODING APPARATUS AND METHOD, AND DECODING APPARATUS, METHOD AND PROGRAM

CROSS REFERENCE TO RELATED APPLICATIONS

This application claims priority to Japanese Patent Application No. P2003-352798, filed on Oct. 10, 2003, the disclosure of which is incorporated by reference herein.

BACKGROUND OF THE INVENTION

The present invention relates to an encoding apparatus and an encoding method, a decoding apparatus, a decoding method and a decoding program, and is suitable for application to the encoding apparatus and decoding apparatus in compliance with the Joint Photographic Experts Group (JPEG) 2000 standard.

A compression method called the JPEG 2000 standard has been standardized as a new data compression method.

FIG. 1 shows a configuration of an encoding apparatus 1 in compliance with the JPEG 2000 standard, where supplied image data D1 undergoes predetermined input image processing such as a DC level shift process and a color data conversion process in an input image processing portion 2 and then obtained signal processing image data D2 is sent to a Discrete Wavelet Transform (DWT) portion 3.

The DWT portion 3 performs a wavelet transform process to the signal processing image data D2 which is supplied. To be more precise, as shown in FIG. 2, it divides an image based on the signal processing image data D2 into subbands in horizontal and vertical directions, as shown therein for instance, by passing it through two division filters of a low frequency passing type and a high frequency passing type.

FIG. 2 shows the case where the division number is three. In FIG. 2, reference character 'LL' denotes a component of the signal processing image data D2 on a low frequency side in both the horizontal and vertical directions, 'LH' denotes a component of the signal processing image data D2 on the low frequency side in the horizontal direction and on a high frequency side in the vertical direction, 'HL' denotes a component of the signal processing image data D2 on the high frequency side in the horizontal direction and on the low frequency side in the vertical direction, and 'HH' denotes a component of the signal processing image data D2 on the high frequency side in both the horizontal and vertical directions respectively.

And the DWT portion 3 sends a wavelet coefficient obtained by such a wavelet transform process to a quantization portion 4 as DWT data D3.

The quantization portion 4 sequentially quantizes the DWT data D3 which is supplied, and cuts obtained quantization coefficients in code blocks of a predetermined size so as to send them to a bit model portion 6 of an Embedded Block Coding with Optimized Truncation (EBCOT) block 5 as code block data D4 in the units of the code blocks.

The bit model portion 6 renders the supplied code block data D4 as a coefficient bit model by using a Coefficient Bit Modeling (CBM) process while scanning the data on each bit plane so as to send data D5 and D6 on symbols and contexts thus obtained to an arithmetic coder portion 7.

The arithmetic coder portion 7 generates an encoding row by performing a predetermined arithmetic coding calculation process with the supplied symbol data D5 and context data D6 as inputs, and sends it to a packetized stream generating portion 8 as encoded data D7.

The packetized stream generating portion 8 packetizes the supplied encoded data D7 in a packet format according to the JPEG 2000 standard. It is thereby possible to obtain encoded packet data D8 meeting a syntax of the JPEG 2000 standard.

FIG. 3 shows the configuration of a decoding apparatus 10 in compliance with the JPEG 2000 standard.

The decoding apparatus 10 extracts encoded data D11 which is an image information portion from encoded packet data D10 meeting the syntax of the JPEG 2000 standard generated as described above so as to send it to an arithmetic decoder portion 13 of an EBCOT block 12.

The arithmetic decoding portion 13 performs a predetermined arithmetic decoding calculation process with the encoded data D11 and context data D12 provided from a bit model portion 14 in a subsequent stage as inputs, and sends symbol data D13 thus obtained to the bit model portion 14.

The bit model portion 14 renders the supplied symbol data D13 as the coefficient bit model by using the CBM process so as to send decoded code block data D14 thus obtained to an inverse quantization portion 15 and send the context obtained at this time to the arithmetic decoder portion 13 as the context data D12.

The inverse quantization portion 15 obtains the wavelet coefficient by performing an inverse quantization process to the supplied decoded quantization data D14, and sends it to an IDWT portion 16 as decoded DWT data D16.

The IDWT portion 16 performs a wavelet inverse transform process to the supplied decoded DWT data D16, and sends wavelet inverse transform image data D16 thus obtained to an input image processing portion 17.

And the input image processing portion 17 performs predetermined signal processing to the wavelet inverse transform image data D16. Thus, it is possible to obtain image data D17 in which the image data D1 (FIG. 1) encoded on the encoding apparatus 1 (FIG. 1) is decoded.

The patent document 1 (Japanese Patent Laid-Open No. 2002-159009) and Non-Patent Document 1 (Japanese Patent Application No. 2003-130793) can be referred to as the documents regarding the encoding apparatus and decoding apparatus in compliance with the JPEG 2000 standard.

As to such encoding and decoding processes according to the JPEG 2000 standard, however, there are problems that processing contents are cumbersome and speeding up is difficult.

SUMMARY OF THE INVENTION

The present invention provides in an embodiment an encoding apparatus and an encoding method, a decoding apparatus, a decoding method and a decoding program capable of speeding up the encoding or decoding process.

The encoding apparatus, encoding method and program of the present invention have a configuration for, with a plurality of pixels corresponding to a processing unit of image information as one word, storing state quantity information to be used while being sequentially updated according to a processing status of the encoding process for image information in storage means, and with a predetermined plurality of pixels as the processing unit, performing the encoding process to the image information for each of the processing units by reading the state quantity information corresponding thereto from the storage means in the units of the word and using the read information.

Consequently, according to an embodiment the encoding apparatus, encoding method and program, it is possible to dramatically reduce the number of times of accessing the storage means compared to the case of reading the state quantity information from the storage means bit by bit.

As described above, according to an embodiment of the present invention, the decoding apparatus, decoding method and program have the configuration for, with a plurality of pixels corresponding to a processing unit of encoded image information as one word, storing the state quantity information indicating a predetermined state quantity to be used while being sequentially updated according to the processing status of the decoding process for encoded image information in the storage means, and with a predetermined plurality of pixels as the processing unit, performing the decoding process to the image information for each of the processing units by reading the state quantity information corresponding thereto from the storage means in the units of the word and using the read information.

Consequently, according to an embodiment the decoding apparatus, decoding method and program, it is possible to dramatically reduce the number of times of accessing the storage means compared to the case of reading the state quantity information from the storage means bit by bit.

According to an embodiment of the present invention, the encoding apparatus, encoding method and program have the configuration for, with a plurality of pixels corresponding to a processing unit of image information as one word, storing state quantity information to be used while being sequentially updated according to the processing status of the encoding process for the image information in storage means, and with a predetermined plurality of pixels as the processing unit, performing the encoding process to the image information for each of the processing units by reading the state quantity information corresponding thereto from the storage means in the units of the word and using the read information. Thus, it is possible to dramatically reduce the number of times of accessing the storage means so as to implement the encoding apparatus, encoding method and program capable of speeding up the encoding process.

According to an embodiment of the present invention, the decoding apparatus, decoding method and program have the configuration for, with a plurality of pixels corresponding to a processing unit of the encoded image information as one word, storing the state quantity information representing a predetermined state quantity to be used while being sequentially updated according to a processing status of the decoding process for the encoded image information in the storage means, and with a predetermined plurality of pixels as the processing unit, performing the decoding process to the encoded image information for each of the processing units by reading the state quantity information corresponding thereto from the storage means in the units of the word and using the read information. Thus, it is possible to dramatically reduce the number of times of accessing the storage means so as to implement the decoding apparatus, decoding method and program capable of speeding up the decoding process.

The nature, principle and utility of the invention will become more apparent from the following detailed description when read in conjunction with the accompanying drawings in which like parts are designated by like reference numerals or characters.

Additional features and advantages of the present invention are described in, and will be apparent from, the following Detailed Description of the Invention and the figures.

BRIEF DESCRIPTION OF THE FIGURES

FIGS. 2A and 2B are conceptual diagrams for explaining a wavelet transform.

FIGS. 14A to 14C are conceptual diagrams for explaining an SP pass.

FIGS. 15A to 15D are conceptual diagrams for explaining the SP pass.

FIG. 16 is a conceptual diagram for explaining a context encoding rule in the SP pass.

FIGS. 17A to 17C are conceptual diagrams for explaining the context encoding rule of positive and negative signs in the SP pass.

FIGS. 18A to 18D are conceptual diagrams for explaining an MR pass.

FIGS. 19A and 19B are a conceptual diagram for explaining the context encoding rule in the MR pass.

FIGS. 20A to 20D are conceptual diagrams for explaining a CU pass.

FIGS. 21A to 21D are conceptual diagrams for explaining the context encoding rule of uniform.

FIGS. 22A and 22B are conceptual diagrams and wave form charts for explaining a conventional memory access technique.

FIGS. 27A to 27E are conceptual diagrams for explaining bit plane access according to this embodiment.

FIG. 32 is a block diagram showing the configuration of a JPEG 2000 decoding apparatus according to the first embodiment.

FIG. 36 is a block diagram showing the overview configuration of an MR pass decoding processing portion of the decoding apparatus.

FIG. 48 is a diagram for explaining a comparison of the number of times of memory access between the conventional technique and the technique according to an embodiment.

DETAILED DESCRIPTION OF THE INVENTION

The present invention relates to an encoding apparatus and an encoding method, a decoding apparatus, a decoding method and a decoding program, and is suitable for application to the encoding apparatus and decoding apparatus in compliance with the Joint Photographic Experts Group (JPEG) 2000 standard.

Preferred embodiments of the present invention will be described with reference to the accompanying drawings:

(1) Contents of CBM Processing

The present invention relates to CBM processing performed in a bit model portion 6 (FIG. 1) of the encoding apparatus 1 and a bit model portion 13 (FIG. 3) of a decoding apparatus 10 in compliance with the above-mentioned JPEG 2000 standard. First, detailed description will be made on specific contents of CBM processing.

(1-1) 1 Code Block and Code Block Size

Figure 4:
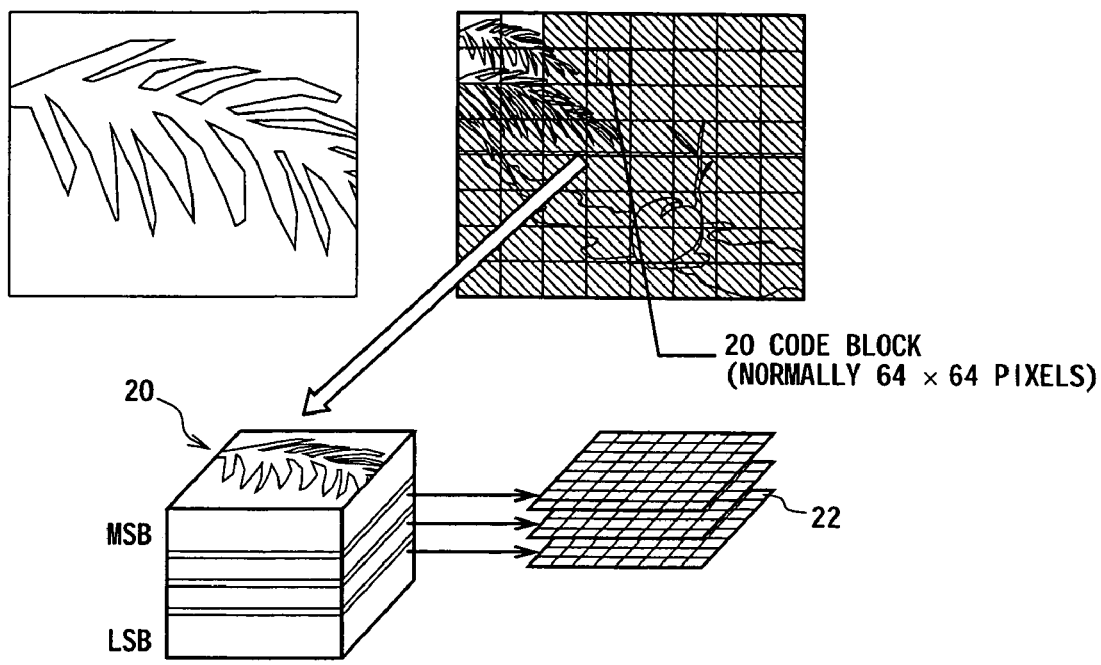
FIG. 4 is a conceptual diagram for explaining a code block and a bit plane.

As described above as to FIG. 1, a quantization portion 4 of the encoding apparatus 1 in compliance with the JPEG 2000 standard cuts quantized wavelet coefficients in units called code blocks and provides them to the bit model portion 6. And the bit model portion 6 performs the CBM processing in the units of code blocks 20 as shown in FIG. 4 so as to generate symbols and contexts.

Figure 5:
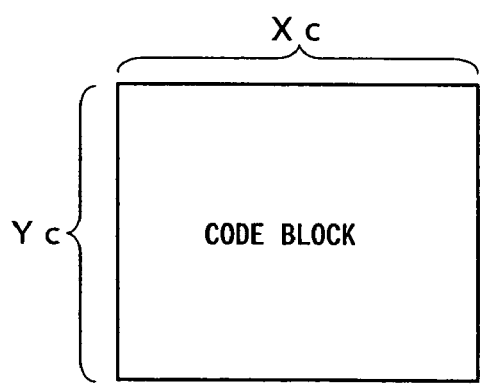
FIG. 5 is a conceptual diagram for explaining a code block size.

Here, an outline is determined as to size of the code block 20 as shown in FIG. 5. Therefore, the size of the code block 20 is selected on encoding according to this rule.

Figure 6:
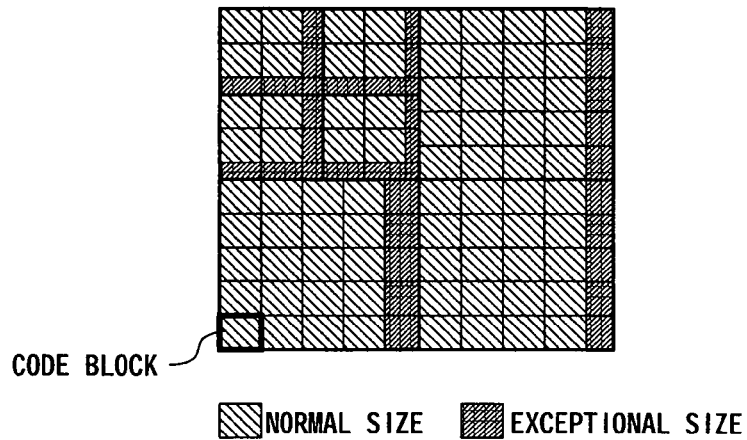
FIG. 6 is a conceptual diagram for explaining the code block size.

In this case, the code block 20 is basically positioned by starting from an upper left boundary of the subband, and so a mismatch may arise depending on a relationship between an image size and a code block size as shown in FIG. 6. Thus, the size determined on encoding is called a normal size and the size causing a mismatch is called an exceptional size.

The exceptional size is always smaller than the normal size, and only a stored data amount is basically different. Therefore, the exceptional size is referred to only here, and the code block 20 of the normal size will be described hereafter.

(1-2) Bit Plane

As described above, in the case of the CBM processing, processing (modeling, outputting symbols and contexts) is performed in the units of the code blocks 20. This processing is performed by dividing the data on the code blocks 20 into bit planes to process them in order. The bit plane is a plane which has a collection of representations of a 'bit (0/1)' as its name suggests.

Figure 7:
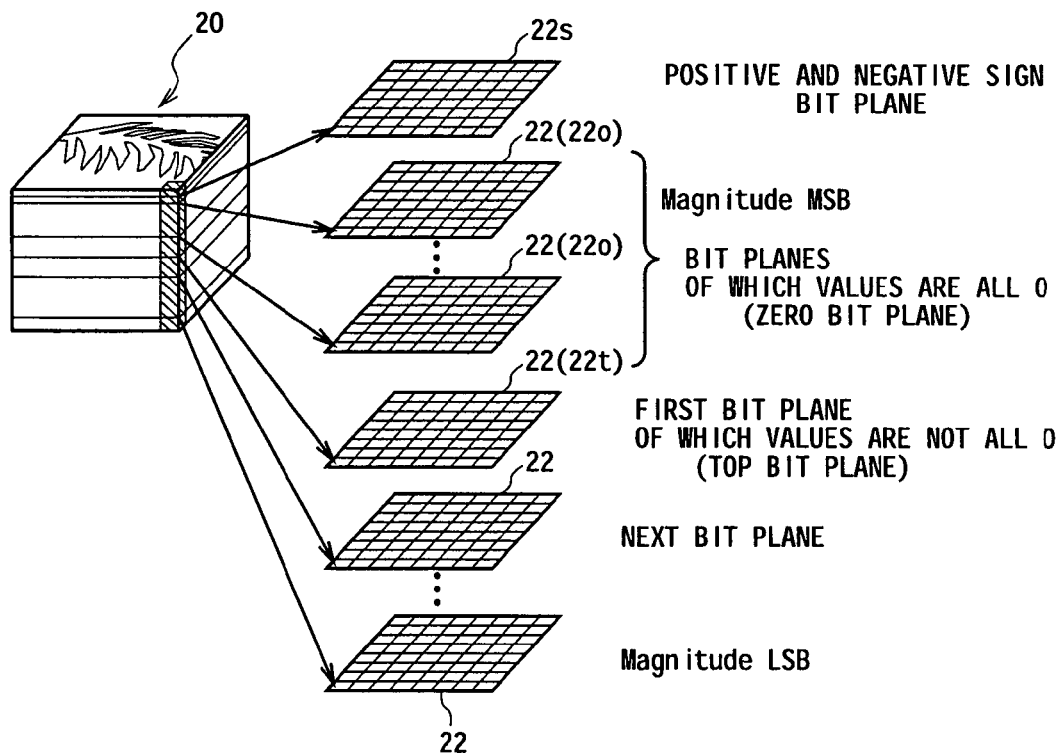
FIG. 7 is a conceptual diagram for explaining the bit plane in the code block.

As shown in FIG. 7, the data divided into the code blocks 20 is represented by 'Sign-Magnitude Representation,' that is, a numeric representation with positive and negative signs and absolute values. The positive and negative signs of the pixels are stored in the highest-order bit plane 22, which is called a positive and negative sign bit plane 22S. And absolute value data on the pixels are stored bit by bit in order in the bit planes 22 lower-order than that.

Here, assuming that the data on the pixels is represented by 16 bits, the data on the code blocks 20 is divided into sixteen bit planes 22 from a plane comprised of a collection of the highest-order bits (bits 15) of the pixels to a plane comprised of a collection of the lowest-order bits (bits 0).

If viewed in order from the high-order bit planes 22, the bit plane 22 comprised of the collection of the highest-order bits is the positive and negative sign bit plane 22S in which the positive and negative signs of the pixels are stored.

It follows that the absolute values of the data on the pixels are divided per bit and is stored on total fifteen bit planes 22 from a bit plane 22 comprised of a collection of the bits following the pixels to a bit plane 22 comprised of a collection of the lowest-order bits. In this case, all the bit values are often 0 as to some bit planes 22 which are statistically high-order. Such a bit plane is called a zero-bit plane 220.

If such fifteen bit planes 22 are viewed in order from the high-order, it comes to the bit plane 22 which is not the zero-bit plane 220 for the first time before long. This is called a top bit plane 22T, which is the bit plane 22 comprised of a collection of tenth bits (bits 9) counted from the lowest-order bits (bits 0) of the pixels as assumed in this case. The bit planes 22 lower-order than this (bit planes 22 comprised of a collection of the ninth or lower-order bits of the pixels) are not especially categorized whether or not there is the data thereon.

To summarize the above description, this example has a bit plane configuration wherein the positive and negative sign bit plane 22S is comprised of the collection of the highest-order bits (bits 15) of the pixels, the zero-bit plane 220 (10 sheets) is the bit plane 22 comprised of the collection of the eleventh bits (bits 10) from the bit plane 22 comprised of the collection of the following bits (bits 14) of the pixels, the top bit plane 22T which is the bit plane 22 comprised of the collection of tenth bits (bit 9), and the remaining bit planes 22 (9 sheets) to be processed are from the bit plane 22 comprised of a collection of ninth bits (bits 8) to the bit plane 22 comprised of a collection of the lowest-order bits.

The above-mentioned bit model portion 6 (FIG. 1) and bit model portion 13 (FIG. 3) perform the CBM processing as follows to the code blocks 20 of such a bit plane configuration.

1. Processing of the sign bit plane 22S is put off.
2. No CBM processing is performed to the zero-bit plane 220.
3. The CBM processing is performed for the first time to the top bit plane 22T. The CBM processing is called a "Clean-up Pass" (hereafter, referred to as a CU pass).
4. As for the remaining bit planes 22 to be processed, a "Significance Propagation Pass" (hereafter, referred to as an SP pass), a "Magnitude Refinement Pass" (hereafter, referred to as an MR pass) and the CU pass are performed to each bit planes 22 in order from the high-order ones.

The SP pass, MR pass and the CU pass will be described in detail later.

(1-3) Scan Order in the Bit Plane

Figure 8:
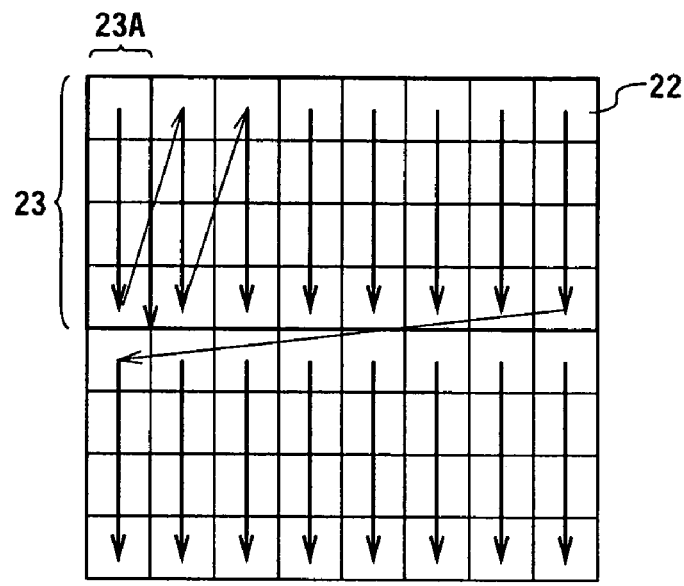
FIG. 8 is a conceptual diagram for explaining a scan order in the bit plane.

The order for accessing the bit planes 22 in the code blocks 20 has been described so far. And FIG. 8 shows the order in which the data on the pixels should be accessed in the bit plane 22. FIG. 8 illustrates the bit plane 22 of 8×8 pixels.

The bit planes 22 are divided into stripes 23 which are lines in the case of delimiting it horizontally by four vertical pixels. A vertical column in the stripe 23 is called a stripe column 23A. As a scan order in the bit plane 22 (hereafter, referred to as the scan order in the bit plane), processing is started from a leftmost stripe column 23A on the highest stripe 23 on the bit plane 22, and it moves on to a neighboring stripe column 23A on finishing the processing of one stripe column 23A. This is repeated while in the stripe column 23A. On completing the processing of one stripe 23, it moves on to a lower stripe 23 and repeats this until finishing the processing of all the pixels in the bit plane 22.

Furthermore, a relationship between the scan and the three passes (SP pass, MR pass and the CU pass) in the bit plane 22 will be described below.

As described above, only the processing of the CU pass is performed as to the top bit plane 22T, and the three passes of the SP pass, MR pass and CU pass are processed as to the bit planes 22 lower-order than that. FIGS. 12 to 15 show the relationship between this and the scan in the bit plane 22.

Figure 9:
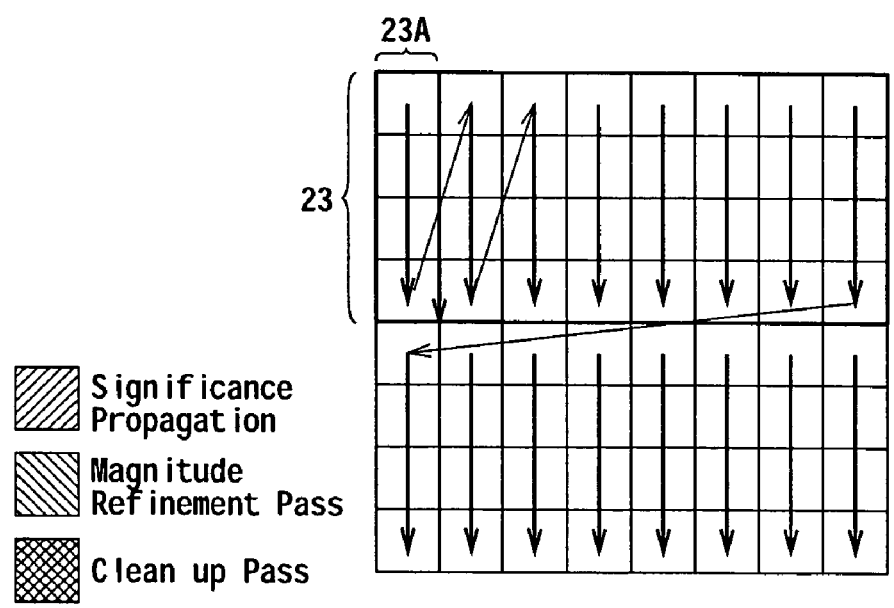
FIG. 9 is a conceptual diagram for explaining the scan order in the bit plane.
Figure 10:
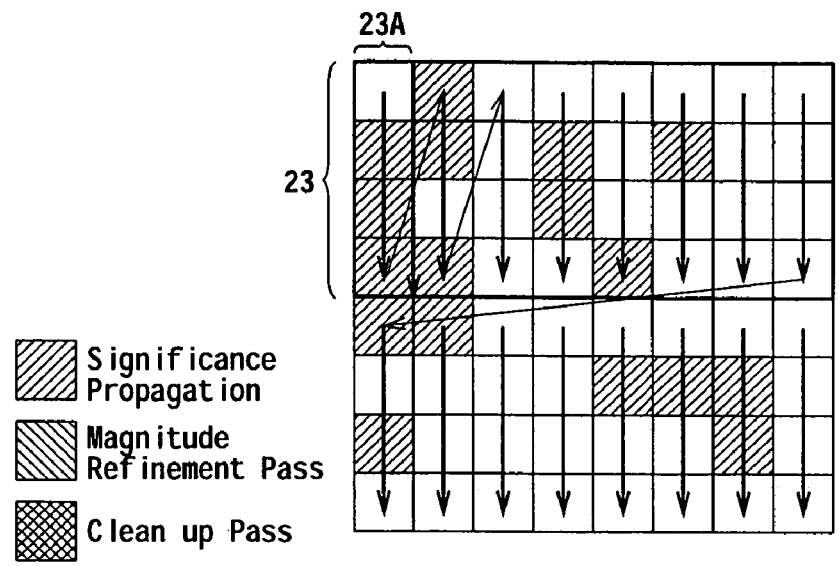
FIG. 10 is a conceptual diagram for explaining the scan order in the bit plane.

First, FIG. 9 shows the state in which no data has been processed so far and the processing is to be started from now on in the case of newly CBM-processing the bit plane 22. The processing of the SP pass is performed to necessary pixels, and FIG. 10 shows the state in which the processing of the SP pass is finished. The processing of the SP pass is performed in compliance with the scan order in the bit plane.

Figure 11:
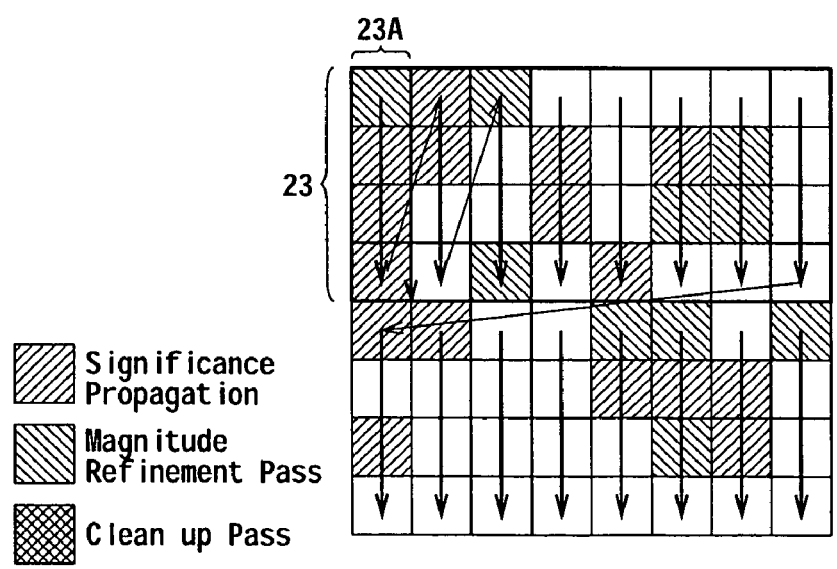
FIG. 11 is a conceptual diagram for explaining the scan order in the bit plane.

As for the MR pass next, the pixels processed by the SP pass are avoided, and only applicable pixels are processed. FIG. 11 shows the state in which the MR pass is finished. The processing of the MR pass is also performed in compliance with the scan order in the bit plane.

Figure 12:
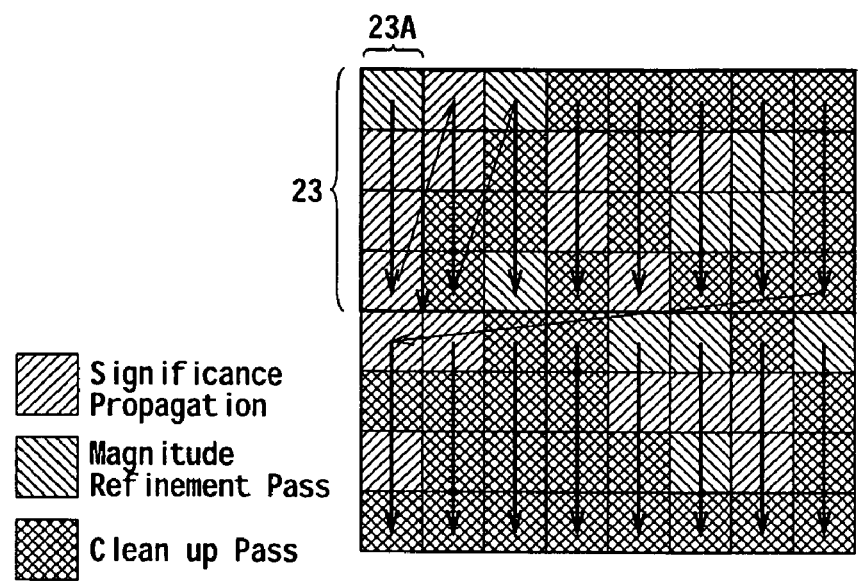
FIG. 12 is a conceptual diagram for explaining the scan order in the bit plane.

Furthermore, the pixels remaining unprocessed are also processed by the CU pass while keeping the scan order in the bit plane. FIG. 12 shows the state in which the CU pass is completed. Consequently, all the pixels have been processed, and so the bit modeling of the bit planes 22 is completed.

As for the 'top bit plane 22T,' only the processing of the CU pass is performed as to all the pixels.

(1-4) "Significance"

Next, a state quantity called "Significance" will be described before describing coding passes (SP pass, MR pass and the CU pass). "Significance" means whether a relevant pixel is 'significant or insignificant.'

'Significant' refers to "a state in which it is known that a relevant pixel is not 0 as a result of the CBM-processing so far." In other words, it means that "the pixel (bit) of which value is '1' has been completely modeled (encoded)."

'Insignificant' refers to "a state in which a pixel value of a relevant pixel is or may be 0." In other words, it means that "the pixel (bit) of which value is (currently) '1' has not been completely modeled (encoded)."

Furthermore, the 'relevant pixel' means a noted pixel on the bit planes 22.

'Significance' is stored and held while being updated over the entire code blocks 20 (FIG. 4). Therefore, in the case of the code blocks 20 comprised of sixteen bit planes 22 of 8×8 pixels exemplified so far, a "Significance" state quantity of 64 pixels (8×8 pixels) is stored and held over the code blocks 20.

As for the CBM-processing, the three coding passes (only the CU pass as to the top bit plane 22T) are processed (modeling, outputting symbols and contexts) in the bit plane 22 according to the scan order in the bit plane in order from the top bit plane 22T timewise. A state of a coefficient of a certain pixel (to be more precise, a quantized wavelet transform coefficient) is represented by the "Significance."

As for the code blocks 20 having undergone no CBM-processing, all the values on SIG planes start with "Insignificant" and the relevant ones turn to "Significant" in the course of processing the bit planes 22. Once they become "Significant," they will not return to "Insignificant" in the middle of the CBM-processing.

(1-5) Three Coding Passes

Next, the SP pass (Significant Propagation Pass), MR pass (Magnitude Refinement Pass) and CU pass (Clean-up Pass) will be described.

Figure 13:
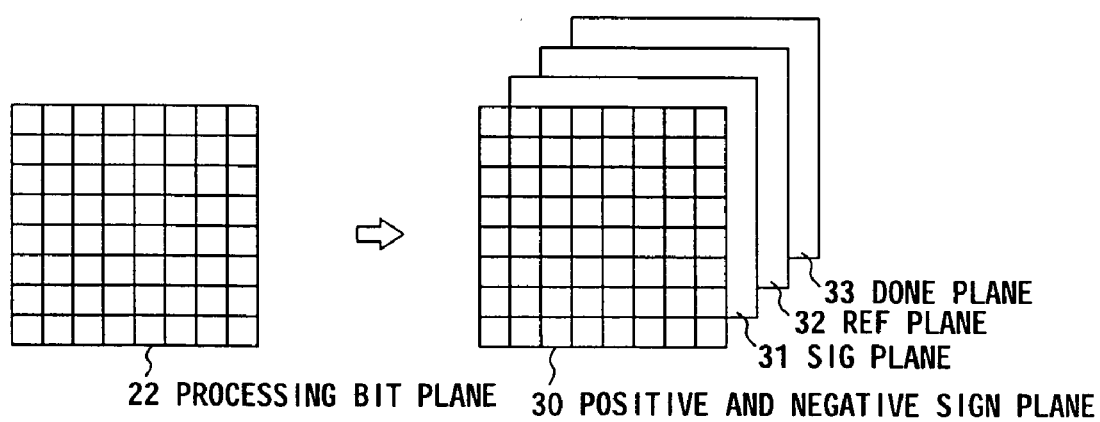
FIG. 13 is a conceptual diagram for explaining a plane for recording various state quantities.

In the case of performing the processing of the bit modeling according to the three coding passes, it is a general practice, as shown in FIG. 13, to prepare a plane 30 for storing and holding the data on the positive and negative sign bit plane 22S (FIG. 7) (hereafter, referred to as a positive and negative sign plane), a plane for recording the "Significance" (hereafter, referred to as a SIG plane 31), a plane 32 for indicating whether or not a first Refinement Pass (hereafter, referred to as a REF plane) and a plane 33 for representing whether or not a noted bit has been processed in a processing bit plane (hereafter, referred to as a DONE plane) as RAMs for storing the state quantity in addition to the bit plane 22 to be processed from now on (hereafter, referred to as a processing bit plane 22).

The positive and negative sign plane 30, SIG plane 31, REF plane 32 and DONE plane 33 are the planes of the same size as a processing bit plane 22 (8×8 pixels in the examples so far).

In this case, the positive and negative sign plane 30 is stored and held without changing its value while processing code blocks 22. The SIG plane 31 may have its value changed by the SP pass and CU pass. The REF plane 32 may have its value changed by the MR pass. The DONE plane 33 is a state quantity for setting a flag of completion of the processing correspondingly to the pixels having completed the process of each coding pass, and it is reset on completion of the process for the processing bit plane 22.

(1-5-1) Processing of the SP Pass

The SP pass is the coding pass executed first on the processing bit planes 22 except the top bit plane 22T (FIG. 7). The processing of the SP pass is performed while referring to the data on the SIG plane 31 at the same coordinate position as the relevant pixel on the processing bit planes 22.

To be more specific, when coordinates of the relevant pixel on the processing bit planes 22 are (2, 1) as shown in FIG. 14 (FIG. 14B), it refers to the data on the coordinate positions of (1, 0), (2, 0), (3, 0), (1, 1), (2, 1), (3, 1), (1, 2), (2, 2) and (3, 2) of the bit corresponding to the relevant pixel on the SIG plane 31 (bit of the coordinates (2, 1) in FIG. 14C) and 8 adjacent bits thereto put together. Of the 8 adjacent bits to be referred to, all the bits positioned outside the processing bit planes 22 are "Insignificant."

When the processing of the SP pass is performed, it is examined whether or not the process can be performed as to each of the pixels on the processing bit plane 22 starting from the upper left of the processing bit plane 22 in compliance with the above-mentioned scan order in the bit plane. To be more precise, it is examined whether or not conditions that 'the relevant pixel is Insignificant' and 'at least one "Significant" pixel exists among the 8 adjacent bits of the relevant pixel' are met.

When these conditions are met, the processing of the SP pass is performed for the relevant pixel. When these conditions are not met, the processing of the SP pass is not performed and a next pixel is evaluated in compliance with the scan order in the bit plane.

Next, a description will be given as to a flow in the case of starting the processing of the SP pass.

In the case of starting the processing of the SP pass, a value of the relevant pixel (0/1) on the processing bit plane 22 shown in FIG. 15A is outputted as a symbol. At the same time, the number of "Significant" bits is counted out of the 8 adjacent bits surrounding the bit on the SIG plane 31 shown in FIG. 15B corresponding to the relevant pixel on the processing bit plane 22 so as to output the context according to the rule shown in FIG. 16.

In FIG. 16, 'ΣH,' 'ΣV,' 'ΣD' and 'ΣH+ΣV' represent total values of the "Significant" bits out of 2 horizontal bits, 2 vertical bits, 4 oblique bits or 4 horizontal and vertical bits near the 8 adjacent bits to the bit on the SIG plane 31 corresponding to the relevant pixels on the processing bit plane 22 respectively.

'CX' represents the context in such a state. For instance, the code block 20 (FIG. 4) including the processing bit plane 22 is an LL component (FIG. 2) of an image. Then, the context is 1 in the case where 'ΣH,' 'ΣV' and 'ΣD' are 0, 0 and 1 respectively, and the context is 5 in the case where 'ΣH,' 'ΣV' and 'ΣD' are 1, 0 and 0 respectively.

In the case where the value of the symbol is 0, the processing of the SP pass for the relevant pixel is thereby completed, and a flag signifying the completion of the bit modeling is set at the same coordinate position as the relevant pixel on the DONE plane 33 (FIG. 13).

As opposed to this, in the case where the value of the symbol is 1 (that is, the value of the relevant pixel is 1), the relevant pixel is the pixel on which 1 appeared for the first time. And it turns to "Significant" for the first time from the state of having been "Insignificant" so far, and so the flag is set at the same coordinate position on the SIG plane 31. At this time, the flag is also set at the same coordinate position on the REF plane 32 (FIG. 13). This is the process for a next MR pass.

Furthermore, it refers to the 4 vertical and horizontal adjacent bits to the bit on the positive and negative sign plane 30 at the same coordinate position as the relevant pixel (that is, the positive and negative signs corresponding to the relevant pixel), and outputs the context according to the rule shown in FIG. 17.

An XOR signal is also outputted at the same time, where an exclusive OR of this and the context taken is outputted as the symbol of the positive and negative signs so as to complete the bit modeling of the positive and negative signs corresponding to the relevant pixel. At this stage, the processing of the SP pass about the relevant pixel is completed. At this time, a flag representing the completion of the bit modeling is set at the same coordinate position as the relevant pixel on the DONE plane 33 (FIG. 13).

As is obvious from the above description, there may be the cases where, depending on the scan order, those newly turned to "Significant" due to the SP pass exerts influence when referring to the 8 adjacent bits on the SIG plane 31 of another (adjacent) pixel.

(1-5-2) Processing of the MR Pass

The MR pass is the coding pass executed following the SP pass as to the processing bit planes 22 except the top bit plane 22T (FIG. 7). FIG. 18 shows an overview of the process.

When the processing of the MR pass is performed, it is examined whether or not the process can be performed as to each of the pixels starting from the upper left of the processing bit plane 22 in compliance with the above-mentioned scan order in the bit plane. To be more precise, it is examined whether or not the conditions that 'it is the relevant pixel on the processing bit plane 22 which is unprocessed (no flag is set at the same coordinate position as the relevant pixel on the DONE plane 33)' and 'the relevant pixel is "Significant" are met.

When these conditions are met, the processing of the MR pass is performed for the relevant pixel. When these conditions are not met, the processing of the MR pass is not performed and a next pixel on the processing bit plane 22 is evaluated in compliance with the above-mentioned scan order in the bit plane.

In the case of starting the processing of the MR pass, it refers to the 8 adjacent bits to the bit at the same coordinate position as the relevant pixel on the SIG plane 31 so as to output the context according to the rule shown in FIG. 19 and simultaneously output the value of the relevant pixel (0/1) as a symbol ('X' in FIG. 19).

In FIG. 19, it refers to the flag at the same coordinate position as the relevant pixel on the REF plane 32 (FIG. 13) as to the state of whether or not 'the relevant pixel is encoded first with this pass (MR pass).' If this flag is set, it is understandable that the relevant pixel is the pixel on the processing bit plane 22 immediately after performing the process with the SP pass. However, this flag is cleared after the reference so as not to refer to it with a mistake when processing the low-order bit planes 22 thereafter.

(1-5-3) Processing of the CU Pass

This is the only coding pass to the top bit plane 22T, and is the coding pass to be executed lastly as to the other processing bit planes 22 except the top bit plane 22T.

As for the CU pass, it is examined whether or not the processing of the CU pass can be performed as to each of the pixels starting from the upper left of the processing bit plane 22 in compliance with the above-mentioned scan order in the bit plane. At this stage, "the pixels on the processing bit plane 22 which are unprocessed (no flag is set at the same coordinate position as the relevant pixel on the DONE plane 33)," that is, all the remaining pixels not to be processed by the SP pass and MR pass on the processing bit plane 22 are to be processed by the CU pass.

As shown in FIG. 20, in addition to the reference to the values of 8 adjacent bits to the bit on the SIG plane 31 at the same coordinate position as the relevant pixel such as the above-mentioned SP pass and MR pass, the CU pass performs run-length encoding on a little larger scale.

As for the processing of the CU pass, it is examined whether or not a run-length process can be performed starting from the upper left of the processing bit plane 22. To be more precise, it is examined, in the unit of a stripe column 23A, whether or not the conditions that 'all the 4 pixels in the stripe column 23A are the pixels to be processed by the CU pass,' 'all the 4 pixels in the stripe column 23A are "Insignificant",' and 'no "Significance" exists on the 8 adjacent bits to the 4 bits on the SIG plane 31 at the same coordinate position as the 4 pixels in the stripe column 23A' are met.

When these conditions are met, the run-length process is started, and "run" is outputted as the context. In addition, 0 is outputted as the symbol when 'all the 4 pixels in the stripe column 23A are 0.' As opposed thereto, 1 is outputted (after outputting "run") as the symbol when 'all the 4 pixels in the stripe column 23A are not 0,' that is, when '1 exists even in one of the 4 pixels and a symbol corresponding to the context "uniform" is subsequently outputted twice.

In this case, the symbol corresponding to the context "uniform" is encoded according to the rule shown in FIG. 21. To describe it by referring to FIG. 21, the 4 pixels in the stripe column 23A are 0, 0, 1, 0 in lowering order, and a column '1, 0' representing the position at which 1 appeared for the first time becomes the symbol in that order. As it means that 1 appeared for the first time on the "Insignificant" pixels, the coordinates turn to "Significant" so that the value sets the flag at the same coordinate position as the pixel of 1 on the SIG plane 31 as shown in FIG. 20B. It goes without saying that the flag is simultaneously set at the same coordinate position on the REF plane 32 (FIG. 13).

The positive and negative signs of the relevant pixel are subsequently modeled, and a method thereof is the same as that of the modeling of the positive and negative signs of the SP pass described above as regards FIG. 17. Furthermore, the fourth pixel in the stripe column 23A remains without being modeled in this example. This pixel will undergo the same modeling as that of the SP pass.

(1-6) Dependency Among the Three Coding Passes

The three coding passes are processed in the CBM processing. The pixels on the processing bit plane 22 modeled once by a certain coding pass will not be reevaluated by another coding pass in the processing bit plane 22. It is because the processed and unprocessed are managed by using the DONE plane 33.

However, "Significance" is influenced by the 8 adjacent bits and so there is dependency of "Significance" in general. To be more specific, if there is the pixel having turned to "Significance," the adjacent pixels are thereby influenced on being modeled.

(1-7) Problem of the Conventional CBM Processing

An overview of the CBM processing has been indicated so far. The points thereof are as follows.

1. The three coding passes must be processed as to one bit plane 22.

2. There is the dependency among the three coding passes in the bit plane 22.

3. The low-order bit planes 22 are bit-modeled while evaluating the value of the SIG plane 31 generated by the high-order bit planes 22.

Under such limitations, the above-mentioned CBM processing by the conventional method is a sequential process of the following flow.

1. The bit planes 22 are processed in order from high-order ones.

2. The CU pass is processed on the top bit plane 22T. The SIG plane 31 is generated in this case.

3. After completing the process for the top bit plane 22T, it moves on to the bit planes 22 immediately below it so as to update the SIG plane 31 while processing the SP pass.

4. After completing the processing of the SP pass, the MR pass is processed. The SIG plane 31 is referred to on processing.

5. After completing the processing of the MR pass, the CU pass is processed. The SIG plane 31 is updated while referring to the SIG plane 31 and taking in newly modeled bits. The processing of one bit plane 22 is thereby completed.

6. It moves on to a next bit plane 22.

7. . . . .

In the case of the CBM processing of the bit plane 22 (8×8 pixels for instance) by the conventional method, each coding pass is evaluated bit by bit in compliance with the scan order in the bit plane.

However, the bit plane 22 for processing the three coding passes (this is primarily dominant) requires at least 192 times of coefficient reference totaling 64 times on the processing of the SP pass and 64 times on the processing of the MR pass to evaluate 64 pixels. In reality, it also requires the evaluation of the positive and negative signs in addition.

Furthermore, the SIG plane 31 to be simultaneously accessed requires reference to the values of the bit of the same coordinates as the relevant pixel and the 8 adjacent bits thereto. This requires 192 times×(8+1)=1728 times of data access, which is 27 times of the 64 pixels to be processed, and this is limiting operation speed of a circuit.

The CBM processing in the case where the bit plane 22 is 8×8 pixels was described so far. In reality, however, the code block sizes such as 32×32 pixels and 64×64 pixels are often used when cutting the code blocks to wavelet-transformed and quantized coefficients.

In this case, the code block size of 32×32 pixels×16 bits means a data amount of 32×32×16=16384 (bits)=16 (Kbits), and the code block size of 64×64 pixels×16 bits means a data amount of 64×64×16=65536 (bits)=64 (Kbits) for instance.

Figure 1:
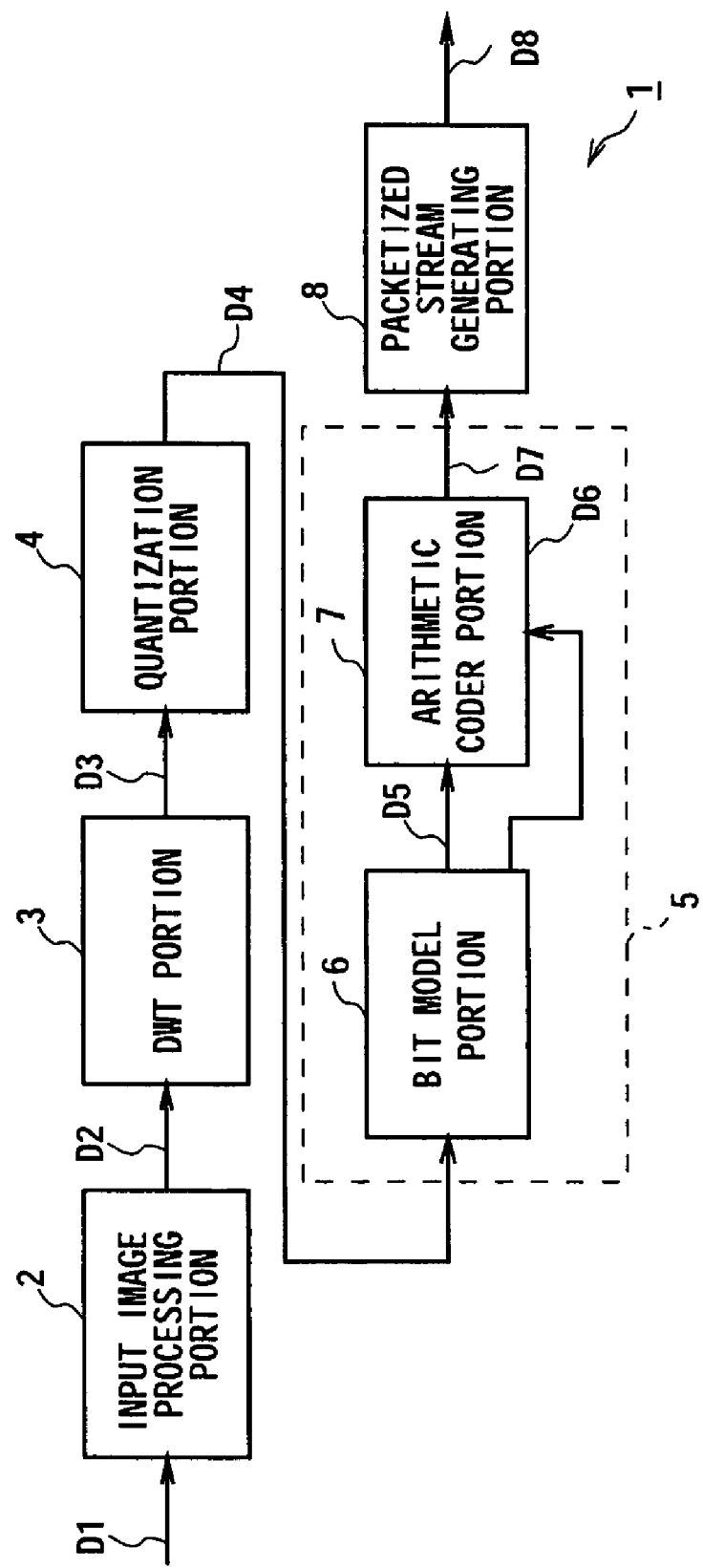
FIG. 1 is a block diagram showing the configuration of the conventional JPEG 2000 encoding apparatus.
Figure 3:
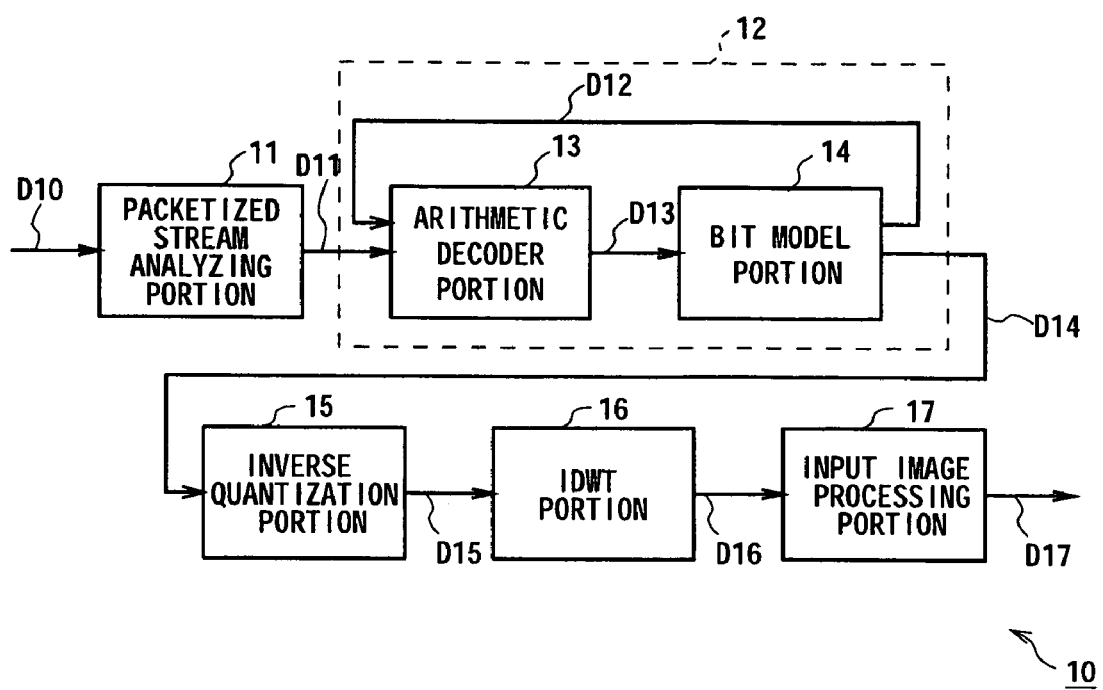
FIG. 3 is a block diagram showing the configuration of the conventional JPEG 2000 decoding apparatus.

Therefore, in the case of rendering the encoding apparatus 1 in compliance with the JPEG 2000 standard shown in FIG. 1 or the decoding apparatus 10 shown in FIG. 3 as an Integrated Circuit (IC), the code block sizes of 32×32 pixels×16 bits and 64×64 pixels×16 bits often used in reality are too large to be stored and held in a Static RAM (SRAM) in the IC.

Thus, the applicant hereof proposes to make the following devices to the configuration in the above-mentioned Japanese Patent Application No. 2003-130793 so as to significantly reduce wasteful time existing in the conventional CBM processing and decrease processing time.

1. To take a read-modify-write form, that is, to provide a Dynamic RAM (DRAM) for storing and holding code block data outside the encoding apparatus and decoding apparatus rendered as the ICs, provide an SRAM for storing and holding processing bit plane data necessary for coefficient bit modeling inside the IC, and further sequentially cut and read only data portions necessary for the processing from the SRAM to the bit model portion and perform the CBM processing to write them back to the SRAM.

2. As for the CBM processing for conventionally processing pixel by pixel, to put together four pixels equivalent to the size of the stripe column 23A in the processing bit plane 22 to constitute them as operators and perform the processing.

3. To constitute all the operators extended by the four pixels as the operators using shift registers so as to perform a pipeline process in which five pieces of information on processing bit plane data, SIG plane data, REF plane data, positive and negative sign plane data and DONE plane data are synchronized.

As for the invention proposed by Japanese Patent Application No. 2003-130793, however, there are the cases where, depending on the configuration of the memory for storing and holding the data on the SIG plane 31, the processing has to wait when reading the necessary data on the SIG plane 31 from the memory so that an effect of "four-pixel extended operation" cannot be fully exerted.

For instance, as to the encoding apparatus and the decoding apparatus disclosed in the above-mentioned Japanese Patent Application No. 2003-130793, consideration is given to the case where the configuration in which a memory word length (1 word) is assigned to 1 bit on the SIG plane 31 as before as the configuration of the memory for storing and holding the data on the SIG plane 31.

In this case, to CBM-process one stripe column (FIG. 22 (A-1)) on the processing bit plane 22 as shown in FIG. 22, 18 times (FIG. 22 (A-2)) of memory access is necessary as to the SIG plane 31 and 14 times (FIG. 22 (A-3)) of memory access is necessary as to the positive and negative sign plane 30.

For this reason, even in the case where the four pixels constituting one stripe column 23A on the processing bit plane 22 are collectively read from the memory by one clock (FIG. 22 (B-1)), the CBM processing has to wait until the data on the SIG plane 31 and the data on the positive and negative sign plane 30 necessary to CBM-process the four pixels are completely read (FIG. 22 (B-2), FIG. 22 (B-3)).

Figure 23:
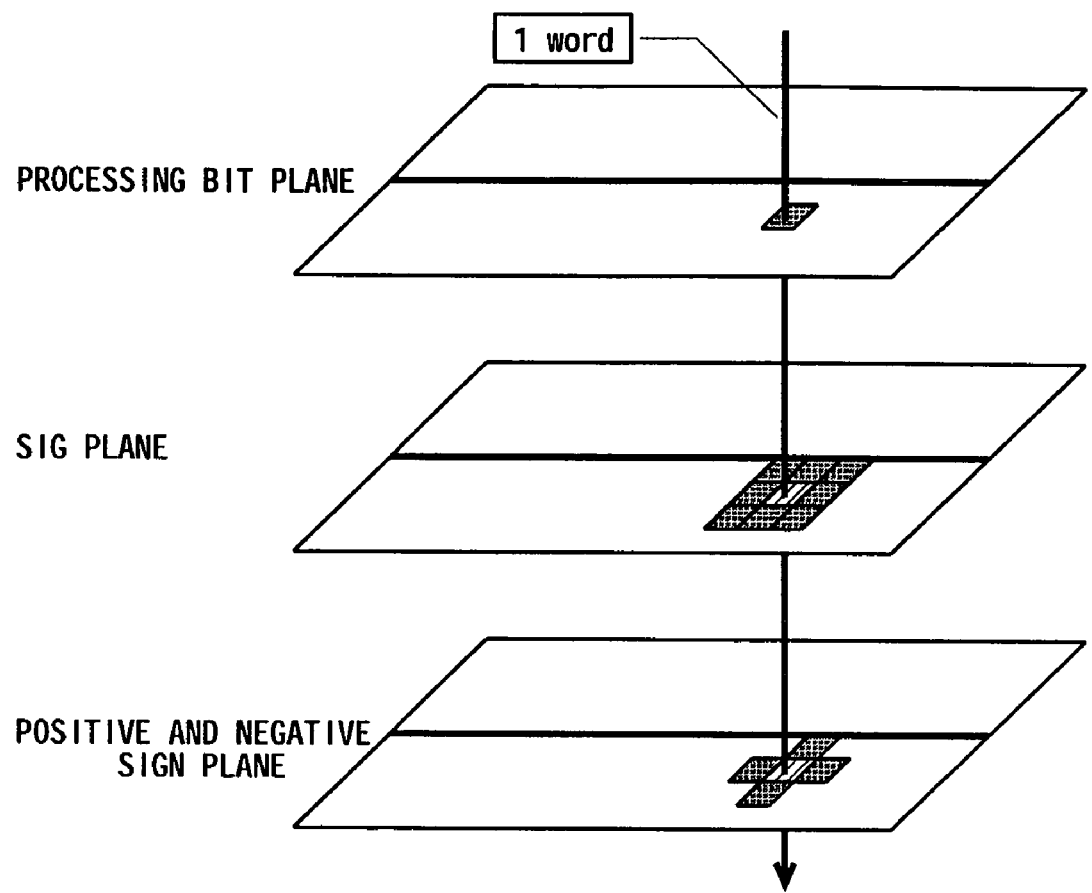
FIG. 23 is a conceptual diagram for explaining the conventional memory access technique.

As shown in FIG. 23, there is also a proposal of adoption of a memory configuration capable of collectively multiplexing the data of the processing bit plane 22, positive and negative sign plane 30, SIG plane 31, REF plane 32 and DONE plane 33 and specifying one address to take all the data (vertical skewer method). However, this technique is no different from the above-mentioned technique if considered from a viewpoint of memory access frequency.

Thus, it is intended, according to the present invention, to read the data on the SIG plane 31 in the unit (word length, word) of vertical 4 bits instead of 1 bit as conventionally performed, and thereby lower the memory access frequency for reading the data on the SIG plane 31 compared to such a conventional technique. Hereafter, this embodiment will be described.

(2) First Embodiment (2-1) Configuration of an Encoding Apparatus 40 According to a First Embodiment (2-1-1) Overall Configuration of the Encoding Apparatus 40

Figure 24:
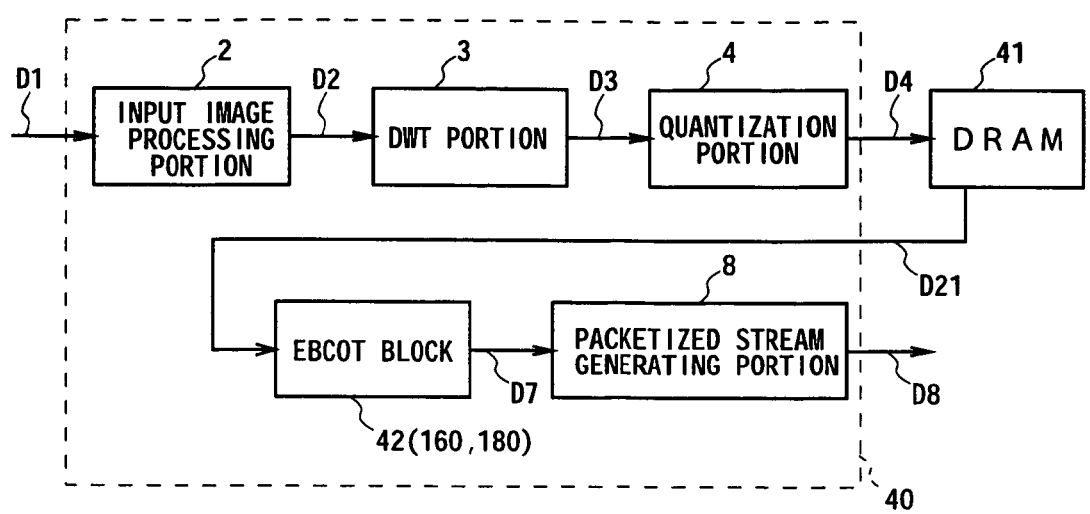
FIG. 24 is a block diagram showing a JPEG 2000 encoding apparatus according to a first embodiment.

FIG. 24 shows the encoding apparatus 40 according to this embodiment in compliance with the JPEG 2000 standard while showing the portions corresponding to FIG. 1 by giving them the same symbols. The encoding apparatus 40 has the same configuration as the encoding apparatus 1 shown in FIG. 1 except that it is entirely rendered as the Integrated Circuit (IC) as a unit, a DRAM 41 is provided outside the IC for the sake of storing and holding code block data D4 outputted from the quantization portion 4, and the configuration of an EBCOT block 42 is different.

Figure 25:
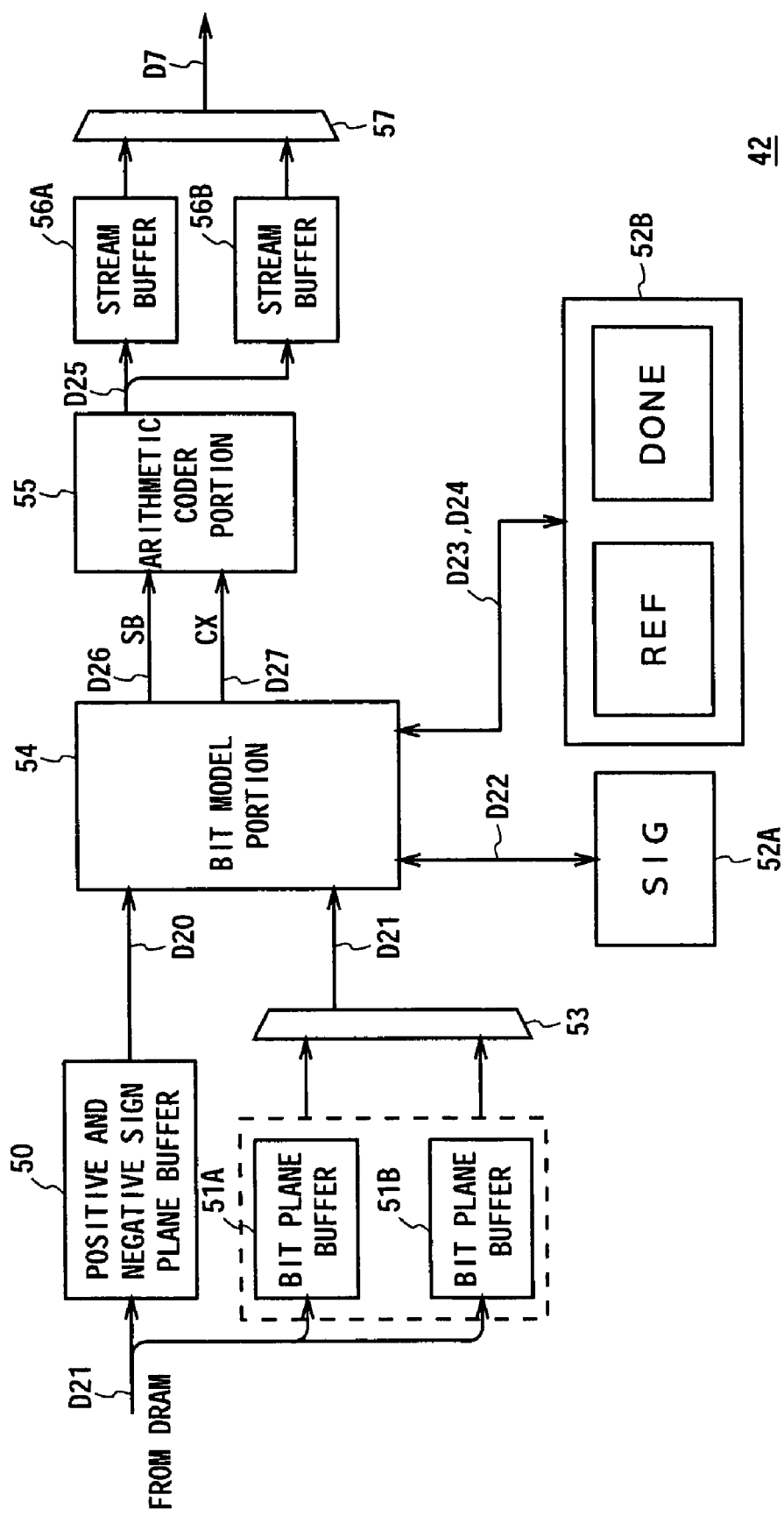
FIG. 25 is a block diagram showing configuration of an EBCOT block of the encoding apparatus in FIG. 24.

In reality, the EBCOT block 42 has a positive and negative sign plane buffer 50 and processing bit plane buffers 51A and 51B comprised of the SRAMs respectively provided on an input stage as shown in FIG. 25. And it can read data D20 on the positive and negative sign bit plane 22S (hereafter, merely referred to as positive and negative sign plane data) and data D21 on the necessary processing bit plane 22 (hereafter, merely referred to as processing bit plane data) out of the code block data D4 stored and held in the DRAM 41 (FIG. 24) so as to store and hold them in the positive and negative sign plane buffer 50 and bit plane buffers 51A and 51B comprised of the SRAMs respectively.

In this case, two each of the processing bit plane buffers 51A and 51B are provided so that, while CBM-processing the processing bit plane data D21 stored and held in the one processing bit plane buffers 51A and 51B, the next processing bit plane data D21 can be written to the other processing bit plane buffers 51A and 51B.

The EBCOT block 42 has SRAMs 52A and 52B having storage capacities of the data equivalent to at least one bit plane and two bit planes respectively provided therein so as to store and hold data D22 on the SIG plane 31 (FIG. 13) used on the CBM processing (hereafter, referred to as SIG plane data) in the SRAM 52A and store and hold data D23 on the REF plane 32 (FIG. 13) (hereafter, referred to as REF plane data) and data D24 on the DONE plane 33 (FIG. 13) (hereafter, referred to as DONE plane data) in the SRAM 52B.

The processing bit plane data D21 stored and held in the processing bit plane buffers 51A and 51B is sequentially read in a predetermined unit by a bit model portion 54 via a switcher 53. And the bit model portion 54 CBM-processes the read processing bit plane data D21 by using the positive and negative sign plane data D20 stored and held in the positive and negative sign plane buffer 50, the SIG plane data D22, REF plane data D23 and DONE plane data D24 stored and held in the SRAMs 52A and 52B so as to send a symbol SB and a context CX thus obtained to an arithmetic coder portion 55.

The arithmetic coder portion 55 generates an encoding row while performing an arithmetic coding process with the supplied symbol SB and context CX as inputs, and sequentially stores encoded data D25 thus obtained for each code block 20 in a first bit stream buffer 56A and a second bit stream buffer 56B alternately.

The encoded data D25 stored in the first bit stream buffer 56A or the second bit stream buffer 56B is sent thereafter to a packetized stream generating portion 8 (FIG. 24) via a switcher 57.

Thus, the encoding apparatus 40 can read only the necessary processing bit plane data D21 from the code block data D4 stored in the DRAM 41 and store and hold it in the bit plane buffers 51A and 51B while sequentially performing the CBM processing to the stored and held processing bit plane data D21.

(2-1-2) Configuration of the Bit Model Portion 54

Figure 26:
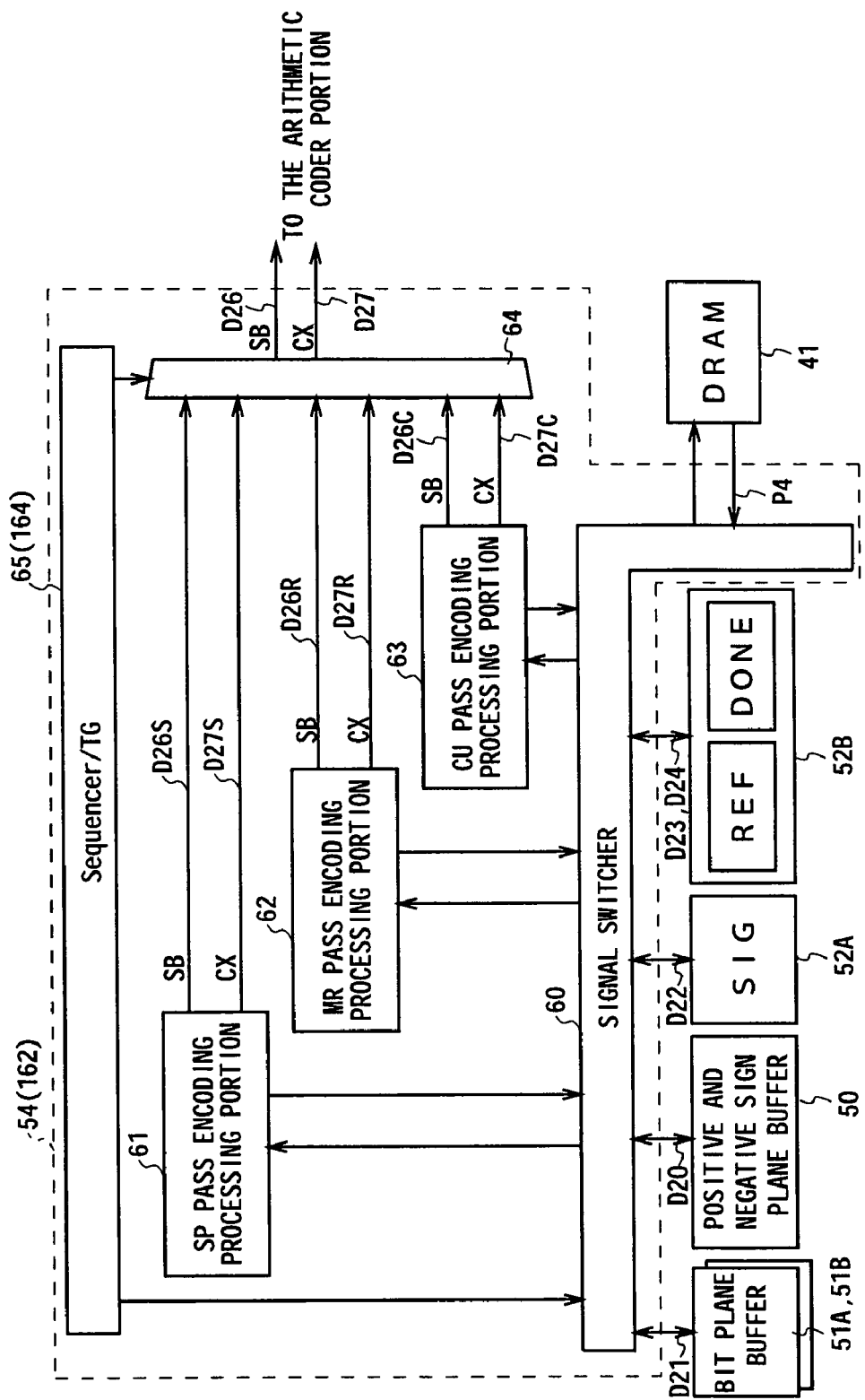
FIG. 26 is a block diagram showing the configuration of a bit model portion of the EBCOT block shown in FIG. 25.

Here, as shown in FIG. 26, the bit model portion 54 is comprised of a signal switcher 60, an SP pass encoding processing portion 61, an MR pass encoding processing portion 62, a CU pass encoding processing portion 63, an output switcher 64 and a control portion 65.

In this case, on CBM-processing the processing bit planes 22 other than the top bit plane 22T, the signal switcher 60 sequentially reads the processing bit plane data D21 word by word from the bit plane buffers 51A and 51B with the four pixels constituting one stripe column 23A shown in FIG. 27A as one word in compliance with the scan order in the bit plane under control of the control portion 65 having functions of a sequencer and a timing generator so as to send it first to the SP pass encoding processing portion 61.

In synchronization therewith, the signal switcher 60 sequentially reads from the positive and negative sign plane buffer 50 the positive and negative sign plane data D20 of the 4 bits and upper and lower bits thereof (6 bits in total, refer to FIG. 27C) on the positive and negative sign plane 30 at the same coordinate position as the four pixels required on performing the encoding process with the SP pass (hereafter, referred to as an SP pass encoding process) to the processing bit plane data D21 equivalent to the four pixels read from the processing bit plane buffers 51A and 51B so as to send it to the SP pass encoding processing portion 61.

Figure 28B:
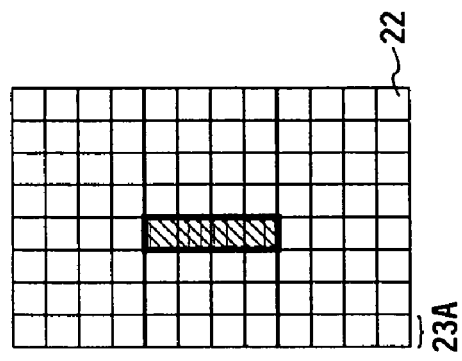
FIGS. 28A and 28B are a conceptual diagram for explaining the memory access technique according to the first embodiment.
Figure 28A:
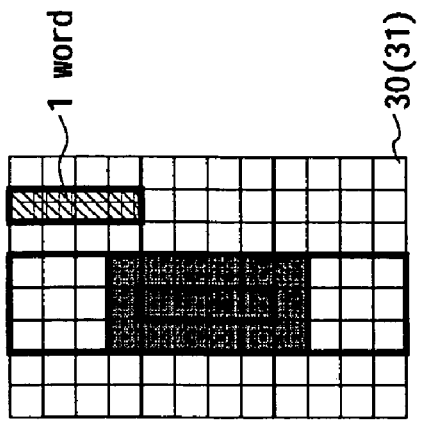

In this case, the positive and negative sign plane buffer 50 has the positive and negative sign plane data D20 stored therein with the four pixels corresponding to each stripe column 23A of the processing bit plane 22 as a unit (word), and is constituted to be able to read and write the positive and negative sign plane data D20 in this word unit. Therefore, as against the positive and negative sign plane data D20 of total 6 bits required on performing the SP pass encoding process to the processing bit plane data D21 equivalent to the four pixels read from the processing bit plane buffers 51A and 51B, the signal switcher 60 in this case sequentially reads from the positive and negative sign plane buffer 50 the positive and negative sign plane data D20 equivalent to the four pixels on the positive and negative sign plane 30 at the same coordinates as the four pixels in reality and the positive and negative sign plane data D20 equivalent to the four pixels constituting the upper and lower stripe columns 23A thereof respectively by taking three clocks so as to send it to the SP pass encoding processing portion 61 as shown in FIG. 28.

Furthermore, in synchronization therewith, the signal switcher 60 sequentially reads from the SRAM 52A the SIG plane data D22 of the 4 bits and upper and lower bits thereof (6 bits in total, refer to FIG. 27B) on the SIG plane 31 at the same coordinates as the four pixels required on performing the encoding process with the SP pass to the processing bit plane data D21 equivalent to the four pixels so as to send it to the SP pass encoding processing portion 61.

In this case, the SRAM 52A also has the SIG plane data D22 stored therein with the four pixels corresponding to each stripe column 23A of the processing bit plane 22 as a unit (word), and is constituted to be able to read and write the SIG plane data D22 in this word unit. Therefore, as against the SIG plane data D22 of total 6 bits required on performing the SP pass encoding process to the processing bit plane data D21 equivalent to the four pixels read from the processing bit plane buffers 51A and 51B, the signal switcher 60 in this case sequentially reads from the SRAM 52A the SIG plane data D22 of 4 bits on the SIG plane 31 at the same coordinates as the four pixels in reality respectively and the SIG plane data D22 of the upper and lower four bits thereof by taking three clocks (FIG. 28) so as to send it to the SP pass encoding processing portion 61.

Furthermore, in synchronization therewith, the signal switcher 60 sequentially reads from the SRAM 52B the REF plane data D23 of the 4 bits (refer to FIG. 27E) on the REF plane 32 at the same coordinates as the four pixels and the DONE plane data D24 of the 4 bits (refer to FIG. 27D) on the DONE plane 33 at the same coordinates as the four pixels required on performing the encoding process with the SP pass to the processing bit plane data D21 equivalent to the four pixels so as to send it to the SP pass encoding processing portion 61.

In this case, the SRAM 52B also has the REF plane data D23 and the DONE plane data D24 stored therein with the four pixels corresponding to each stripe column 23A of the processing bit plane 22 as a unit (word), and is constituted to be able to read and write the REF plane data D23 and the DONE plane data D24 in this word unit. Therefore, the signal switcher 60 reads the REF plane data D23 or the DONE plane data D24 of 4 bits from the SRAM 52B by one clock respectively so as to send it to the SP pass encoding processing portion 61.

In this case, the SP pass encoding processing portion 61 can store and hold at least three past samples of each of the processing bit plane data D21 and the positive and negative sign plane data D20, SIG plane data D22, REF plane data D23 and DONE plane data D24 corresponding thereto sequentially supplied from the signal switcher 60.

Here, one word is equivalent to one sample as to the processing bit plane data D21, REF plane data D23 and DONE plane data D24, and vertically arranged three words are equivalent to one sample as to the positive and negative sign plane data D20 and SIG plane data D22.

And if the processing bit plane data D21 on a next sample is given from the signal switcher 60, the SP pass encoding processing portion 61 detects whether or not the SP pass encoding process is possible and performs the SP pass encoding process if possible as to the processing bit plane data D21 on a preceding sample (four pixels in a heavy-line frame in FIG. 27A) by using the SIG plane data D22, positive and negative sign plane data D20, REF plane data D23 and DONE plane data D24 in the heavy-line frames in FIGS. 30B to 30E.

And in the case where the SP pass encoding process is performed, the SP pass encoding processing portion 61 sends the symbols SB of the pixels thereby obtained and the symbols SB about the positive and negative signs to the output switcher 64 as symbol data D26S and also sends the context CX about the pixels and the context CX about the positive and negative signs to the output switcher 64 as context data D27S.

And in the case where the SP pass encoding process is performed, the SP pass encoding processing portion 61 updates the SIG plane data D22, REF plane data D23 and/or DONE plane data D24 accordingly, and provides them to the corresponding SRAMs 52A and 52B via the signal switcher 60 thereafter so as to have the SIG plane data D22, REF plane data D23 and DONE plane data D24 written back to their original address positions in the SRAMs 52A and 52B respectively (Read-Modify-Write).

On finishing the SP pass encoding process for the data of 1 bit plane (processing bit plane data D21) stored in the processing bit plane buffers 51A and 51B, the signal switcher 60 sequentially reads the same processing bit plane data D21 word by word from the processing bit plane buffers 51A and 51B with the four pixels constituting one stripe column 23A shown in FIG. 27A as one word in compliance with the scan order in the bit plane under control of the control portion 65 likewise thereafter so as to send it to the MR pass encoding processing portion 62.

In synchronization therewith, the signal switcher 60 sequentially reads from the SRAM 52A the SIG plane data D22 of the 4 bits and upper and lower bits thereof (6 bits in total, refer to FIG. 27B) on the SIG plane 31 at the same coordinates as the four pixels required on performing the encoding process with the MR pass (hereafter, referred to as an MR pass encoding process) to the processing bit plane data D21 equivalent to the four pixels read from the processing bit plane buffers 51A and 51B so as to send it to the MR pass encoding processing portion 62.

As in the case of the above-mentioned SP pass encoding processing portion 61, as against the SIG plane data of total 6 bits required on performing the MR pass encoding process to the processing bit plane data D21 equivalent to the four pixels read from the processing bit plane buffers 51A and 51B, the signal switcher 60 in this case sequentially reads from the SRAM 52A the SIG plane data D22 equivalent to the 4 bits on the SIG plane 31 at the same coordinates as the four pixels respectively in reality and the SIG plane data D22 of the upper 4 bits and lower 4 bits thereof by taking three clocks (FIG. 28) so as to send it to the MR pass encoding processing portion 62.

Furthermore, in synchronization therewith, the signal switcher 60 sequentially reads from the SRAM 52B the REF plane data D23 equivalent to one word (refer to FIG. 27E) on the REF plane 32 at the same coordinates as the four pixels and the DONE plane data D24 equivalent to one word (refer to FIG. 27D) on the DONE plane 33 at the same coordinates as the four pixels required on performing the encoding process with the MR pass to the processing bit plane data D21 equivalent to the four pixels so as to send it to the MR pass encoding processing portion 62.

In this case, the MR pass encoding processing portion 62 can store and hold at least three past samples of each of the processing bit plane data D21 equivalent to the four pixels and the SIG plane data D22, REF plane data D23 and DONE plane data D24 corresponding thereto sequentially supplied from the signal switcher 60.

Here, one word is equivalent to one sample as to the processing bit plane data D21, REF plane data D23 and DONE plane data D24, and vertically arranged three words are equivalent to one sample as to the positive and negative sign plane data D20 and SIG plane data D22.

And if the processing bit plane data D21 on a next sample is given from the signal switcher 60, the MR pass encoding processing portion 62 detects whether or not the MR pass encoding process is possible and performs the MR pass encoding process if possible as to the processing bit plane data D21 on a preceding sample (four pixels in a heavy-line frame in FIG. 27A) by using the necessary SIG plane data D22, REF plane data D23 and DONE plane data D24 in the heavy-line frames in FIGS. 30B, 30D and 30E stored and held at the time.

And in the case where the MR pass encoding process is performed, the MR pass encoding processing portion 62 sends the symbols SB about the pixels thereby obtained and the symbols SB about the positive and negative signs to the output switcher 64 as symbol data D26R and also sends the context CX about the pixels and the context CX about the positive and negative signs to the output switcher 64 as context data D27R.

And in the case where the MR pass encoding process is performed, the MR pass encoding processing portion 62 updates the SIG plane data D22, REF plane data D23 and DONE plane data D24 accordingly, and provides them to the corresponding SRAMs 52A and 52B via the signal switcher 60 thereafter so as to have the SIG plane data D22, REF plane data D23 and DONE plane data D24 written back to their original address positions in the SRAMs 52A and 52B respectively (Read-Modify-Write).

On thus finishing the MR pass encoding process for the data of 1 bit plane (processing bit plane data D21) stored in the processing bit plane buffers 51A and 51B, the signal switcher 60 sequentially reads the same processing bit plane data D21 word by word from the processing bit plane buffers 51A and 51B with the four pixels constituting one stripe column 23A shown in FIG. 27A as one word in compliance with the scan order in the bit plane under control of the control portion 65 likewise thereafter so as to send it to the CU pass encoding processing portion 63.

In synchronization therewith, the signal switcher 60 sequentially reads from the positive and negative sign plane buffer 50 the positive and negative sign plane data D20 of the 4 bits on the positive and negative sign plane 30 and upper and lower bits thereof (6 bits in total, refer to FIG. 27C) at the same coordinates as the four pixels required on performing the encoding process with the CU pass (hereafter, referred to as a CU pass encoding process) to the processing bit plane data D21 equivalent to the four pixels read from the processing bit plane buffers 51A and 51B so as to send it to the CU pass encoding processing portion 63.

As in the case of the above-mentioned SP pass encoding processing portion 61, as against the positive and negative sign plane data D21 of total 6 bits required on performing the CU pass encoding process to the processing bit plane data D21 equivalent to the four pixels read from the processing bit plane buffers 51A and 51B, the signal switcher 60 in this case sequentially reads from the positive and negative sign plane buffer 50 the positive and negative sign plane data D20 of the 4 bits constituting 1 stripe column 23A on the positive and negative sign plane 30 at the same coordinates as the four pixels in reality respectively and the positive and negative sign plane data D20 of the upper 4 bits and lower 4 bits constituting the stripe columns 23A respectively by taking three clocks so as to send it to the CU pass encoding processing portion 62.

Furthermore, in synchronization therewith, the signal switcher 60 sequentially reads from the SRAM 52A the SIG plane data D22 of the 4 bits and the upper and lower bits thereof (6 bits in total, refer to FIG. 27B) on the SIG plane 31 at the same coordinates as the four pixels required on performing the encoding process with the CU pass to the processing bit plane data D21 equivalent to the four pixels respectively so as to send it to the CU pass encoding processing portion 63.

Also in this case, as against the SIG plane data of total 6 bits required on performing the CU pass encoding process to the processing bit plane data D21 equivalent to the four pixels read from the processing bit plane buffers 51A and 51B, the signal switcher 60 sequentially reads from the SRAM 52A the SIG plane data D22 of the 4 bits on the SIG plane 31 at the same coordinates as the four pixels in reality respectively and the SIG plane data D22 of the upper 4 bits and lower 4 bits thereof by taking three clocks (FIG. 28) so as to send it to the CU pass encoding processing portion 63.

Furthermore, in synchronization therewith, the signal switcher 60 sequentially reads from the SRAM 52B the REF plane data D23 equivalent to one word (refer to FIG. 27E) on the REF plane 32 at the same coordinates as the four pixels and the DONE plane data D24 equivalent to one word (refer to FIG. 27D) on the DONE plane 33 at the same coordinates as the four pixels required on performing the CU pass encoding process to the processing bit plane data D21 equivalent to the four pixels so as to send it to the CU pass encoding processing portion 63.

In this case, the CU pass encoding processing portion 63 can store and hold at least three past samples of each of the processing bit plane data D21 equivalent to the four pixels and the positive and negative sign plane data D20, SIG plane data D22, REF plane data D23 and DONE plane data D24 corresponding thereto sequentially supplied from the signal switcher 60.

Here, one word is equivalent to one sample as to the processing bit plane data D21, REF plane data D23 and DONE plane data D24, and vertically arranged three words are equivalent to one sample as to the positive and negative sign plane data D20 and SIG plane data D22.

And if the processing bit plane data D21 on a next sample is given from the signal switcher 60, the CU pass encoding processing portion 63 detects whether or not the CU pass encoding process is possible and performs the CU pass encoding process if possible as to the processing bit plane data D21 on a preceding sample (four pixels in a heavy-line frame in FIG. 27A) by using the SIG plane data D22, positive and negative sign plane data D20, REF plane data D23 and DONE plane data D24 in the heavy-line frames in FIGS. 30B to 30E stored and held at the time.

And in the case where the CU pass encoding process is performed, the CU pass encoding processing portion 63 sends the symbols SB about the pixels thereby obtained and the symbols SB about the positive and negative signs to the output switcher 64 as symbol data D26C and also sends the context CX about the pixels and the context CX about the positive and negative signs to the output switcher 64 as context data D27C.

And in the case where the CU pass encoding process is performed, the CU pass encoding processing portion 63 updates the SIG plane data D22, REF plane data D23 and DONE plane data D24 accordingly, and provides them to the corresponding SRAMs 52A and 52B via the signal switcher 60 thereafter so as to have the SIG plane data D22, REF plane data D23 and DONE plane data D24 written back to their original address positions in the SRAMs 52A and 52B respectively (Read-Modify-Write).

The output switcher 64 sends each of the symbol data D26S, D26R and D26C and the context data D27S, D27R and D27C given from the SP pass encoding processing portion 61, MR pass encoding processing portion 62 and CU pass encoding processing portion 63 to the arithmetic coder portion 55 respectively as the symbol data D26 and the context data D27 under control of the control portion 65.

Thus, the bit model portion 54 performs the SP pass encoding process, MR pass encoding process and CU pass encoding process with the four pixels constituting the stripe column 23A on the processing bit plane 22 as a unit. At this time, it also renders the 4 bits constituting one stripe column 23A of the same phase as the stripe column 23A as a memory word as to the positive and negative sign plane data D20 and SIG plane data D22 so as to dramatically reduce the number of times of memory access and perform the CBM processing securely and at high speed.

(2-1-3) Concrete Configurations of the Coding Pass Processing Portions

Next, the configurations of the SP pass encoding processing portion 61, MR pass encoding processing portion 62 and CU pass encoding processing portion 63 will be described in turn.

(2-1-3-1) Configuration of the SP Pass Encoding Processing Portion 61

Figure 29:
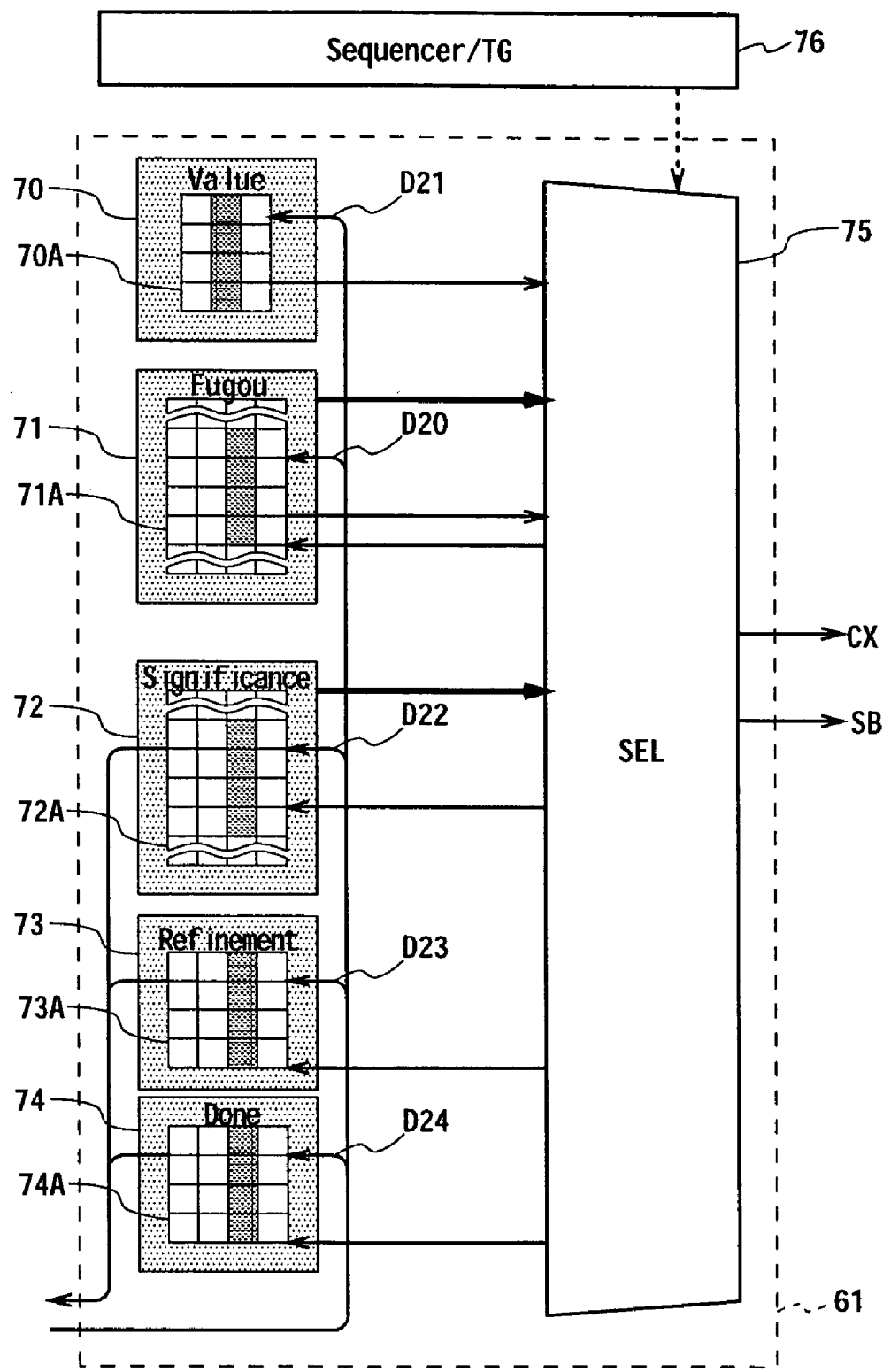
FIG. 29 is a block diagram showing an overview configuration of an SP pass encoding processing portion of the encoding apparatus.

As shown in FIG. 29, the SP pass encoding processing portion 61 is comprised of a processing bit shift register portion 70, a positive and negative sign shift register portion 71, an SIG shift register portion 72, an REF shift register portion 73, a DONE shift register portion 74 and a selector 75 of a hardware configuration and a control portion 76 for exerting output switch control over the selector 75 as described later.

The processing bit shift register portion 70 has a shift register 70A of three stages provided thereto, and the positive and negative sign shift register portion 71, SIG shift register portion 72, REF shift register portion 73 and DONE shift register portion 74 have shift registers 71A to 74A of four stages provided thereto respectively.

Thus, the SP pass encoding processing portion 61 can store and hold three or four sample equivalents of each of the processing bit plane data D21, positive and negative sign plane data D20, SIG plane data D22, REF plane data D23 and DONE plane data D24 which are sequentially given from the signal switcher 60 (FIG. 26) by one sample equivalent each at a time while sequentially shifting them among the shift registers 70A to 74A of the processing bit shift register portion 70, positive and negative sign shift register portion 71, SIG shift register portion 72, REF shift register portion 73 and DONE shift register portion 74.

And if one sample equivalent of the processing bit plane data D21 is given from the signal switcher 60, the processing bit shift register portion 70 then outputs one sample equivalent of the processing bit plane data D21 shifted to a second stage of its shift register 70A to the selector 75.

In synchronization therewith, the SIG shift register portion 72 in this case detects whether or not each of the four pixels shifted then to the second stage of the shift register 70A of the processing bit shift register portion 70 meets the conditions for performing the above-mentioned SP pass encoding process in parallel by using the SIG plane data D22 stored and held in its shift register 72A so as to output a detection result to the selector 75.

Furthermore, in synchronization therewith, the SIG shift register portion 72 calculates the context CX about every four pixels shifted to the second stage of the shift register 70A of the processing bit shift register portion 70 according to the rule described about FIG. 16 so as to output a calculation result to the selector 75.

And in the case where all the results of the detection by the SIG shift register portion 72 as to whether or not the four pixels shifted to the second stage of the shift register 70A of the processing bit shift register portion 70 meet the conditions for performing the SP pass encoding process are negative, nothing is outputted from the selector 75 and the process for one sample (four pixels) equivalent of the processing bit plane data D21 shifted to the second stage of the shift register 70A of the processing bit shift register portion 70 is finished.

As opposed to this, in the case where the detection result of any pixel of the one samples shifted to the second stage of the shift register 70A of the processing bit shift register portion 70 (hereafter, referred to as an SP pass encoding process subject pixel) is positive, a data value (0/1) of the SP pass encoding process subject pixel outputted from the processing bit shift register portion 70 and the calculation result of the context CX about the SP pass encoding process subject pixel outputted from the SIG shift register portion 72 in synchronization therewith are outputted from the selector 75 as the symbol SB and context CX about the SP pass encoding process subject pixel respectively.

In the case where the value of the symbol SB is '0,' of the DONE plane data D24 stored and held in the shift register 74A of the DONE shift register portion 74 based on update information given thereafter from the selector 75 to the DONE shift register portion 74, the values of the bits at the same coordinates as the SP pass encoding process subject pixel are updated to '1' representing the completion of the bit modeling so as to complete the SP pass encoding process for the SP pass encoding process subject pixel.

As opposed to this, in the case where the value of the symbol SB is '1,' that information is given to the SIG shift register portion 72, REF shift register portion 73 and positive and negative sign shift register portion 71 respectively.

At this time, the SIG shift register portion 72 has the values of the bits at the same coordinates as the SP pass encoding process subject pixel in the SIG plane data D22 stored and held in its shift register 72A updated to '1' representing that it is "Significant." And the REF shift register portion 73 has the values of the bits at the same coordinates as the SP pass encoding process subject pixel in the REF plane data D23 stored and held in its shift register 73A updated to '1' representing that it has become "Significant."

Furthermore, the positive and negative sign shift register portion 71 in this case calculates the symbol SB of the positive and negative signs and context CX about the SP pass encoding process subject pixel according to the rule described above as to FIG. 17 so as to send the calculation result to the selector 75. Thus, the symbol SB and context CX are outputted via the selector 75.

Thereafter, update information is given from the selector 75 to the DONE shift register portion 74. Based on this update information, the values of the bits at the same coordinates as the SP pass encoding process subject pixel in the DONE plane data D24 stored and held in the shift register 74A of the DONE shift register portion 74 are updated to '1' so as to complete the SP pass encoding process for the SP pass encoding process subject pixel.

Concerning the pixels later in the scan order in the bit plane than the SP pass encoding process subject pixel in the same sample (one sample stored and held in the second stage of the shift register 70A of the shift register portion 70 at the time), the SP pass encoding processing portion 61 skips them thereafter in the case where they do not meet the conditions for performing the SP pass encoding process, and performs the SP pass encoding process as with the above-mentioned SP pass encoding process subject pixel in the case where they meet the conditions. And the SP pass encoding processing portion 61 finishes the process for the sample by completing such a process for all the pixels in the sample.

And the SP pass encoding processing portion 61 sequentially repeats the same process every time a next one sample equivalent of the processing bit plane data D21 is given from the signal switcher 60 according to a transfer request for the next one sample equivalent of the processing bit plane data D21 given from the control portion 76 to the control portion 65 (FIG. 26).

Every time the next one sample equivalent of the processing bit plane data D21 is given, the SP pass encoding processing portion 61 provides the SIG plane data D22, REF plane data D23 and DONE plane data D24 stored and held in the fourth stage of the shift registers 72A to 74A of the SIG shift register portion 72, REF shift register portion 73 and DONE shift register portion 74 to the corresponding SRAMs 52A and 52B via the signal switcher 60 respectively so as to have them written back to their original positions in the SRAMs 52A and 52B.

Thus, the SP pass encoding processing portion 61 can perform the SP pass encoding process to the processing bit plane data D21 stored in the processing bit plane buffers 51A and 51B.

(2-1-3-2) Configuration of the MR Pass Encoding Processing Portion 62

Figure 30:
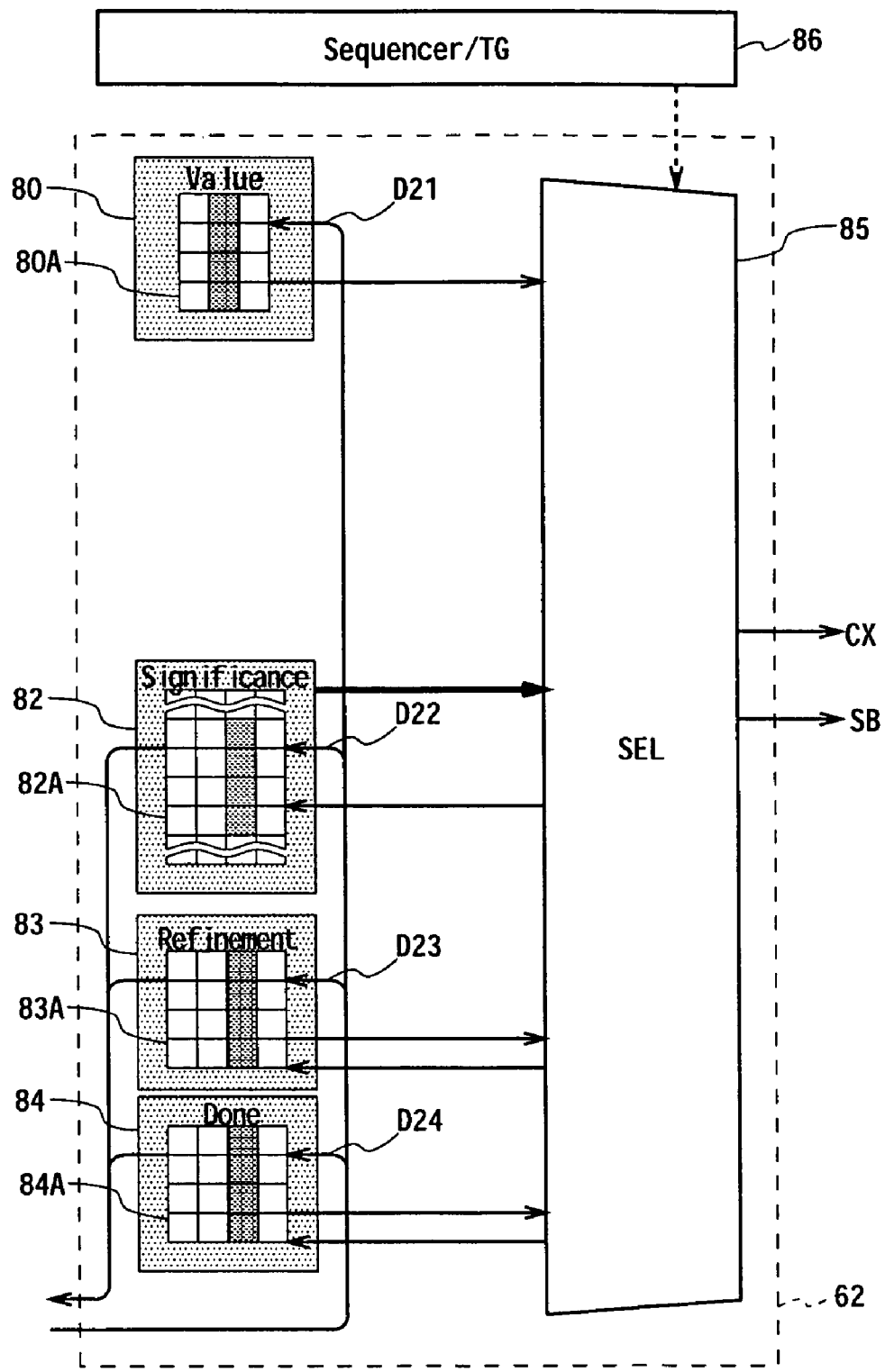
FIG. 30 is a block diagram showing the overview configuration of an MR pass encoding processing portion of the encoding apparatus.

As shown in FIG. 30, the MR pass encoding processing portion 62 is comprised of a processing bit shift register portion 80, an SIG shift register portion 82, an REF shift register portion 83, a DONE shift register portion 84 and a selector 85 of the hardware configuration and a control portion 86 for exerting output switch control over the selector 85 as described later.

The processing bit shift register portion 80 has a shift register 80A of three stages provided thereto, and the SIG shift register portion 82, REF shift register portion 83 and DONE shift register portion 84 have shift registers 82A to 84A of four stages provided thereto respectively.

Thus, the MR pass encoding processing portion 62 can store and hold three or four sample equivalents of each of the processing bit plane data D21, SIG plane data D22, REF plane data D23 and DONE plane data D24 which are sequentially given from the signal switcher 60 (FIG. 26) by one sample equivalent each at a time while sequentially shifting them among the shift registers 80A, 82A to 84A of the processing bit shift register portion 80, SIG shift register portion 82, REF shift register portion 83 and DONE shift register portion 84.

And if one sample equivalent of the processing bit plane data D21 is given from the signal switcher 60, the processing bit shift register portion 80 then outputs one sample equivalent of the processing bit plane data D21 shifted to the second stage of its shift register 80A to the selector 85.

In synchronization therewith, the REF shift register portion 83 and DONE shift register portion 84 in this case outputs one sample equivalent of the REF plane data D23 or DONE plane data D24 shifted to the second stage of its shift register 83A and 84A to the selector 85.

And the SIG shift register portion 82 calculates the context CX about the four pixels shifted to the second stage of the processing bit shift register portion 80 according to the above-mentioned rule described about FIG. 19 by using the SIG plane data D22 stored and held in its shift register 82A while referring to the output of the REF shift register portion 83 so as to output the calculation result to the selector 85.

In the case where all the values of the DONE plane data D24 are '1' (that is, processed) then, nothing is outputted from the selector 85 and the process for one sample equivalent of the processing bit plane data D21 shifted to the second stage of the shift register 80A of the processing bit shift register portion 80 is finished.

Also in the case where any data value of one sample equivalent of the DONE plane data D24 is '0' (that is, unprocessed) and the pixel shifted to the second stage of the shift register 80A of the processing bit shift register portion 80 corresponding to the DONE plane data D24 is not "Significant," nothing is outputted from the selector 85 and the process for one sample equivalent of the processing bit plane data D21 shifted to the second stage of the shift register 80A of the processing bit shift register portion 80 is finished.

As opposed to this, in the case where any data value of the one sample equivalent of the DONE plane data D24 is '0' and the pixel shifted to the second stage of the shift register 80A of the processing bit shift register portion 80 corresponding to the DONE plane data D24 is "Significant," it means that the pixel is the one to which the MR pass encoding process should be performed (hereafter, referred to as an MR pass encoding process subject pixel).

Thus, the selector 85 outputs the data value (0/1) of the MR pass encoding process subject pixel outputted from the processing bit shift register portion 80 as the symbol SB then, and also outputs the context CX of the MR pass encoding process subject pixel outputted from the SIG shift register portion 82.

At this time, if the bits at the same coordinates as the MR pass encoding process subject pixel are '1' (that is, a flag is set), they are cleared in the REF shift register portion 83. And the DONE shift register portion 84 has the bits at the same coordinates as the MR pass encoding process subject pixel updated to '1' meaning that the MR pass encoding process subject pixel has been processed.

And thereafter, the MR pass encoding processing portion 62 also performs the MR pass encoding process as described above to the remaining pixels shifted then to the second stage of the shift register 80A of the processing bit shift register portion 80 in the case where the pixels are the ones to which the MR pass encoding process should be performed.

Furthermore, the MR pass encoding processing portion 62 sequentially repeats the same process every time a next one sample equivalent of the processing bit plane data D21 is given from the signal switcher 60 according to the transfer request for the next one sample equivalent of the processing bit plane data D21 given from the control portion 86 to the control portion 65 (FIG. 26).

In this case, every time the next one sample equivalent of the processing bit plane data D21 is given, the MR pass encoding processing portion 62 provides the SIG plane data D22, REF plane data D23 and DONE plane data D24 stored and held in the fourth stage of the shift registers 82A to 84A of the SIG shift register portion 82, REF shift register portion 83 and DONE shift register portion 84 respectively to the corresponding SRAMs 52A and 52B via the signal switcher 60 so as to have them written back to their original positions in the SRAMs 52A and 52B.

Thus, the MR pass encoding processing portion 62 can perform the MR pass encoding process to the processing bit plane data D21 stored in the processing bit plane buffers 51A and 51B.

(2-1-3-3) Configuration of the CU Pass Encoding Processing Portion 63

Figure 31:
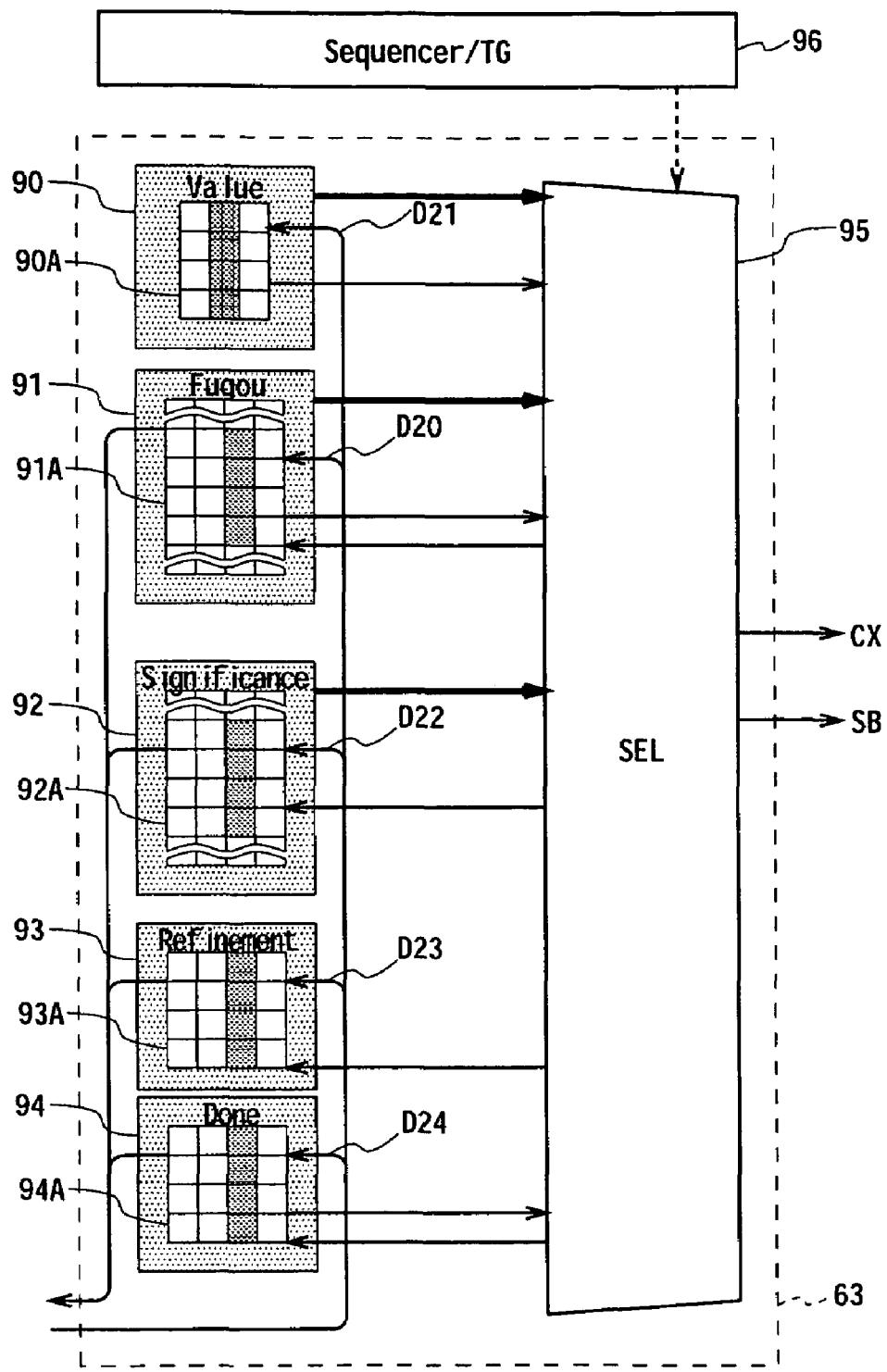
FIG. 31 is a block diagram showing the overview configuration of a CU pass encoding processing portion of the encoding apparatus.
Figure 3:
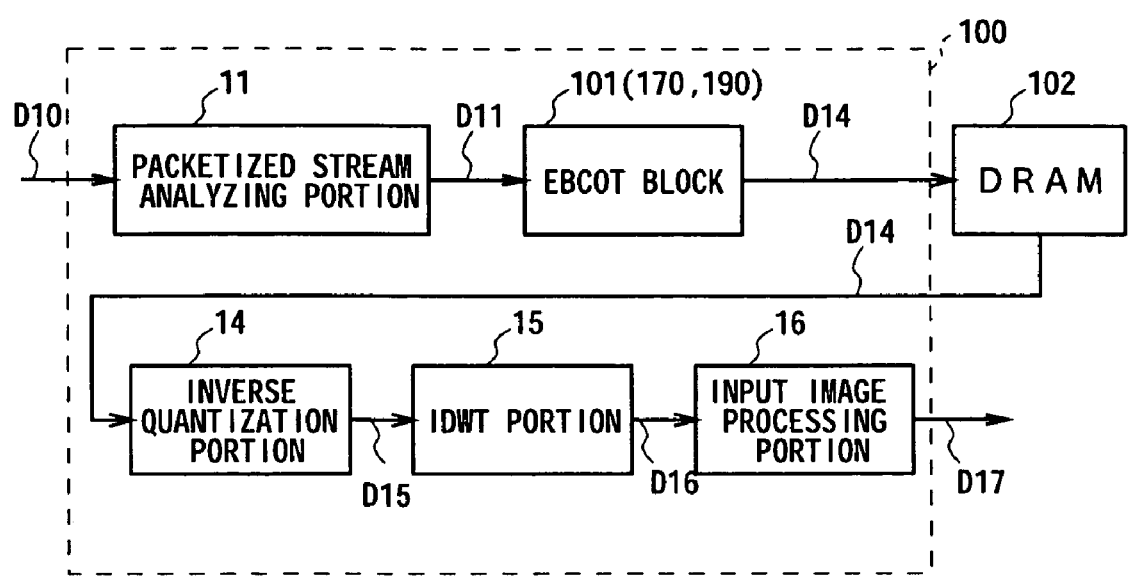

As shown in FIG. 31, the CU pass encoding processing portion 63 is comprised of a processing bit shift register portion 90, a positive and negative sign shift register portion 91, an SIG shift register portion 92, an REF shift register portion 93, a DONE shift register portion 94 and a selector 95 of the hardware configuration and a control portion 96 for exerting output switch control over the selector 95 as described later.

The processing bit shift register portion 90 has a shift register 90A of three stages provided thereto, and the positive and negative sign shift register portion 91, SIG shift register portion 92, REF shift register portion 93 and DONE shift register portion 94 have shift registers 91A to 94A of four stages provided thereto respectively.

Thus, the CU pass encoding processing portion 63 can store and hold three or four sample equivalents of each of the processing bit plane data D21, positive and negative sign plane data D20, SIG plane data D22, REF plane data D23 and DONE plane data D24 which are sequentially given from the signal switcher 60 by one sample equivalent each at a time while sequentially shifting them among the shift registers 90A to 94A of the processing bit shift register portion 90, positive and negative sign shift register portion 91, SIG shift register portion 92, REF shift register portion 93 and DONE shift register portion 94.

And if one sample equivalent of the processing bit plane data D21 is given from the signal switcher 60 (FIG. 26), the processing bit shift register portion 90 then outputs one sample equivalent of the processing bit plane data D21 shifted to the second stage of its shift register 90A to the selector 95.

In synchronization therewith, the SIG shift register portion 92 in this case detects whether or not a run-length process can be performed as to the four pixels shifted to the second stage of the shift register 90A of the processing bit shift register portion 90 by using the SIG plane data D22 stored and held in its shift register 92A while referring to the DONE plane data D24 stored and held in the shift register 94A of the DONE shift register portion 94.

In the case where the run-length process cannot be performed, the above-mentioned SP pass encoding process is sequentially performed to each of the four pixels.

As opposed to this, in the case where the run-length process can be performed, the SIG shift register portion 92 first outputs "run" as the context as to FIGS. 23 and 24 according to the above-mentioned rule. And if all the values of the four pixels in the sample are '0,' the SIG shift register portion 92 outputs 0 as the symbol SB. Thus, the context CX and symbol SB are sent to the output switcher 64 (FIG. 26) via the selector 95.

And if all the values of the four pixels in the sample are not 0, that is, if even one pixel of which value is 1 exists among the four pixels, the SIG shift register portion 92 outputs 1 as the symbol SB and subsequently the context CX "uniform" and the symbol SB corresponding thereto twice according to the rule described above about FIG. 21. Thus, the context CX and symbol SB are sent to the output switcher 64 (FIG. 26) via the selector 95.

At this time, the SIG shift register portion 92 has the values of the bits at the same coordinates as the pixel of which value is 1 in the SIG plane data D22 stored and held in its shift register 92A updated to '1' representing that it is "Significant." And the REF shift register portion 93 has the values of the bits at the same coordinates as the pixel in the REF plane data D23 stored and held in its shift register 93A updated to '1' representing that it has become "Significant."

Furthermore, the positive and negative sign shift register portion 91 calculates the symbol SB of the positive and negative signs and context CX about the pixel according to the rule described above as to FIG. 17 thereafter so as to send the calculation result to the selector 95. Thus, the symbol SB and context CX are sent to the output switcher 64 (FIG. 26) via the selector 95 by following the above-mentioned context CX "uniform" and the symbol SB corresponding to the pixel.

Thereafter, the update information is given from the selector 95 to the DONE shift register portion 94. Based on this update information, the values of the bits at the same coordinates as the pixel in the DONE plane data D24 stored and held in the shift register 94A of the DONE shift register portion 94 are updated to '1' so as to complete the CU pass encoding process for the pixel.

Furthermore, concerning the pixels later in the scan order in the bit plane than the pixel in the same sample (one sample stored and held in the second stage of the shift register 90A of the processing bit shift register portion 90 at the time), the CU pass encoding processing portion 63 performs the above-mentioned SP pass encoding process thereafter while sequentially updating the SIG plane data D22, REF plane data D23 and DONE plane data D24 stored and held in the shift registers 92A to 94A of the SIG shift register portion 92, REF shift register portion 93 and DONE shift register portion 94 as required respectively. And the CU pass encoding processing portion 63 finishes such a process to all the pixels in the sample so as to complete the process for the sample.

And the CU pass encoding processing portion 63 sequentially repeats the same process every time a next one sample equivalent of the processing bit plane data D21 is given from the signal switcher 60 according to a transfer request for the next one sample equivalent of the processing bit plane data D21 given from the control portion 96 to the control portion 65 (FIG. 26).

In this case, every time the next one sample equivalent of the processing bit plane data D21 is given, the CU pass encoding processing portion 63 provides the SIG plane data D22, REF plane data D23 and DONE plane data D24 stored and held in the fourth stage of the shift registers 92A to 94A of the SIG shift register portion 92, REF shift register portion 93 and DONE shift register portion 94 to the corresponding SRAMs 52A and 52B via the signal switcher 60 respectively so as to have them written back to their original positions in the SRAMs 52A and 52B.

Thus, the CU pass encoding processing portion 63 can perform the CU pass encoding process to the processing bit plane data D21 stored in the processing bit plane buffers 51A and 51B.

(2-2) Configuration of a Decoding Apparatus 100 According to the First Embodiment (2-2-1) Overall Configuration of the Decoding Apparatus 100

FIG. 32 indicates the portions corresponding to FIG. 3 by giving them the same symbols, and shows the decoding apparatus 100 according to this embodiment in compliance with the JPEG 2000 standard. The decoding apparatus 100 has the same configuration as the decoding apparatus 10 shown in FIG. 3 except that it is rendered as the Integrated Circuit (IC) as a whole, an EBCOT block 101 has a different configuration, and a DRAM 102 for storing and holding the code block data D14 outputted from the EBCOT block 101 is provided outside the IC.

Figure 33:
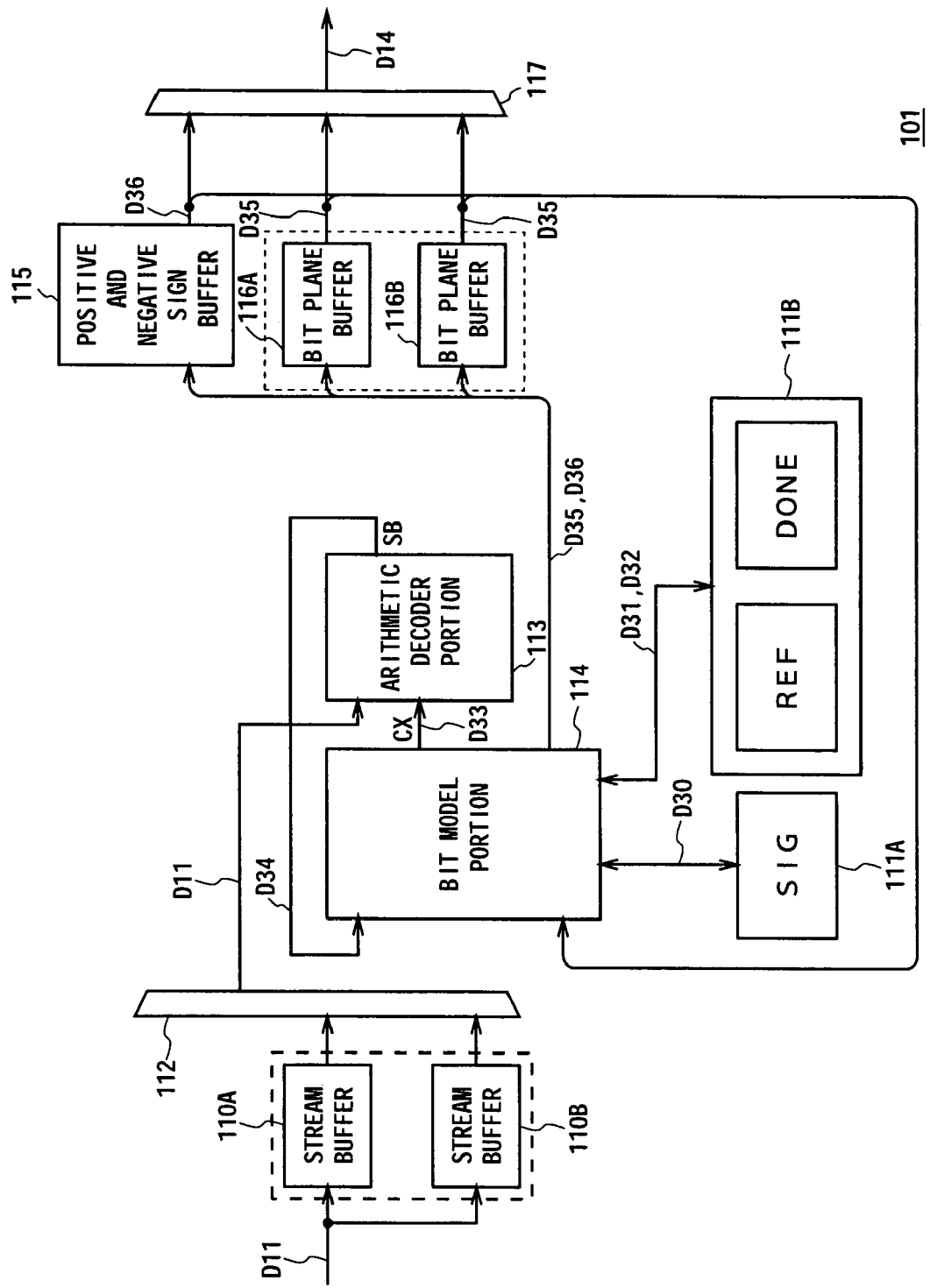
FIG. 33 is a block diagram showing the configuration of the EBCOT block of the decoding apparatus shown in FIG. 32.

As shown in FIG. 33, the EBCOT block 101 has stream buffers 110A and 110B comprised of SRAMs respectively provided at an input stage so that the stream buffers 110A and 110B can store and hold encoded data D11 given from a packetized stream analyzing portion 11.

In this case, two sets of the stream buffers 110A and 110B are provided so that, while CBM-processing one sheet equivalent of the encoded data D11 of the bit plane 22 stored and held in one set of stream buffers 110A and 110B, a next sheet equivalent of the encoded data D11 of the bit plane 22 can be written to the other set of stream buffers 110A and 110B.

The EBCOT block 101 has an SRAM 111A having a data storage capacity equivalent to at least 1 bit plane and an SRAM 111B having a data storage capacity equivalent to at least 2 bit planes. It is thereby possible to store and hold SIG plane data D30 to be used on the CBM-processing in the SRAM 52A and store and hold REF plane data D31 and DONE plane data D32 in the SRAM 52B.

The encoded data D11 stored and held in the stream buffers 110A and 110B is sequentially read in a predetermined unit by an arithmetic decoder portion 113 via a switcher 112. And the arithmetic decoder portion 113 performs a predetermined arithmetic decoding calculation process with the read encoded data D11 and context data D33 provided from a bit model portion 114 in a subsequent stage as inputs, and sends symbol data D34 thus obtained to the bit model portion 114.

The bit model portion 114 renders supplied symbol data D34 as the coefficient bit model by using the CBM-processing. In this case, the bit model portion 114 sequentially stores processing bit plane data D35 and positive and negative sign plane data D36 sequentially decoded by a decoding process with the SP pass (hereafter, referred to as an SP pass decoding process), a decoding process with the MR pass (hereafter, referred to as an MR pass decoding process) and a decoding process with the CU pass (hereafter, referred to as a CU pass decoding process) at corresponding positions in bit plane buffers 116A, 116B or a positive and negative sign plane buffer 115 comprised of SRAMs each in the subsequent stages respectively.

The bit model portion 114 sequentially updates the SIG plane data D30, REF plane data D31 and DONE plane data D32 stored and held in the SRAMs 111A and 111B along with it as required. Furthermore, while doing so, the bit model portion 114 performs the CBM processing by using the processing bit plane data D35, positive and negative sign plane data D36, SIG plane data D30, REF plane data D31 and DONE plane data D32 which are partially decoded. At this time, the bit model portion 114 sequentially sends the context data D33 obtained together with the processing bit plane data D35 to the arithmetic decoder portion 113 as described above.

The processing bit plane data D35 finally decoded by such CBM processing is stored and held in the first or second bit plane buffer 116A or 116B, and the finally decoded positive and negative sign plane data D36 is stored and held in the positive and negative sign plane buffer 115. They are read in predetermined timing thereafter, and are given to the above-mentioned DRAM 102 (FIG. 32) as the code block data D14 via a switcher 117 so as to be stored and held.

Furthermore, the code block data D14 stored and held in the DRAM 102 is read to an inverse quantization portion 14 (FIG. 32) thereafter to undergo a predetermined inverse quantization process.

Thus, the decoding apparatus 100 can decode the code block data D14 by sequentially CBM-processing the encoded data D11 given from the packetized stream analyzing portion 11 and perform the process in the subsequent stage while storing and holding it in the DRAM 41 provided outside the IC.

(2-2-2) Configuration of the Bit Model Portion 114

Figure 34:
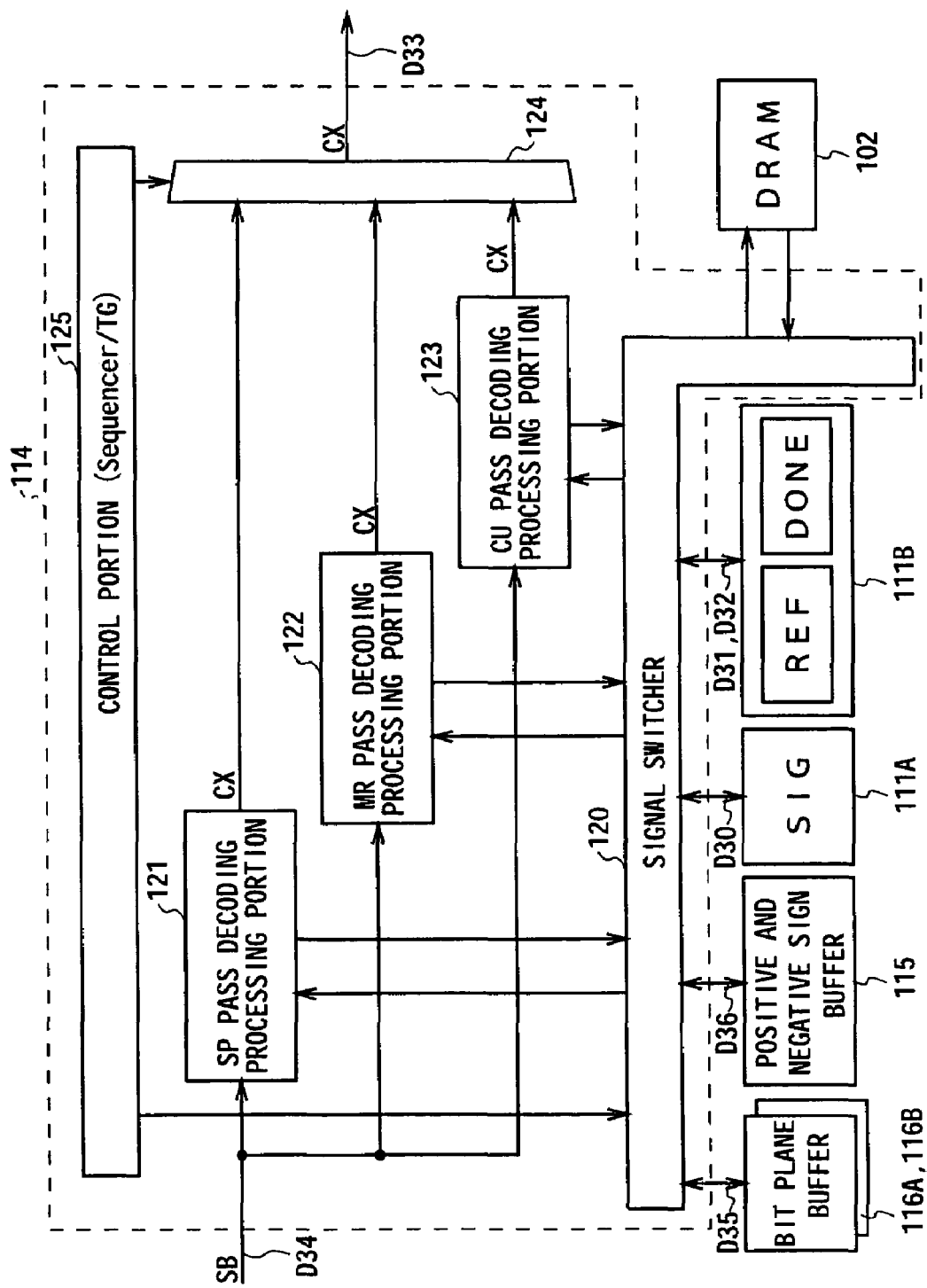
FIG. 34 is a block diagram showing the configuration of the bit model portion of the EBCOT block shown in FIG. 33.

Here, as shown in FIG. 34, the bit model portion 114 is comprised of a signal switcher 120, an SP pass decoding processing portion 121, an MR pass decoding processing portion 122, a CU pass decoding processing portion 123 and an output switcher 124 and a control portion 125.

In this case, the above-mentioned arithmetic decoder portion 113 (FIG. 33) performs the predetermined arithmetic decoding calculation process based on the encoded data D11 read from the stream buffers 110A and 110B and the context data D33 provided from the SP pass decoding processing portion 121, the MR pass decoding processing portion 122 or the CU pass decoding processing portion 123. Of the symbol data D34 subsequently obtained, the arithmetic decoder portion 113 sends to the SP pass decoding processing portion 121 the data acquired by performing the above-mentioned arithmetic decoding process to the encoded data D11 obtained by performing the SP pass encoding process in the encoding apparatus 40 (FIG. 22).

In this case, the signal switcher 120 sequentially reads from the bit plane buffers 116A and 116B the processing bit plane data D35 before decoding or partially decoded stored and held in the bit plane buffers 116A and 116B word by word with the four pixels constituting one stripe column 23A shown in FIG. 25A as one word in compliance with the scan order in the bit plane under control of the control portion 125 having functions of a sequencer and a timing generator so as to send it first to the SP pass decoding processing portion 121.

In synchronization therewith, the signal switcher 120 sequentially reads from the positive and negative sign plane buffer 115 the positive and negative sign plane data D36 before decoding or partially decoded of the 4 bits and upper and lower bits thereof (6 bits in total, refer to FIG. 27C) on the positive and negative sign plane 30 at the same coordinates as the four pixels required on decoding by the SP pass decoding process the processing bit plane data D35 equivalent to the four pixels read from the bit plane buffers 116A and 116B so as to send it to the SP pass decoding processing portion 121.

In this case, the positive and negative sign plane buffer 115 has the positive and negative sign plane data D36 stored therein with the four pixels corresponding to each stripe column 23A of the processing bit plane 22 as a unit (1 word), and is constituted to be able to read and write the positive and negative sign plane data D36 in this word unit. Therefore, as against the positive and negative sign plane data D36 of total 6 bits required on performing the SP pass decoding process to the processing bit plane data D35 equivalent to the four bits read from the bit plane buffers 116A and 116B, the signal switcher 120 in this case sequentially reads from the positive and negative sign plane buffer 115 the positive and negative sign plane data D36 of the 4 bits constituting one stripe column 23A on the positive and negative sign plane at the same coordinates as the four pixels in reality and the positive and negative sign plane data D36 of the 4 bits constituting the upper and lower stripe columns 23A thereof respectively by taking three clocks (FIG. 28) so as to send it to the SP pass decoding processing portion 121.

Furthermore, in synchronization therewith, signal switcher 120 sequentially reads from the SRAM 111A the SIG plane data D30 of the 4 bits and upper and lower bits thereof (6 bits in total, refer to FIG. 25B) on the SIG plane 31 at the same coordinates as the four pixels required on decoding the processing bit plane data D35 equivalent to the four pixels by the SP pass decoding process so as to send it to the SP pass decoding processing portion 121.

In this case, the SRAM 52A also has the SIG plane data D30 stored therein with the four pixels corresponding to each stripe column 23A of the processing bit plane 22 as a unit (word), and is constituted to be able to read and write the SIG plane data D30 in this word unit. Therefore, as against the SIG plane data D30 of total 6 bits required on performing the SP pass decoding process to the processing bit plane data D35 equivalent to the four pixels read from the bit plane buffers 116A and 116B, the signal switcher 120 in this case sequentially reads from the SRAM 111A the SIG plane data D30 of the 4 bits on the SIG plane 31 at the same coordinates as the four pixels in reality respectively and the SIG plane data D30 of the upper 4 bits and lower 4 bits thereof by taking three clocks so as to send it to the SP pass decoding processing portion 121.

Furthermore, in synchronization therewith, the signal switcher 120 sequentially reads from the SRAM 111B the REF plane data D31 of the 4 bits (refer to FIG. 27E) on the REF plane 32 at the same coordinates as the four pixels respectively and the DONE plane data D32 of the 4 bits (refer to FIG. 27D) on the DONE plane 33 at the same coordinates as the four pixels required on decoding the processing bit plane data D35 equivalent to the four pixels by the SP pass decoding process so as to send it to the SP pass decoding processing portion 121.

In this case, the SRAM 111B also has the REF plane data D31 and DONE plane data D32 stored therein with the four pixels corresponding to each stripe column 23A of the processing bit plane 22 as a unit (word), and is constituted to be able to read and write the REF plane data D31 and DONE plane data D32 in this word unit. Therefore, the signal switcher 120 reads the REF plane data D31 or DONE plane data D32 of the 4 bits from the SRAM 111B by one clock respectively so as to send it to the SP pass decoding processing portion 121.

In this case, the SP pass decoding processing portion 121 can store and hold at least three past samples of each of the processing bit plane data D35 equivalent to the four pixels and the positive and negative sign plane data D36, SIG plane data D30, REF plane data D31 and DONE plane data D32 corresponding thereto sequentially supplied from the signal switcher 120.

Here, one word is equivalent to one sample as to the processing bit plane data D35, REF plane data D31 and DONE plane data D32, and vertically arranged three words are equivalent to one sample as to the positive and negative sign plane data D36 and SIG plane data D30.

And if the symbol data D34 equivalent to one sample is given from the arithmetic decoder portion 113, the SP pass decoding processing portion 121 detects whether or not the SP pass decoding process is possible and performs the SP pass decoding process if possible as to the symbol data D34 equivalent to one sample (equivalent to four pixels) stored and held then in the heavy-line frame in FIG. 27A by using the SIG plane data D30, positive and negative sign plane data D36, REF plane data D31 and DONE plane data D32 in the heavy-line frames in FIGS. 30B to 30E respectively.

And in the case where the SP pass decoding process is performed, the SP pass decoding processing portion 121 sends the context CX obtained on this occasion to the arithmetic decoder portion 113 (FIG. 33) as the context data D33 via the output switcher 124 as described above and also sends the decoded processing bit plane data D35 and the decoded positive and negative sign plane data D36 obtained together therewith to the corresponding positions in the bit plane buffers 116A and 116B or the positive and negative sign plane buffer 115.

And in the case where the SP pass decoding process is performed, the SP pass decoding processing portion 121 updates the SIG plane data D30, REF plane data D31 and/or DONE plane data D32 accordingly, and provides them to the corresponding SRAMs 111A and 111B via the signal switcher 120 thereafter so as to have the SIG plane data D30, REF plane data D31 and DONE plane data D32 written back to their original positions in the SRAMs 111A and 111B respectively (Read-Modify-Write).

Of the encoded data D11 read from the stream buffers 110A and 110B, the arithmetic decoder portion 113 (FIG.

33) sends to the MR pass decoding processing portion 122 the symbol data D34 acquired by performing the above-mentioned arithmetic decoding calculation process to the encoded data D11 obtained by performing the MR pass encoding process in the encoding apparatus 40 (FIG. 24).

In this case, the signal switcher 120 sequentially reads from the bit plane buffers 116A and 116B the processing bit plane data D35 partially decoded by a preceding SP pass decoding process and stored and held in the bit plane buffers 116A and 116B word by word with the four pixels constituting one stripe column 23A shown in FIG. 27A as one word in compliance with the scan order in the bit plane under control of the control portion 125 so as to send it to the MR pass decoding processing portion 122.

In synchronization therewith, the signal switcher 120 sequentially reads from the SRAM 111A the SIG plane data D30 of the 4 bits and upper and lower bits thereof (6 bits in total, refer to FIG. 27B) on the SIG plane 31 at the same coordinates as the four pixels respectively required on decoding by the MR pass decoding process the processing bit plane data D35 equivalent to the four pixels read from the bit plane buffers 116A and 116B so as to send it to the MR pass decoding processing portion 122.

In this case, as against the SIG plane data D30 of total 6 bits required on performing the MR pass decoding process to the processing bit plane data D35 equivalent to the four pixels read from the bit plane buffers 116A and 116B, the signal switcher 120 sequentially reads from the SRAM 111A the SIG plane data D30 of the 4 bits on the SIG plane 31 at the same coordinates as the four pixels in reality respectively and the SIG plane data D30 of the upper 4 bits and lower 4 bits thereof respectively by taking three clocks so as to send it to the MR pass decoding processing portion 122.

Furthermore, in synchronization therewith, the signal switcher 120 sequentially reads from the SRAM 111B the REF plane data D31 equivalent to one word (refer to FIG. 27E) on the REF plane 32 at the same coordinates as the four pixels and the DONE plane data D32 equivalent to one word (refer to FIG. 25D) on the DONE plane 33 at the same coordinates as the four pixels required on decoding by the MR pass decoding process the processing bit plane data D35 equivalent to the four pixels so as to send it to the MR pass decoding processing portion 122.

In this case, the MR pass decoding processing portion 122 can store and hold at least three past samples of each of the processing bit plane data D35 equivalent to the four pixels and the SIG plane data D30, REF plane data D31 and DONE plane data D32 corresponding thereto sequentially supplied from the signal switcher 120.

Here, one word is equivalent to one sample as to the processing bit plane data D35, REF plane data D31 and DONE plane data D32, and vertically arranged three words are equivalent to one sample as to the positive and negative sign plane data D36 and SIG plane data D30.

And if the symbol data D34 equivalent to one sample is given from the arithmetic decoder portion 113, the MR pass decoding processing portion 122 detects whether or not the MR pass decoding process is possible and performs the MR pass decoding process if possible as to the symbol data D34 equivalent to one sample (equivalent to four pixels) stored and held then in the heavy-line frame in FIG. 27A by using the SIG plane data D30, REF plane data D31 and DONE plane data D32 stored and held then in the heavy-line frames in FIGS. 30B, 30D and 30E respectively and the symbol data D34 given then by the arithmetic decoder portion 113.

And in the case where the MR pass decoding process is performed, the MR pass decoding processing portion 122 sends the context CX obtained on this occasion to the arithmetic decoder portion 113 (FIG. 33) as the context data D33 via the output switcher 124 as described above and also stores the decoded processing bit plane data D35 obtained together therewith at the corresponding positions in the bit plane buffers 116A and 116B.

Furthermore, in the case where the MR pass decoding process is performed, the MR pass decoding processing portion 122 updates the SIG plane data D30, REF plane data D31 and/or DONE plane data D32 accordingly, and provides them to the corresponding SRAMs 111A and 111B via the signal switcher 120 thereafter so as to have the SIG plane data D30, REF plane data D31 and DONE plane data D32 written back to their original positions in the SRAMs 111A and 111B respectively (Read-Modify-Write).

Likewise, of the encoded data D11 read from the stream buffers 110A and 110B, the arithmetic decoder portion 113 (FIG. 33) sends to the CU pass decoding processing portion 123 the symbol data D34 acquired by performing the predetermined arithmetic decoding calculation process to the encoded data D11 obtained by performing the CU pass encoding process in the encoding apparatus 40 (FIG. 24).

In this case, the signal switcher 120 sequentially reads from the bit plane buffers 116A and 116B the processing bit plane data D35 partially decoded by the preceding SP pass decoding process and MR pass decoding process (except the case of the decoding process for the top bit plane 22T) stored and held in the bit plane buffers 116A and 116B word by word with the four pixels constituting one stripe column 23A shown in FIG. 27A as one word in compliance with the scan order in the bit plane under control of the control portion 125 so as to send it to the CU pass decoding processing portion 123.

In synchronization therewith, the signal switcher 120 sequentially reads from the positive and negative sign plane buffer 115 the positive and negative sign plane data D36 before decoding or partially decoded of the 4 bits and upper and lower bits thereof (6 bits in total, refer to FIG. 27C) on the positive and negative sign plane 30 at the same coordinates as the four pixels respectively required on decoding by the CU pass decoding process the processing bit plane data D35 equivalent to the four pixels read from the bit plane buffers 116A and 116B so as to send it to the CU pass decoding processing portion 123.

In this case, as against the positive and negative sign plane data D36 of total 6 bits required on performing the CU pass decoding process to the processing bit plane data D35 equivalent to the four pixels read from the bit plane buffers 116A and 116B, the signal switcher 120 sequentially reads from the positive and negative sign plane buffer 115 the positive and negative sign plane data D36 of the 4 bits constituting one stripe column 23A on the positive and negative sign plane 30 at the same coordinates as the four pixels in reality respectively and the positive and negative sign plane data D36 of the 4 bits constituting the upper and lower stripe columns 23A thereof respectively by taking three clocks as with the above-mentioned SP pass decoding processing portion 121 so as to send it to the CU pass decoding processing portion 123.

Furthermore, in synchronization therewith, the signal switcher 120 sequentially reads from the SRAM 111A the SIG plane data D30 equivalent to the 4 bits and upper and lower bits thereof (6 bits in total, refer to FIG. 27B) on the SIG plane 31 at the same coordinates as the four pixels required on decoding the processing bit plane data D35 equivalent to the four pixels by the CU pass decoding process so as to send it to the CU pass decoding processing portion 123.

In this case, as against the SIG plane data D30 of total 6 bits required on performing the CU pass decoding process to the processing bit plane data D35 equivalent to the four pixels read from the bit plane buffers 116A and 116B, the signal switcher 120 sequentially reads from the SRAM 111A the SIG plane data D30 of the 4 bits on the SIG plane 31 at the same coordinates as the four pixels in reality respectively and the SIG plane data D30 of the upper 4 bits and lower 4 bits thereof respectively by taking three clocks so as to send it to the CU pass decoding processing portion 123.

Furthermore, in synchronization therewith, the signal switcher 120 sequentially reads from the SRAM 111B the REF plane data D31 equivalent to one word (refer to FIG. 27E) on the REF plane 32 at the same coordinates as the four pixels and the DONE plane data D32 equivalent to one word (refer to FIG. 27D) on the DONE plane 33 at the same coordinates as the four pixels required on decoding the processing bit plane data D35 equivalent to the four pixels by the CU pass decoding process so as to send it to the CU pass decoding processing portion 123.

In this case, the CU pass decoding processing portion 123 can store and hold at least three past samples of each of the processing bit plane data D35 equivalent to the four pixels and the positive and negative sign plane data D36, SIG plane data D30, REF plane data D31 and DONE plane data D32 corresponding thereto sequentially supplied from the signal switcher 120.

Here, one word is equivalent to one sample as to the processing bit plane data D35, REF plane data D31 and DONE plane data D32, and vertically arranged three words are equivalent to one sample as to the positive and negative sign plane data D36 and SIG plane data D30.

And if the symbol data D34 equivalent to one symbol is given from the arithmetic decoder portion 113, the CU pass decoding processing portion 123 detects whether or not the CU pass decoding process is possible and performs the CU pass decoding process if possible and the SP pass decoding process if impossible as to the symbol data D34 equivalent to one sample (equivalent to four pixels) stored and held then in the heavy-line frame in FIG. 27A by using the SIG plane data D30, positive and negative sign plane data D36, REF plane data D31 and DONE plane data D32 stored and held then in the heavy-line frames in FIGS. 30B to 30E respectively and the symbol data D34 given then by the arithmetic decoder portion 113.

And in the case where the CU pass decoding process or the SP pass decoding process is performed, the CU pass decoding processing portion 123 sends the context CX obtained on this occasion to the arithmetic decoder portion 113 (FIG. 33) as the context data D33 via the output switcher 124 as described above and also stores the decoded processing bit plane data D35 and the decoded positive and negative sign plane data D36 obtained together therewith at the corresponding positions in the bit plane buffers 116A, 116B or the positive and negative sign plane buffer 115 respectively.

Furthermore, in the case where the CU pass decoding process or the SP pass decoding process is performed, the CU pass decoding processing portion 123 updates the SIG plane data D30, REF plane data D31 and/or DONE plane data D32 accordingly, and provides them to the corresponding SRAMs 111A and 111B via the signal switcher 120 thereafter so as to have the SIG plane data D30, REF plane data D31 and DONE plane data D32 written back to their original positions in the SRAMs 111A and 111B respectively (Read-Modify-Write).

Thus, as with the bit model portion 54 (FIG. 26) of the above-mentioned encoding apparatus 40 (FIG. 24), the bit model portion 114 performs the SP pass decoding process, MR pass decoding process and CU pass decoding process with the four pixels constituting the stripe column 23A on the processing bit plane 22 to be decoded as a unit. At this time, it also renders the 4 bits constituting the stripe column 23A as a memory word as to the positive and negative sign plane data D36 and SIG plane data D30 so as to dramatically reduce the number of times of memory access and perform the CBM processing securely and at high speed.

(2-2-3) Concrete Configurations of the Coding Pass Processing Portions

Next, the configurations of the SP pass decoding processing portion 121, MR pass decoding processing portion 122 and CU pass decoding processing portion 123 will be described in turn.

(2-2-3-1) Configuration of the SP Pass Decoding Processing Portion 121

Figure 35:
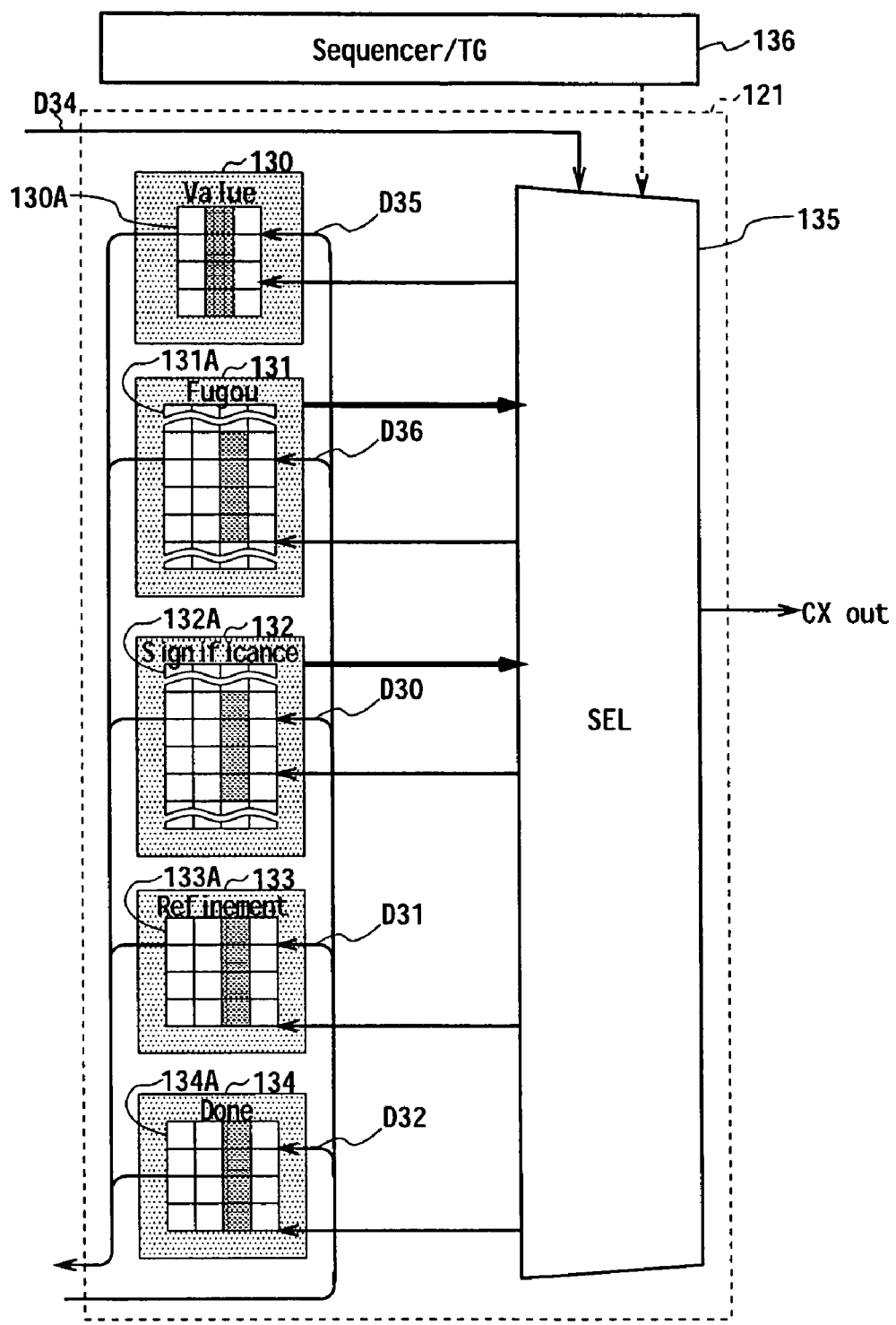
FIG. 35 is a block diagram showing the overview configuration of an SP pass decoding processing portion of the decoding apparatus.
Figure 3:
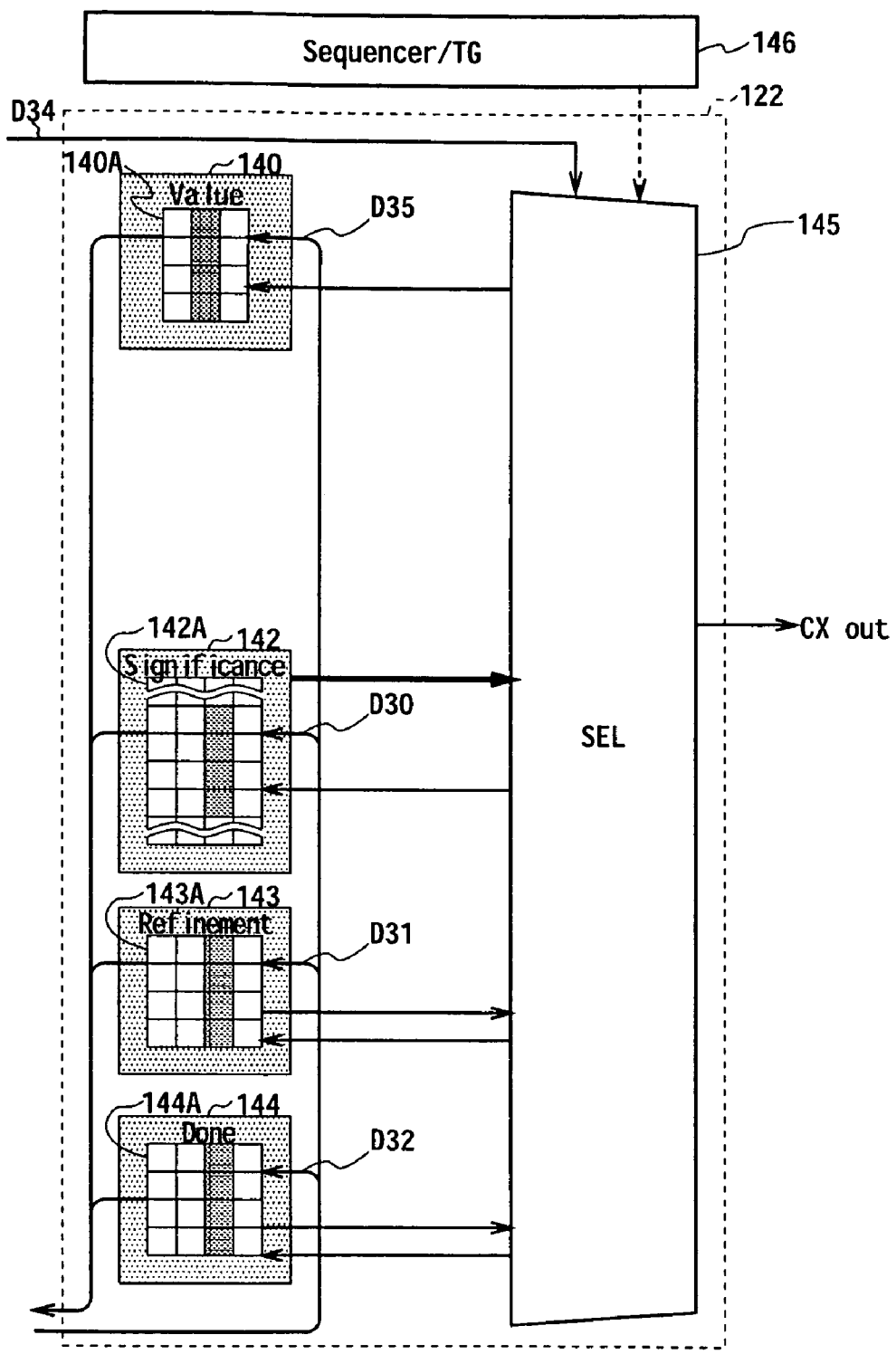

As shown in FIG. 35, the SP pass decoding processing portion 121 is comprised of a processing bit shift register portion 130, a positive sign shift register portion 131, an SIG shift register portion 132, an REF shift register portion 133, a DONE shift register portion 134 and a selector 135 of the hardware configuration and a control portion 136 for exerting the output switch control over the selector 135 described later.

The processing bit shift register portion 130 has a shift register 130A of three stages provided thereto, and the positive and negative sign shift register portion 131, SIG shift register portion 132, REF shift register portion 133 and DONE shift register portion 134 have shift registers 131A to 134A of four stages provided thereto respectively.

Thus, the SP pass decoding processing portion 121 can store and hold three or four sample equivalents of each of the processing bit plane data D35, positive and negative sign plane data D36, SIG plane data D30, REF plane data D31 and DONE plane data D32 which are sequentially given from the signal switcher 120 (FIG. 34) by one sample equivalent each at a time while sequentially shifting them among the shift registers 130A to 134A of the processing bit shift register portion 130, positive and negative sign shift register portion 131, SIG shift register portion 132, REF shift register portion 133 and DONE shift register portion 134.

And if one symbol equivalent of the symbol data D34 is given from the arithmetic decoder portion 113, the SIG shift register portion 132 detects whether or not each of the four pixels shifted to the second stage of its shift register 130A of the processing bit shift register portion 130 meets the conditions for performing the above-mentioned SP pass decoding process in parallel for each pixel by using the SIG plane data D30 stored and held in its shift register 132A so as to output the detection result to the selector 135.

In synchronization therewith, the SIG shift register portion 132 calculates the context CX about every four pixels shifted to the second stage of the shift register 130A of the processing bit shift register portion 130 according to the rule described about FIG. 16 so as to output the calculation result to the selector 135.

And in the case where all the results of the detection by the SIG shift register portion 132 as to whether or not the four pixels shifted to the second stage of the shift register 130A of the processing bit shift register portion 130 meet the conditions for performing the SP pass decoding process are negative, nothing is outputted from the selector 135 and the process for one sample (four pixels) equivalent of the processing bit plane data D35 shifted to the second stage of the shift register 130A of the processing bit shift register portion 130 is completed.

And a next one sample equivalent of the processing bit plane data D35 is given from the signal switcher 120 (FIG. 34) to the SP pass decoding processing portion 121 according to the transfer request given from the control portion 136 to the control portion 125 (FIG. 34) of the entire bit model portion 114. Thus, the SP pass decoding processing portion 121 thereby starts the same process as to the one sample (four pixels) equivalent of the processing bit plane data D35 shifted to the second stage of the processing bit shift register portion 130.

As opposed to this, in the case where the detection result of any pixel of the one samples shifted to the second stage of the shift register 130A of the processing bit shift register portion 130 (hereafter, referred to as an SP pass decoding process subject pixel) is positive, a data value (0/1) of the symbol data D34 given from the arithmetic decoder portion 113 then is stored in a bit corresponding to the SP pass decoding process subject pixel in the shift register 130A of the processing bit shift register portion 130. In conjunction with it, the calculation result of the context CX about the SP pass decoding process subject pixel outputted from the SIG shift register portion 132 is outputted from the selector 135 and is given to the arithmetic decoder portion 113.

Furthermore, in the case where the data value of the symbol data D34 (decoded value of the SP pass decoding process subject pixel) is '0,' of the DONE plane data D32 stored and held in the shift register 134A of the DONE shift register portion 134 based on the update information given thereafter from the selector 135 to the DONE shift register portion 134, the values of the bits at the same coordinates as the SP pass decoding process subject pixel are updated to '1' representing the completion of the bit modeling so as to complete the SP pass decoding process for the SP pass decoding process subject pixel.

As opposed to this, in the case where the data value of the symbol data D34 is '1,' that information is given to the SIG shift register portion 132, REF shift register portion 133 and positive and negative sign shift register portion 131 respectively. And subsequently, the symbol data D34 equivalent to one symbol given from the arithmetic decoder portion 113 (FIG. 34) is given to the positive and negative sign shift register portion 131.

At this time, the SIG shift register portion 132 has the values of the bits at the same coordinates as the SP pass encoding process subject pixel in the SIG plane data D30 stored and held in its shift register 132A updated to '1' representing that it is "Significant." And the REF shift register portion 133 has the values of the bits at the same coordinates as the SP pass decoding process subject pixel in the REF plane data D31 stored and held in its shift register 133A updated to '1' representing that it has become "Significant."

Furthermore, the positive and negative sign shift register portion 131 in this case decodes the positive and negative signs of the SP pass encoding process subject pixel based on the data value (0/1) of the supplied symbol data D34 and stores a positive and negative sign bit thus obtained at a position corresponding to the SP pass decoding process subject pixel in its shift register 131A. It also calculates the context CX about the positive and negative sign bit of the SP pass decoding process subject pixel according to the rule described above as to FIG. 17 so as to output the calculation result to the selector 135. Thus, the context CX is given to the arithmetic decoder portion 113 via the selector 135.

Thereafter, the update information is given from the selector 135 to the DONE shift register portion 134. Based on this update information, the values of the bits at the same coordinates as the SP pass decoding process subject pixel in the DONE plane data D32 stored and held in the shift register 134A of the DONE shift register portion 134 are updated to '1' so as to complete the SP pass decoding process for the SP pass decoding process subject pixel.

And the SP pass decoding processing portion 121 sequentially repeats the same process every time one symbol equivalent of the symbol data D34 is given from the arithmetic decoder portion 113.

In this case, every time one sample equivalent of the processing bit plane data D35 is given from the signal switcher 120, the SP pass decoding processing portion 121 provides the processing bit plane data D35 stored and held in the third stage of the shift register 130A of the processing bit shift register portion 130 and the positive and negative sign plane data D36 stored and held in the fourth stage of the shift register 131A of the positive and negative sign shift register portion 131 to the bit plane buffers 116A, 116B or positive and negative sign plane buffer 115 corresponding thereto via the signal switcher 120 respectively to have them written back to their original address positions. And the SP pass decoding processing portion 121 also provides the SIG plane data D30, REF plane data D31 and DONE plane data D32 stored and held in the fourth stages of the shift registers 132A to 134A of the SIG shift register portion 132, REF shift register portion 133 and DONE shift register portion 134 to the SRAMs 111A and 111B corresponding thereto via the signal switcher 120 respectively so as to have them written back to their original address positions.

Thus, the SP pass decoding processing portion 121 can perform the SP pass decoding process based on the symbol data D34 sequentially provided from the arithmetic decoder portion 113.

(2-2-3-2) Configuration of the MR Pass Decoding Processing Portion 122

As shown in FIG. 36, the MR pass decoding processing portion 122 is comprised of a processing bit shift register portion 140, an SIG shift register portion 142, an REF shift register portion 143, a DONE shift register portion 144 and a selector 145 of the hardware configuration and a control portion 146 for exerting the output switch control over the selector 145 described later.

The processing bit shift register portion 140 has a shift register 140A of three stages provided thereto, and the SIG shift register portion 142, REF shift register portion 143 and DONE shift register portion 144 have shift registers 142A to 144A of four stages provided thereto respectively.

Thus, the MR pass decoding processing portion 122 can store and hold three or four sample equivalents of each of the processing bit plane data D35, SIG plane data D30, REF plane data D31 and DONE plane data D32 which are sequentially given from the signal switcher 120 (FIG. 34) by one sample equivalent each at a time while sequentially shifting them among the shift registers 140A, 142A to 144A of the processing bit shift register portion 140, SIG shift register portion 142, REF shift register portion 143 and DONE shift register portion 144.

And if one symbol equivalent of the symbol data D34 is given from the arithmetic decoder portion 113, the REF shift register portion 143 and DONE shift register portion 144 then output one sample equivalent of the REF plane data D31 or the DONE plane data D32 shifted to the second stage of its shift registers 143A and 144A to the selector 145.

At this time, the SIG shift register portion 142 calculates the context CX about the four pixels shifted to the second stage of the processing bit shift register portion 140 according to the above-mentioned rule described about FIG. 19 by using the SIG plane data D30 stored and held in its shift register 142A while referring to the output of the REF shift register portion 143 so as to output the calculation result to the selector 145.

In the case where all the values of the DONE plane data D32 are '1' (that is, processed) then, nothing is outputted from the selector 145 and the process for one sample equivalent of the processing bit plane data D35 shifted to the second stage of the shift register 140A of the processing bit shift register portion 140 is finished.

And in the case where any data value of the one sample equivalent of the DONE plane data D32 is '0' (that is, unprocessed) and the pixel shifted to the second stage of the shift register 140A of the processing bit shift register portion 140 corresponding to the DONE plane data D32 is not "Significant," nothing is outputted from the selector 145 and the process for one sample equivalent of the processing bit plane data D35 shifted to the second stage of the shift register 140A of the processing bit shift register portion 140 is finished.

And in these cases, a next one sample equivalent of the processing bit plane data D35 is given to the MR pass decoding processing portion 122 from the signal switcher 120 (FIG. 34) under control of the control portion 125 (FIG. 34) according to a transfer request given from the control portion 146 to the control portion 125 of the entire bit model portion 114. Thus, the MR pass decoding processing portion 122 starts the same process as to the processing bit plane data D35 equivalent to one sample (four pixels) thereby newly shifted to the second stage of the processing bit shift register portion 130.

As opposed to this, in the case where any data value of the one sample equivalent of the DONE plane data D32 is '0' and the pixel shifted to the second stage of the shift register 140A of the processing bit shift register portion 140 corresponding to the DONE plane data D32 is "Significant," it means that the pixel is the one to which the MR pass decoding process should be performed (hereafter, referred to as an MR pass decoding process subject pixel).

Thus, the data value (0/1) of the symbol data D34 given from the arithmetic decoder portion 113 (FIG. 34) is stored in the bit corresponding to the MR pass decoding process subject pixel of the shift register 140A of the processing bit shift register portion 140. Also, the calculation result of the context CX about the MR pass decoding process subject pixel outputted from the SIG shift register portion 142 is outputted from the selector 145 so as to be given to the arithmetic decoder portion 113.

In the case where the bits at the same coordinates as the MR pass decoding process subject pixel are '1' in the REF shift register portion 143 (in the case where the flag is set), it is cleared. And in the DONE shift register portion 144, the bits at the same coordinates as the MR pass decoding process subject pixel are updated to '1' meaning that the MR pass decoding process subject pixel has been processed so as to complete the MR pass decoding process for the MR pass decoding process subject pixel.

In the case where the MR pass decoding process should be performed to the remaining pixels shifted to the second stage of the shift register 140A of the processing bit shift register portion 140 thereafter, the MR pass decoding processing portion 122 performs the MR pass decoding process as described above.

And the MR pass decoding processing portion 122 sequentially repeats the same process every time one symbol equivalent of the symbol data D34 is given from the arithmetic decoder portion 113.

In this case, every time new processing bit plane data D35 equivalent to four pixels is given to the shift register 140A of the processing bit shift register portion 140, the MR pass decoding processing portion 122 provides the processing bit plane data D35 stored and held in the third stage of the shift register 140A of the processing bit shift register portion 140 to the bit plane buffers 116A and 116B corresponding thereto via the signal switcher 120 to have it written back to its original address position. And the MR pass decoding processing portion 122 also provides the SIG plane data D30, REF plane data D31 and DONE plane data D32 stored and held in the fourth stages of the shift registers 142A to 144A of the SIG shift register portion 142, REF shift register portion 143 and DONE shift register portion 144 to the SRAMs 111A and 111B corresponding thereto via the signal switcher 120 respectively so as to have them written back to their original address positions.

Thus, the MR pass decoding processing portion 122 can perform the MR pass decoding process based on the symbol data D34 provided from the arithmetic decoder portion 113.

(2-2-3-3) Configuration of the CU Pass Decoding Processing Portion 123

Figure 37:
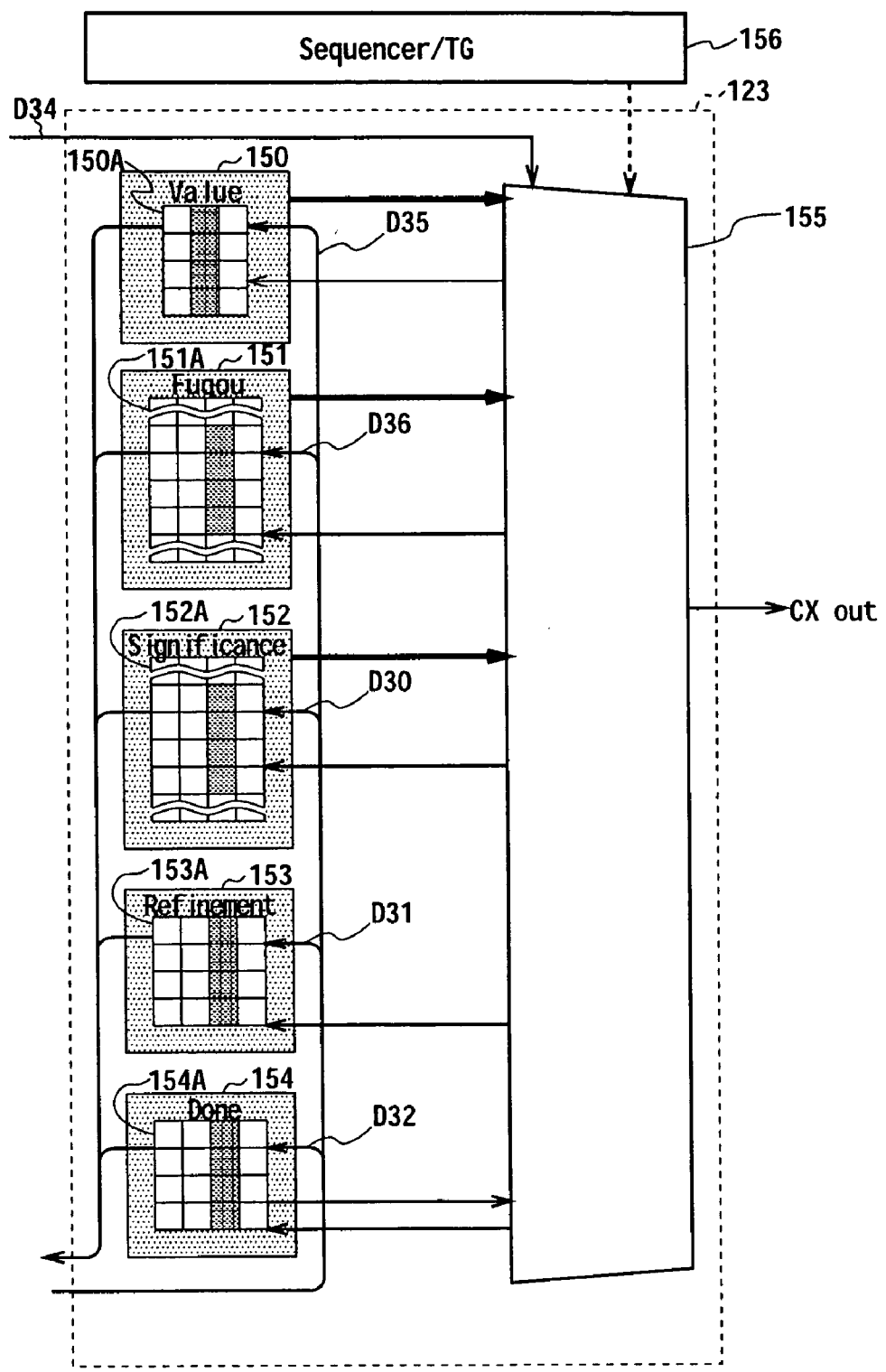
FIG. 37 is a block diagram showing the overview configuration of a CU pass decoding processing portion of the decoding apparatus.

As shown in FIG. 37, the CU pass decoding processing portion 123 is comprised of a processing bit shift register portion 150, a positive and negative shift register portion 151, an SIG shift register portion 152, an REF shift register portion 153, a DONE shift register portion 154 and a selector 155 of the hardware configuration and a control portion 156 for exerting the output switch control over the selector 155 described later.

The processing bit shift register portion 150 has a shift register 150A of three stages provided thereto, and the positive and negative shift register portion 151, SIG shift register portion 152, REF shift register portion 153 and DONE shift register portion 154 have shift registers 151A to 154A of four stages provided thereto respectively.

Thus, as described above, the CU pass decoding processing portion 123 can store and hold three or four sample equivalents of each of the processing bit plane data D35, positive and negative sign plane data D36, SIG plane data D30, REF plane data D31 and DONE plane data D32 which are sequentially given from the signal switcher 120 (FIG. 34) by one sample equivalent each at a time while sequentially shifting them among the shift registers 150A to 154A of the processing bit shift register portion 150, positive and negative shift register portion 151, SIG shift register portion 152, REF shift register portion 153 and DONE shift register portion 154.

And if one symbol equivalent of the symbol data D34 is given from the arithmetic decoder portion 113, the SIG shift register portion 152 detects whether or not the four pixels shifted to the second stage of the shift register 130A of the processing bit shift register portion 130 meet the conditions for performing the above-mentioned run-length process by using the SIG plane data D30 stored and held in its shift register 152A and the DONE plane data D32 stored and held in the shift register 154A of the DONE shift register portion 154.

In the case where the four pixels do not meet the conditions for performing the run-length process, the above-mentioned SP pass decoding process is sequentially performed as to each of the four pixels.

As opposed to this, in the case where the four pixels meet the conditions for performing the run-length process and the data value of the one symbol equivalent of the symbol data D34 given from the arithmetic decoder portion 113 (FIG. 34) is '0,' '0' is stored in the first to fourth bits in the second stage of the shift register 150A of the processing bit shift register portion 150 respectively. In conjunction with it, the context CX ("run") corresponding thereto is outputted from the SIG shift register portion 152. The context CX is given to the arithmetic decoder portion 113 (FIG. 31) via the selector 155 so as to complete the process for one symbol (four pixels) equivalent of the processing bit plane data D35 shifted to the second stage of the shift register 150A of the processing bit shift register portion 150.

In the case where the four pixels meet the conditions for performing the run-length process and the data value of the one symbol equivalent of the symbol data D34 given from the arithmetic decoder portion 113 then is '1,' a process inverse to the process described about FIG. 21 is performed according to the data values of two symbol equivalents of the symbol data D34 given from the arithmetic decoder portion 113 thereafter.

To be more precise, in the case where the data values of two symbol equivalents of the symbol data D34 given from the arithmetic decoder portion 113 are '0, 0,' '0' is stored in an uppermost bit in the second stage of the shift register 150A of the processing bit shift register portion 150. And in the case where the data values are '0, 1,' '0' or '1' is stored in the first and second bits in the second stage of the shift register 150A of the processing bit shift register portion 150 respectively. Moreover, in the case where the data values of the two symbol equivalents of the symbol data D34 given from the arithmetic decoder portion 113 are '1, 0,' '0,' '0' or '1' are stored in the first to third bits in the second stage of the shift register 150A of the processing bit shift register portion 150 respectively. And in the case where the data values are '1, 1,' '0,' '0,' '0' or '1' are stored in the first to fourth bits in the second stage of the shift register 150A of the processing bit shift register portion 150 respectively. Furthermore, the context "uniform" is outputted twice along with it from the SIG shift register portion 152, and is given to the arithmetic decoder portion 113 via the selector 155.

Furthermore, at this time, the SIG shift register portion 152 has the values of the bits in the second stage of its shift register 152A at the same coordinates as the pixel having '1' stored therein (hereafter, referred to as an CU pass decoding process subject pixel) in the shift register 150A of the processing bit shift register portion 150 updated to '1' representing that it is "Significant." And the REF shift register portion 153 has the values of the bits at the same coordinates as the CU pass decoding process subject pixel in the REF plane data D31 stored and held in its shift register 153A updated to '1' representing that it has become "Significant."

Furthermore, the one symbol equivalent of the symbol data D34 given from the arithmetic decoder portion 113 is given to the positive and negative shift register portion 151. In the positive and negative shift register portion 151, the positive and negative signs of the CU pass decoding process subject pixel are calculated based on the symbol data D34 and the context CX about the CU pass decoding process subject pixel is calculated according to the rule described above about FIG. 17. The calculated positive and negative signs are stored in the bits at the same coordinates as the CU pass decoding process subject pixel in the shift register 151A of the positive and negative shift register portion 151, and the context CX is outputted to the arithmetic decoder portion 113 via the selector 155.

Thereafter, the update information is given from the selector 155 to the DONE shift register portion 154. Based on this update information, the values of the bits at the same coordinates as the CU pass decoding process subject pixel in the DONE plane data D32 stored and held in the shift register 154A of the DONE shift register portion 154 are updated to '1' so as to complete the CU pass decoding process for the CU pass decoding process subject pixel.

Furthermore, concerning the pixels later in the scan order in the bit plane than the CU pass decoding process subject pixel in the same sample (one sample stored and held in the second stage of the shift register 150A of the processing bit shift register portion 150 at the time), the CU pass decoding processing portion 123 performs the above-mentioned CU pass decoding process thereafter while sequentially updating the SIG plane data D30, REF plane data D31 and DONE plane data D32 stored and held in the shift registers 150A to 154A of the SIG shift register portion 152, REF shift register portion 153 and DONE shift register portion 154 as required respectively. And the CU pass decoding processing portion 123 finishes such a process to all the pixels in the sample so as to complete the CU pass decoding process for the sample.

And the CU pass decoding processing portion 123 sequentially repeats the same process every time one symbol equivalent of the symbol data D34 is given from the arithmetic decoder portion 113 thereafter.

In this case, every time one sample equivalent of the processing bit plane data D35 is given from the signal switcher 120, the CU pass decoding processing portion 123 provides the processing bit plane data D35 stored and held in the third stage of the shift register 150A of the processing bit shift register portion 150 and the positive and negative sign plane data D36 stored and held in the fourth stage of the shift register 151A of the positive and negative sign shift register portion 151 to the bit plane buffers 116A, 116B or positive and negative sign plane buffer 115 corresponding thereto via the signal switcher 120 respectively to have them written back to their original address positions. And the CU pass decoding processing portion 123 also provides the SIG plane data D30, REF plane data D31 and DONE plane data D32 stored and held in the fourth stages of the shift registers 152A to 154A of the SIG shift register portion 152, REF shift register portion 153 and DONE shift register portion 154 to the SRAMs 111A and 111B corresponding thereto via the signal switcher 120 respectively so as to have them written back to their original address positions.

Thus, the CU pass decoding processing portion 123 can perform the CU pass decoding process based on the symbol data D34 sequentially provided from the arithmetic decoder portion 113.

(2-3) Operation and Effects of the First Embodiment

In the above configuration, the encoding apparatus 40 and the decoding apparatus 100 according to this embodiment perform the CBM processing in the bit model portion 54 or the bit model portion 114 with the four pixels constituting the stripe column 23A on the processing bit plane 22 as a unit. At this time, the positive and negative sign plane data D20, D35 and the SIG plane data D22, D30 are read from the positive and negative sign plane buffers 50, 115 or the SRAMs 52A, 111A with the 4 bits of the same phase as the stripe column 23A on the processing bit plane 22 as a unit (one word).

Therefore, the encoding apparatus 40 and the decoding apparatus 100 can dramatically reduce the number of times of accessing the positive and negative sign plane buffers 50, 115 and the SRAMs 52A, 111A on the CBM processing compared to the conventional technique of rendering one bit of the positive and negative sign plane data D20, D35 and the SIG plane data D22, D30 as a memory word.

To calculate the number of times of reading the SIG plane data D22, D30 from the memory on processing the processing bit plane 22 of 64×64 size in reality, the conventional technique of accessing pixel by pixel requires 36,100 times of memory access in the configuration in which the appropriable SIG plane data D22, D30 read on processing an immediately preceding pixel is not used on processing the next pixel and necessary SIG plane data D22, D30 is read bit by bit for each pixel (hereafter, referred to as an overlap reading configuration). And it requires 17,860 times of memory access in the configuration in which the appropriable SIG plane data D22, D30 read on processing the immediately preceding pixel is used on processing the next pixel and only insufficient SIG plane data D22, D30 is read bit by bit (hereafter, referred to as an updated portion limited reading configuration).

In comparison, according to the technique of this embodiment for collectively reading the SIG plane data D22, D30 by 4 bits, 8,740 times of memory access is sufficient even in the case of the overlap reading configuration. And 2,944 times of memory access is sufficient when it comes to the updated portion limited reading configuration.

Thus, it is possible to speed up the CBM processing in the bit model portion 54 or the bit model portion 114 of the encoding apparatus 40 and the decoding apparatus 100 by adopting the above-mentioned configuration of the first embodiment as the configuration of the bit model portion 54 or the bit model portion 114 in compliance with the JPEG 2000 standard. And it is also possible to thereby reduce power consumption of the bit model portion 54 or the bit model portion 114.

According to the above configuration, it is possible to perform the CBM processing with the four pixels constituting the stripe column 23A on the processing bit plane 22 as a unit and handle the positive and negative sign plane data D20, D36 and the SIG plane data D22, D30 with the four pixels of the same phase as the stripe column 23A on the processing bit plane 22 as a unit (one word) then so as to dramatically reduce the number of times of accessing the positive and negative sign plane buffers 50, 115 and the SRAMs 52A, 111A on the CBM processing. Thus, it is possible to implement the encoding apparatus and the decoding apparatus capable of speeding up the encoding process and the decoding process.

Figure 38:
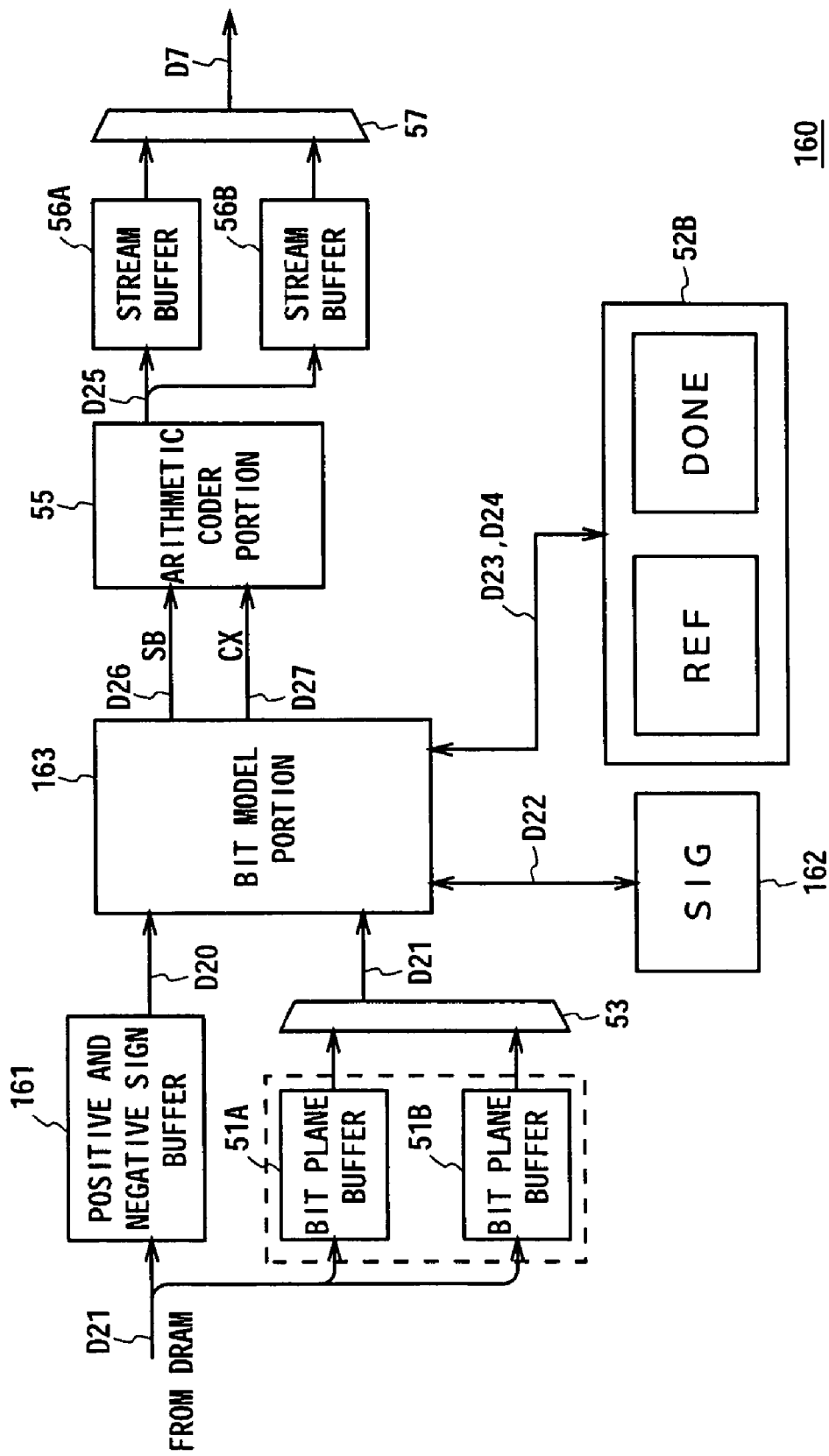
FIG. 38 is a block diagram showing the configuration of the EBCOT block of the encoding apparatus according to a second embodiment.

(3) Second Embodiment (3-1) Configuration of an EBCOT Block 160 of the Encoding Apparatus 40 According to the Second Embodiment FIG. 38 indicates the portions corresponding to FIG. 25 by giving them the same symbols, and shows an EBCOT block 160 according to a second embodiment applied to the encoding apparatus 40 (FIG. 24) in compliance with the JPEG 2000 standard. The EBCOT block 160 has approximately the same configuration as the EBCOT block 42 of the encoding apparatus 40 according to the first embodiment except that the phase of the words of the positive and negative sign plane data D20 and the SIG plane data D22 in the positive and negative sign plane buffers 50 and the SRAM 52A is deviated from the stripe column 23A on the processing bit plane 22.

Figure 39B:
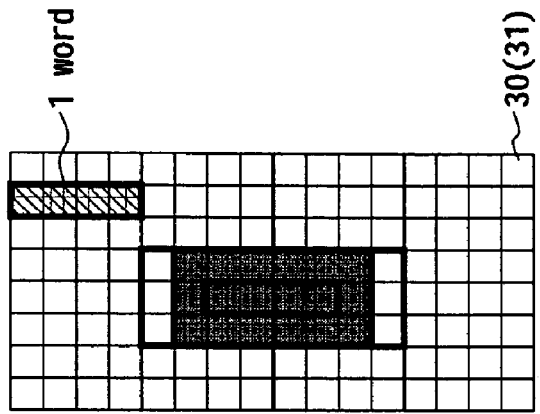
FIGS. 39A and 39B are block diagrams for explaining the memory access technique according to the second embodiment.
Figure 39A:
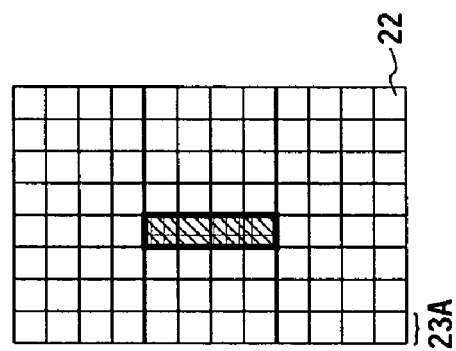

To be more specific, in the case of the EBCOT block 160, as shown in FIG. 39, a positive and negative sign plane buffer 161 (FIG. 38) has a storage area for the positive and negative sign plane data D20 extended by 2 bits upward and downward over the area used for actual storage of the positive and negative sign plane data D20 respectively. It is thus possible to collectively read and write them by one clock with the positive and negative sign plane data D20 of vertically arranged 4 bits of which phase is vertically deviated by 2 bits from the four pixels constituting one stripe column 23A on the processing bit plane 22 as a unit (one word).

As regards the EBCOT block 160, as shown in FIG. 39, an SRAM 162 (FIG. 38) also has the storage area for the SIG plane data D22 extended by 2 bits upward and downward over the area used for actual storage of the SIG plane data D22 respectively. It is thus possible to collectively read and write by one clock the SIG plane data D22 of vertically arranged 4 bits of which phase is vertically deviated by 2 bits from the four pixels constituting one stripe column 23A on the processing bit plane 22 as a unit (one word).

Figure 40:
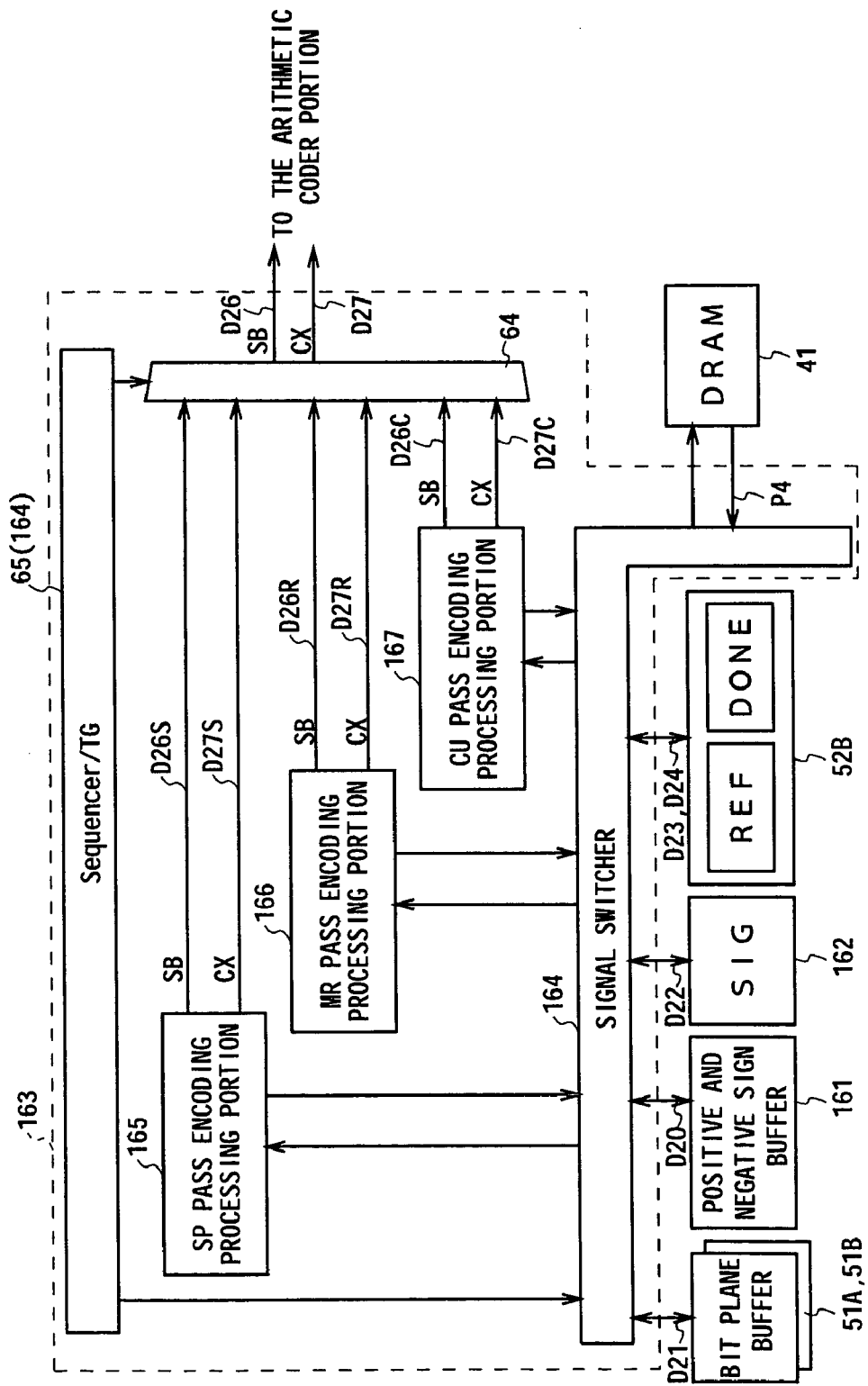
FIG. 40 is a block diagram showing the configuration of the bit model portion of the EBCOT block shown in FIG. 38.

As shown in FIG. 40, a bit model portion 163 of the EBCOT block 160 has almost the same configuration as the bit model portion 54 of the encoding apparatus 40 according to the first embodiment except the configuration of a signal switcher 164.

And when CBM-processing the processing bit plane 22 other than the top bit plane 22T, the signal switcher 164 sequentially reads the processing bit plane data D21 word by word from the bit plane buffers 51A and 51B with the four pixels constituting one stripe column 23A shown in FIG. 27A as one word according to the scan order in the bit plane under control of the control portion 65 so as to send it first to an SP pass encoding processing portion 165.

In synchronization therewith, the signal switcher 164 sequentially reads from the positive and negative sign plane buffer 161 the positive and negative sign plane data D20 of the 4 bits and upper and lower bits thereof (6 bits in total, refer to FIG. 27C) on the positive and negative sign plane 30 at the same coordinates as the four pixels required on performing the SP pass encoding process to the processing bit plane data D21 equivalent to the four pixels read from the processing bit plane buffers 51A and 51B so as to send it to the SP pass encoding processing portion 165.

In this case, as against the positive and negative sign plane data D20 of total 6 bits required on performing the SP pass encoding process to the processing bit plane data D21 equivalent to the four pixels read from the processing bit plane buffers 51A and 51B, the signal switcher 164 reads from the positive and negative sign plane buffer 161 the positive and negative sign plane data D20 equivalent to one word (4 bits) deviated upward by 2 bits from the 4 bits and the positive and negative sign plane data D20 equivalent to one word (4 bits) deviated downward by 2 bits from the 4 bits on the positive and negative sign plane 30 at the same coordinates as the four pixels in reality respectively by taking two clocks so as to send it to the SP pass encoding processing portion 165.

Furthermore, in synchronization therewith, the signal switcher 164 sequentially reads from the SRAM 52A the SIG plane data D22 of the 4<bits and upper and lower bits thereof (6 bits in total, refer to FIG. 27B) on the SIG plane 31 at the same coordinates as the four pixels required on performing the SP pass encoding process to the processing bit plane data D21 equivalent to the four pixels so as to send it to the SP pass encoding processing portion 165.

In this case, as against the SIG plane data D22 of total 6 bits required on performing the SP pass encoding process to the processing bit plane data D21 equivalent to the four pixels read from the processing bit plane buffers 51A and 51B, the signal switcher 164 reads from the SRAM 162 the SIG plane data equivalent to one word (4 bits) deviated upward by 2 bits from the 4 bits and the SIG plane data D22 equivalent to one word (4 bits) deviated downward by 2 bits from the 4 bits on the SIG plane 31 at the same coordinates as the four pixels in reality respectively by taking two clocks so as to send it to the SP pass encoding processing portion 165.

Furthermore, in synchronization therewith, the signal switcher 164 sequentially reads from the SRAM 52B the REF plane data D23 of the 4 bits (refer to FIG. 27E) on the REF plane 32 at the same coordinates as the four pixels and the DONE plane data D24 of the 4 bits (refer to FIG. 27D) on the DONE plane 33 at the same coordinates as the four pixels required on performing the SP pass encoding process to the processing bit plane data D21 equivalent to the four pixels so as to send it to the SP pass encoding processing portion 165.

In this case, the SRAM 52B has the REF plane data D31 and DONE plane data D32 stored therein with the 4 bits corresponding to each stripe column 23A on the processing bit plane 22 as a unit (one word), and is constituted to be able to read and write the REF plane data D31 and DONE plane data D32 in this word unit. Therefore, the signal switcher 164 reads from the SRAM 52B the REF plane data D31 or the DONE plane data D32 of the 4 bits by one clock respectively so as to send it to the SP pass encoding processing portion 165.

In this case, the SP pass encoding processing portion 165 can store and hold at least three past samples of each of the processing bit plane data D21 equivalent to four pixels and the positive and negative sign plane data D20, SIG plane data D22, REF plane data D23 and DONE plane data D24 corresponding thereto sequentially supplied from the signal switcher 164.

Here, one word is equivalent to one sample as to the processing bit plane data D21, REF plane data D23 and DONE plane data D24, and vertically arranged two words are equivalent to one sample as to the positive and negative sign plane data D20 and SIG plane data D22.

And if the processing bit plane data D21 on the next sample is given from the signal switcher 164, the SP pass encoding processing portion 165 performs the SP pass encoding process as required as with the SP pass encoding processing portion 61 of the encoding apparatus 40 (FIG. 24) according to the first embodiment, and sends the symbol SB obtained then to the output switcher 64 as symbol data D26S and also sends the context CX to the output switcher 64 as context data D27S. And the SP pass encoding processing portion 165 updates the SIG plane data D22, REF plane data D23 and/or DONE plane data D24 as required, and further writes back the updated SIG plane data D22, REF plane data D23 and DONE plane data D24 to their original address positions in the SRAMs 162 and 52B.

On finishing the SP pass encoding process for the data of 1 bit plane (processing bit plane data D21) thus stored in the processing bit plane buffers 51A and 51B, the signal switcher 164 sequentially reads the same processing bit plane data D21 word by word from the processing bit plane buffers 51A and 51B in compliance with the scan order in the bit plane under control of the control portion 65 likewise thereafter so as to send it to the MR pass encoding processing portion 166.

In synchronization therewith, the signal switcher 164 sequentially reads from the SRAM 162 the SIG plane data D22 of the 4 bits and upper and lower bits thereof (6 bits in total, refer to FIG. 27B) on the SIG plane 31 at the same coordinates as the four pixels required on performing the MR pass encoding process to the processing bit plane data D21 equivalent to the four pixels read from the processing bit plane buffers 51A and 51B so as to send it to the MR pass encoding processing portion 166.

In this case, as against the SIG plane data D22 of total 6 bits required on performing the MR pass encoding process to the processing bit plane data D21 equivalent to the four pixels read from the processing bit plane buffers 51A and 51B, the signal switcher 164 reads from the SRAM 162 the SIG plane data D22 equivalent to one word (4 bits) deviated upward by 2 bits from the 4 bits and the SIG plane data D22 equivalent to one word (4 bits) deviated downward by 2 bits from the 4 bits on the SIG plane 31 at the same coordinates as the four pixels in reality by taking two clocks as in the above-mentioned case of the SP pass encoding processing portion so as to send it to the MR pass encoding processing portion 166.

Furthermore, in synchronization therewith, the signal switcher 164 sequentially reads from the SRAM 52B the REF plane data D23 equivalent to one word (refer to FIG. 27E) on the REF plane 32 at the same coordinates as the four pixels and the DONE plane data D24 equivalent to one word (refer to FIG. 27D) on the DONE plane 33 at the same coordinates as the four pixels required on performing the MR pass encoding process to the processing bit plane data D21 equivalent to the four pixels so as to send it to the MR pass encoding processing portion 166.

In this case, the MR pass encoding processing portion 166 can store and hold at least three past samples of each of the processing bit plane data D21 equivalent to four pixels and the SIG plane data D22, REF plane data D23 and DONE plane data D24 corresponding thereto sequentially supplied from the signal switcher 164.

In this case, one word is equivalent to one sample as to the processing bit plane data D21, REF plane data D23 and DONE plane data D24, and vertically arranged two words are equivalent to one sample as to the positive and negative sign plane data D20 and SIG plane data D22.

And if the processing bit plane data D21 on the next sample is given from the signal switcher 164, the MR pass encoding processing portion 166 performs the MR pass encoding process as required as with the MR pass encoding processing portion 62 of the encoding apparatus 40 (FIG. 24) according to the first embodiment, and sends the symbol SB obtained then to the output switcher 64 as symbol data D26R and also sends the context CX to the output switcher 64 as context data D27R respectively. And the MR pass encoding processing portion 166 updates the SIG plane data D22, REF plane data D23 and/or DONE plane data D24 as required, and further writes back the updated SIG plane data D22, REF plane data D23 and DONE plane data D24 to their original address positions in the SRAMs 162 and 52B.

On finishing the MR pass encoding process for the data of 1 bit plane (processing bit plane data D21) thus stored in the processing bit plane buffers 51A and 51B, the signal switcher 164 sequentially reads the same processing bit plane data D21 word by word from the processing bit plane buffers 51A and 51B in compliance with the scan order in the bit plane under control of the control portion 65 likewise thereafter so as to send it to the CU pass encoding processing portion 167.

In synchronization therewith, the signal switcher 164 sequentially reads from the positive and negative sign plane buffer 161 (FIG. 38) the positive and negative sign plane data D20 of the 4 bits and upper and lower bits thereof (6 bits in total, refer to FIG. 27C) on the positive and negative sign plane 30 at the same coordinates as the four pixels required on performing the CU pass encoding process to the processing bit plane data D21 equivalent to the four pixels read from the processing bit plane buffers 51A and 51B so as to send it to the CU pass encoding processing portion 167.

In this case, as against the positive and negative sign plane data D20 of total 6 bits required on performing the CU pass encoding process to the processing bit plane data D21 equivalent to the four pixels read from the processing bit plane buffers 51A and 51B, the signal switcher 164 reads from the positive and negative sign plane buffer 161 the positive and negative sign plane data D20 equivalent to one word (4 bits) deviated upward by 2 bits from the 4 bits and the positive and negative sign plane data D20 equivalent to one word (4 bits) deviated downward by 2 bits from the 4 bits on the positive and negative sign plane at the same coordinates as the four pixels in reality by taking two clocks as with the above-mentioned SP pass encoding processing portion 165 so as to send it to the CU pass encoding processing portion 167.

Furthermore, in synchronization therewith, the signal switcher 164 sequentially reads from the SRAM 162 the SIG plane data D22 of the 4 bits and upper and lower bits thereof (6 bits in total, refer to FIG. 27B) on the SIG plane 31 at the same coordinates as the four pixels required on performing the CU pass encoding process to the processing bit plane data D21 equivalent to the four pixels so as to send it to the CU pass encoding processing portion 167.

In this case, as against the SIG plane data D22 of total 6 bits required on performing the CU pass encoding process to the processing bit plane data D21 equivalent to the four pixels read from the processing bit plane buffers 51A and 51B, the signal switcher 164 reads from the SRAM 162 the SIG plane data D22 equivalent to one word (4 bits) deviated upward by 2 bits from the 4 bits and the SIG plane data D22 equivalent to one word (4 bits) deviated downward by 2 bits from the 4 bits on the SIG plane 31 at the same coordinates as the four pixels respectively in reality by taking two clocks so as to send it to the CU pass encoding processing portion 167.

Furthermore, in synchronization therewith, the signal switcher 164 reads from the SRAM 52B the REF plane data D23 equivalent to one word (refer to FIG. 27E) on the REF plane 32 at the same coordinates as the four pixels and the DONE plane data D24 equivalent to one word (refer to FIG. 27D) on the DONE plane 33 at the same coordinates as the four pixels required on performing the CU pass encoding process to the processing bit plane data D21 equivalent to the four pixels so as to send it to the CU pass encoding processing portion 167.

In this case, the CU pass encoding processing portion 167 can store and hold at least three past samples of each of the processing bit plane data D21 equivalent to four pixels and the positive and negative sign plane data D20, SIG plane data D22, REF plane data D23 and DONE plane data D24 corresponding thereto sequentially supplied from the signal switcher 164.

In this case, one word is equivalent to one sample as to the processing bit plane data D21, REF plane data D23 and DONE plane data D24, and vertically arranged two words are equivalent to one sample as to the positive and negative sign plane data D20 and SIG plane data D22.

And if the processing bit plane data D21 on the next sample is given from the signal switcher 164, the CU pass encoding processing portion 167 performs the CU pass encoding process or the SP pass encoding process as required as with the CU pass encoding processing portion 63 of the encoding apparatus 40 (FIG. 24) according to the first embodiment, and sends the symbol SB obtained then to the output switcher 64 as the symbol data D26C and also sends the context CX to the output switcher 64 as the context data D27C respectively. And the CU pass encoding processing portion 167 updates the SIG plane data D22, REF plane data D23 and/or DONE plane data D24 as required, and further writes back the updated SIG plane data D22, REF plane data D23 and DONE plane data D24 to their original address positions in the SRAMs 162 and 52B.

Thus, it is possible for the bit model portion 163 to reduce the number of times of accessing the positive and negative sign plane buffer 161 and the SRAM 162 on processing one stripe column 23A on the processing bit plane data D21 by deviating the phase of an access unit (one word) of the positive and negative sign plane data D20 and the SIG plane data D22 on the CBM-processing by 2 bits from the stripe column 23A on the processing bit plane 22.

Figure 41:
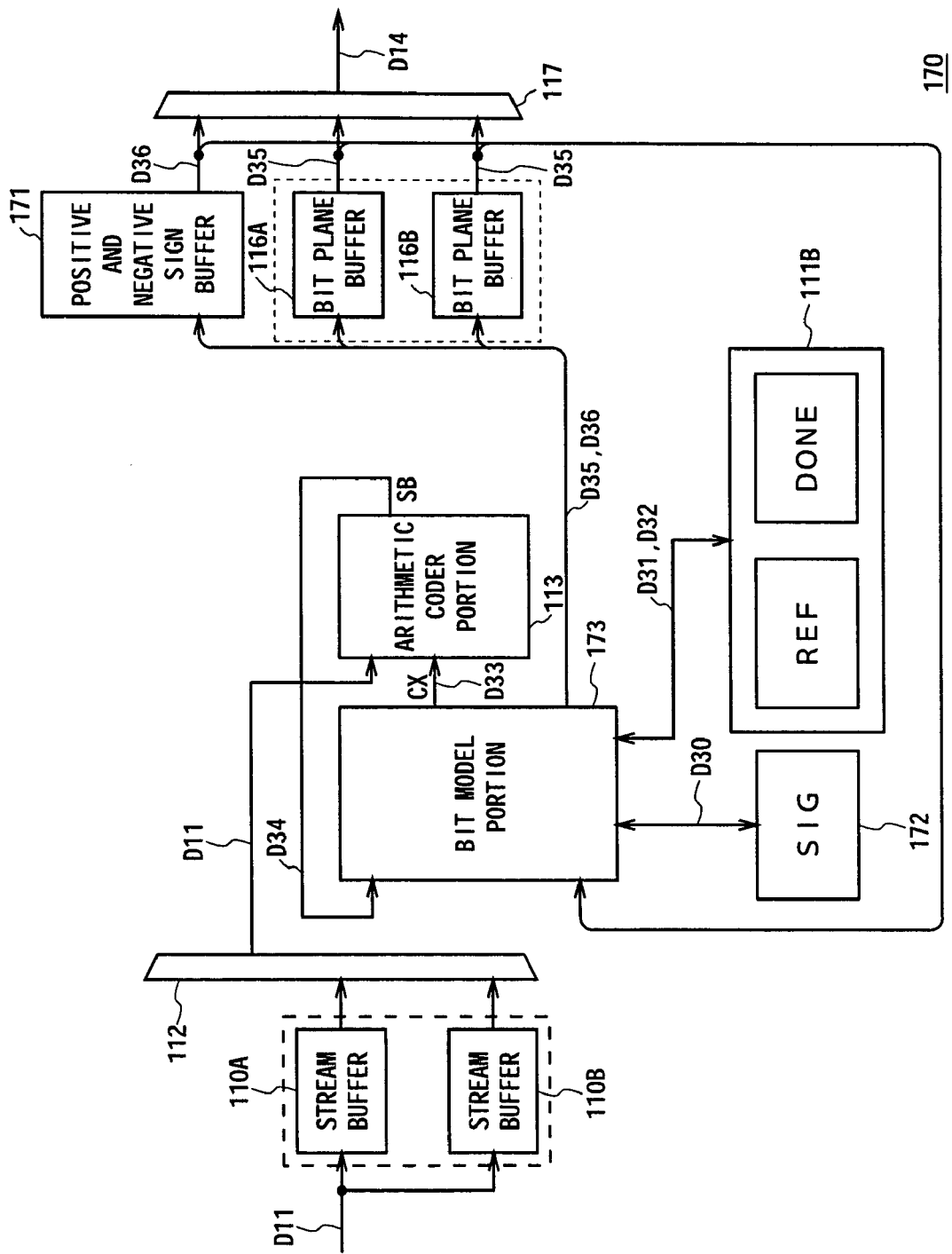
FIG. 41 is a block diagram showing the configuration of the EBCOT block of the decoding apparatus according to the second embodiment.

(3-2) Configuration of an EBCOT Block 170 of the Decoding Apparatus 100 According to a Second Embodiment FIG. 41 indicates the portions corresponding to FIG. 33 by giving them the same symbols, and shows an EBCOT block 170 according to a second embodiment applied to the decoding apparatus 100 (FIG. 32) in compliance with the above-mentioned JPEG 2000 standard. The EBCOT block 170 has approximately the same configuration as an EBCOT block 4101 of the decoding apparatus 100 according to the first embodiment except that the phase of the words of the positive and negative sign plane data D20 and the SIG plane data D22 in a positive and negative sign plane buffer 171 or an SRAM 172 is deviated from the stripe column 23A on the processing bit plane 22.

To be more specific, as with the positive and negative sign plane buffer 161 (FIG. 38) and SRAM 162 (FIG. 38) described above as to FIG. 39, the EBCOT block 170 has a storage area for the positive and negative sign plane data D36 in the positive and negative sign plane buffer 171 and a storage area for the SIG plane data D30 in the SRAM 172 extended by 2 bits upward and downward over the area used for actual storage of the positive and negative sign plane data D36 or the SIG plane data D30 respectively. It is thus possible to collectively read and write them by one clock with the positive and negative sign plane data D36 or the SIG plane data D30 of vertically arranged 4 bits of which phase is deviated by 2 bits from the four pixels constituting one stripe column 23A on the processing bit plane 22 as one word respectively.

Figure 42:
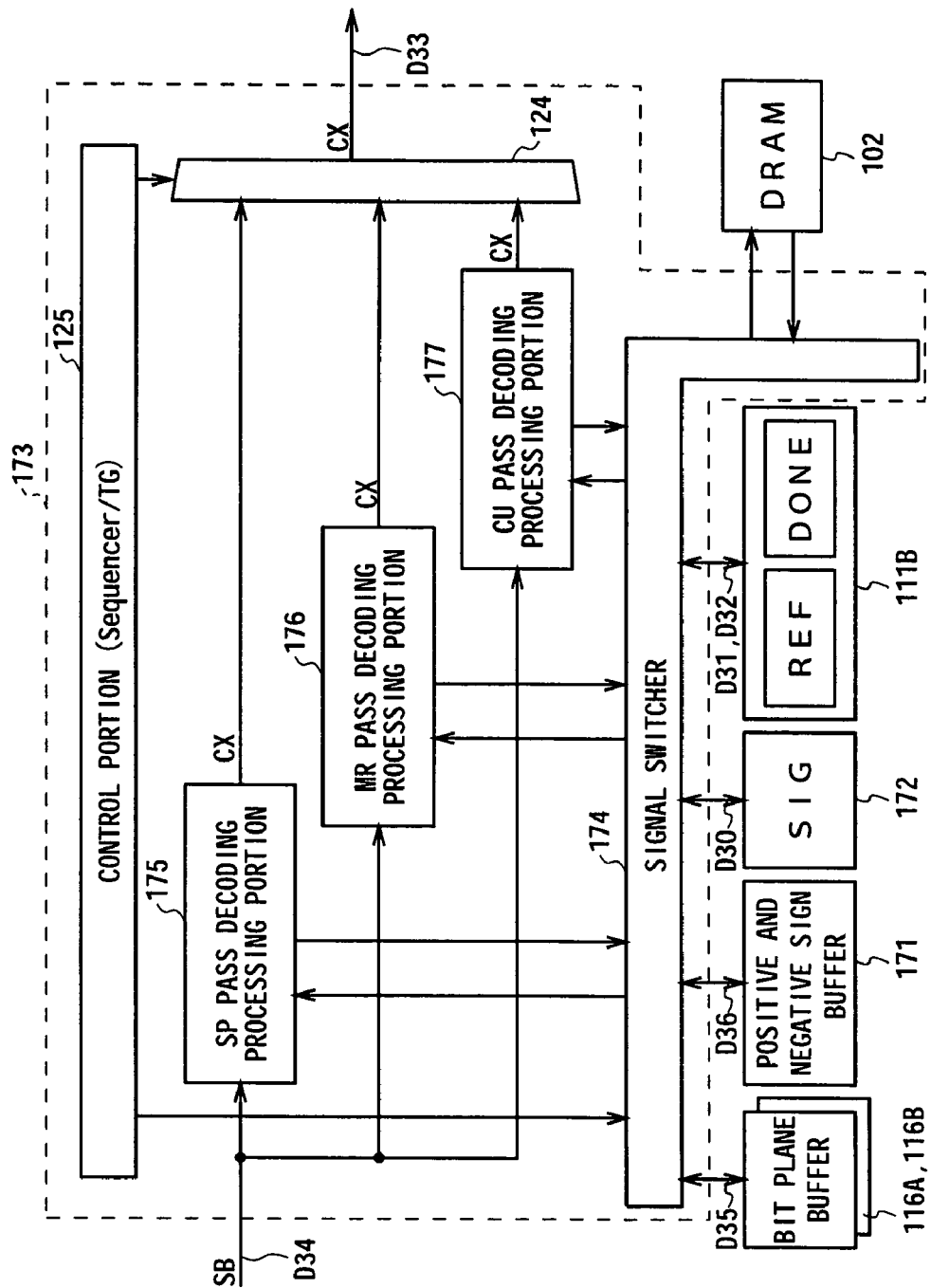
FIG. 42 is a block diagram showing the configuration of the bit model portion of the EBCOT block shown in FIG. 41.

As shown in FIG. 42, a bit demodel portion 173 of the EBCOT block 170 has approximately the same configuration as the bit model portion 114 of the decoding apparatus 100 according to the first embodiment except the configuration of a signal switcher 174.

In reality, the signal switcher 174 sequentially reads the processing bit plane data D35 before decoding or partially decoded stored and held in the bit plane buffers 116A and 116B (FIG. 41) word by word from the bit plane buffers 116A and 116B with the four pixels constituting one stripe column 23A shown in FIG. 27A as one word according to the scan order in the bit plane under control of the control portion 125 so as to send it first to an SP pass decoding processing portion 175.

In synchronization therewith, the signal switcher 174 sequentially reads from the positive and negative sign plane buffer 171 the positive and negative sign plane data D36 before decoding or partially decoded of the 4 bits and upper and lower bits thereof (6 bits in total, refer to FIG. 27C) on the positive and negative sign plane 30 at the same coordinates as the four pixels required on decoding by the SP pass decoding process the processing bit plane data D35 equivalent to the four pixels read from the bit plane buffers 116A and 116B so as to send it to the SP pass decoding processing portion 175.

In this case, as against the positive and negative sign plane data D36 of total 6 bits required on performing the SP pass decoding process to the processing bit plane data D35 equivalent to the four pixels read from the bit plane buffers 116A and 116B, the signal switcher 174 reads from the positive and negative sign plane buffer 171 the positive and negative sign plane data D36 equivalent to one word (4 bits) deviated upward by 2 bits from the 4 bits and the positive and negative sign plane data D36 equivalent to one word (4 bits) deviated downward by 2 bits from the 4 bits on the positive and negative sign plane 30 at the same coordinates as the four pixels in reality respectively by taking two clocks so as to send it to the SP pass decoding processing portion 175.

Furthermore, in synchronization therewith, the signal switcher 174 sequentially reads from the SRAM 172 the SIG plane data D30 of the 4 bits and upper and lower bits thereof (6 bits in total, refer to FIG. 27B) on the SIG plane 31 at the same coordinates as the four pixels required on decoding with by the SP pass decoding process the processing bit plane data D35 equivalent to the four pixels so as to send it to the SP pass decoding processing portion 175.

In this case, as against the SIG plane data D30 of total 6 bits required on performing the SP pass decoding process to the processing bit plane data D21 equivalent to the four pixels read from the bit plane buffers 116A and 116B (FIG. 41), the signal switcher 174 reads from the SRAM 172 the SIG plane data D30 equivalent to one word (4 bits) deviated upward by 2 bits from the 4 bits and the SIG plane data D30 equivalent to one word (4 bits) deviated downward by 2 bits from the 4 bits on the SIG plane 31 at the same coordinates as the four pixels in reality respectively by taking two clocks so as to send it to the SP pass decoding processing portion 175.

Furthermore, in synchronization therewith, the signal switcher 174 sequentially reads from the SRAM 111B the REF plane data D31 of the 4 bits (refer to FIG. 27E) on the REF plane 32 at the same coordinates as the four pixels and the DONE plane data D32 of the 4 bits (refer to FIG. 27D) on the DONE plane 33 at the same coordinates as the four pixels required on decoding by the SP pass encoding process the processing bit plane data D35 equivalent to the four pixels so as to send it to the SP pass decoding processing portion 175.

In this case, the SRAM 111B has the REF plane data D31 and DONE plane data D32 stored therein with the 4 bits corresponding to each stripe column 23A on the processing bit plane 22 as a unit (one word), and is constituted to be able to read and write the REF plane data D31 and DONE plane data D32 in this word unit. Therefore, the signal switcher 174 reads from the SRAM 111B the REF plane data D31 or the DONE plane data D32 of the 4 bits by one clock respectively so as to send it to the SP pass decoding processing portion 175.

In this case, the SP pass decoding processing portion 175 can store and hold at least three past samples of each of the processing bit plane data D35 equivalent to four pixels and the positive and negative sign plane data D36, SIG plane data D30, REF plane data D31 and DONE plane data D32 corresponding thereto sequentially supplied from the signal switcher 174.

Here, one word is equivalent to one sample as to the processing bit plane data D35, REF plane data D31 and DONE plane data D32, and vertically arranged two words are equivalent to one sample as to the positive and negative sign plane data D36 and SIG plane data D30.

And if one symbol equivalent of the symbol data D34 is given from the arithmetic decoder portion 113, the SP pass decoding processing portion 175 performs the SP pass decoding process as required as with the SP pass decoding processing portion 175 of the decoding apparatus 100 (FIG. 32) according to the first embodiment, and sends the context CX obtained then to the arithmetic decoder portion 113 (FIG. 41) via the output switcher 124 as the context data D33 and also stores the decoded processing bit plane data D35 and the decoded positive and negative sign plane data D36 obtained together with it in the corresponding positions in the bit plane buffers 116A and 116B or the positive and negative sign plane buffer 171 respectively. Furthermore, the SP pass decoding processing portion 175 updates the SIG plane data D22, REF plane data D23 and/or DONE plane data D24 as required, and further writes back the updated SIG plane data D22, REF plane data D23 and DONE plane data D24 to their original address positions in the SRAMs 172 and 52B.

Of the encoded data D11 read from the stream buffers 110A and 110B, the arithmetic decoder portion 113 (FIG. 41) sends to an MR pass decoding processing portion 176 the symbol data D34 acquired by performing the above-mentioned arithmetic decoding calculation process to the encoded data D11 obtained by performing the MR pass encoding process in the encoding apparatus 40 (FIG. 24).

In this case, the signal switcher 174 sequentially reads from the bit plane buffers 116A and 116B the processing bit plane data D35 partially decoded by a preceding SP pass decoding process and stored and held in the bit plane buffers 116A and 116B word by word with the four pixels constituting one stripe column 23A shown in FIG. 27A as one word in compliance with the scan order in the bit plane under control of the control portion 125 so as to send it to the MR pass decoding processing portion 176.

In synchronization therewith, the signal switcher 174 sequentially reads from the SRAM 172 the SIG plane data D30 of the 4 bits and upper and lower bits thereof (6 bits in total, refer to FIG. 27B) on the SIG plane 31 at the same coordinates as the four pixels respectively required on decoding by the MR pass decoding process the processing bit plane data D35 equivalent to the four pixels read from the bit plane buffers 116A and 116B so as to send it to the MR pass decoding processing portion 176.

In this case, as against the SIG plane data of total 6 bits required on performing the MR pass decoding process to the processing bit plane data D21 equivalent to the four pixels read from the processing bit plane buffers 51A and 51B, the signal switcher 174 reads from the SRAM the SIG plane data equivalent to one word (4 bits) deviated upward by 2 bits from the 4 bits and the SIG plane data equivalent to one word (4 bits) deviated downward by 2 bits from the 4 bits on the SIG plane at the same coordinates as the four pixels in reality respectively by taking two clocks so as to send it to the MR pass decoding processing portion 176.

Furthermore, in synchronization therewith, the signal switcher 174 sequentially reads from the SRAM 111B the REF plane data D31 equivalent to one word (refer to FIG. 27E) on the REF plane 32 at the same coordinates as the four pixels and the DONE plane data D32 equivalent to one word (refer to FIG. 27D) on the DONE plane 33 at the same coordinates as the four pixels required on performing the MR pass decoding process to the processing bit plane data D35 equivalent to the four pixels so as to send it to the MR pass decoding processing portion 176.

In this case, the MR pass decoding processing portion 176 can store and hold at least three past samples of each of the processing bit plane data D35 equivalent to the four pixels and the SIG plane data D30, REF plane data D31 and DONE plane data D32 corresponding thereto sequentially supplied from the signal switcher 174.

Here, one word is equivalent to one sample as to the processing bit plane data D35, REF plane data D31 and DONE plane data D32, and vertically arranged two words are equivalent to one sample as to the positive and negative sign plane data D36 and SIG plane data D30.

And if one symbol equivalent of the symbol data D34 is given from the arithmetic decoder portion 113 (FIG. 41), the MR pass decoding processing portion 176 performs the MR pass decoding process as required as with the MR pass decoding processing portion 122 (FIG. 34) of the decoding apparatus 100 (FIG. 32) according to the first embodiment, and sends the context CX obtained then to the arithmetic decoder portion 113 (FIG. 41) via the output switcher 124 as the context data D33 and also stores the decoded processing bit plane data D35 obtained together with it in the corresponding positions in the bit plane buffers 116A and 116B. Furthermore, the MR pass decoding processing portion 176 updates the SIG plane data D30, REF plane data D31 and/or DONE plane data D32 as required, and writes back the updated SIG plane data D30, REF plane data D31 and DONE plane data D32 to their original address positions in the SRAMs 172 and 111B.

Likewise, of the encoded data D11 read from the stream buffers 110A and 110B, the arithmetic decoder portion 113 (FIG. 41) sends to a CU pass decoding processing portion 177 the symbol data D34 acquired by performing a predetermined arithmetic decoding calculation process to the encoded data D11 obtained by performing the CU pass encoding process in the encoding apparatus 40 (FIG. 24).

In this case, the signal switcher 174 sequentially reads from the bit plane buffers 116A and 116B the processing bit plane data D35 partially decoded by the preceding SP pass decoding process and MR pass decoding process (except the case of the decoding process for the top bit plane 22T) and stored and held in the bit plane buffers 116A and 116B word by word with the four pixels constituting one stripe column 23A shown in FIG. 27A as one word in compliance with the scan order in the bit plane under control of the control portion 125 so as to send it to the CU pass decoding processing portion 177.

In synchronization therewith, the signal switcher 174 sequentially reads from the positive and negative sign plane buffer 171 the positive and negative sign plane data D36 before decoding or partially decoded of the 4 bits and upper and lower bits thereof (6 bits in total, refer to FIG. 27C) on the positive and negative sign plane 30 at the same coordinates as the four pixels respectively required on decoding by the CU pass decoding process the processing bit plane data D35 equivalent to the four pixels read from the bit plane buffers 116A and 116B so as to send it to the CU pass decoding processing portion 177.

In this case, as against the positive and negative sign plane data D36 of total 6 bits required on performing the CU pass decoding process to the processing bit plane data D35 equivalent to the four pixels read from the bit plane buffers 116A and 116B, the signal switcher 174 reads from the positive and negative sign plane buffer 171 the positive and negative sign plane data D36 equivalent to one word (4 bits) deviated upward by 2 bits from the 4 bits and the positive and negative sign plane data D36 equivalent to one word (4 bits) deviated downward by 2 bits from the 4 bits on the positive and negative sign plane 30 at the same coordinates as the four pixels in reality respectively by taking two clocks so as to send it to the CU pass decoding processing portion 177.

Furthermore, in synchronization therewith, the signal switcher 174 sequentially reads from the SRAM 172 the SIG plane data D30 of the 4 bits and upper and lower bits thereof (6 bits in total, refer to FIG. 27B) on the SIG plane 31 at the same coordinates as the four pixels respectively required on decoding by the CU pass decoding process the processing bit plane data D35 equivalent to the four pixels so as to send it to the CU pass decoding processing portion 177.

In this case, as against the SIG plane data D30 of total 6 bits required on performing the CU pass decoding process to the processing bit plane data D35 equivalent to the four pixels read from the bit plane buffers 116A and 51B, the signal switcher 174 reads from the SRAM 172 the SIG plane data D30 equivalent to one word (4 bits) deviated upward by 2 bits from the 4 bits and the SIG plane data D30 equivalent to one word (4 bits) deviated downward by 2 bits from the 4 bits on the SIG plane 31 at the same coordinates as the four pixels in reality respectively by taking two clocks so as to send it to the CU pass decoding processing portion 177.

Furthermore, in synchronization therewith, the signal switcher 174 sequentially reads from the SRAM 111B the REF plane data D31 equivalent to one word (refer to FIG. 27E) on the REF plane 32 at the same coordinates as the four pixels and the DONE plane data D32 equivalent to one word (refer to FIG. 27D) on the DONE plane 33 at the same coordinates as the four pixels required on performing the CU pass decoding process to the processing bit plane data D35 equivalent to the four pixels so as to send it to the CU pass decoding processing portion 177.

In this case, the CU pass decoding processing portion 177 can store and hold at least three past samples of each of the processing bit plane data D35 equivalent to the four pixels and the positive and negative sign plane data D36, SIG plane data D30, REF plane data D31 and DONE plane data D32 corresponding thereto sequentially supplied from the signal switcher 174.

Here, one word is equivalent to one sample as to the processing bit plane data D35, REF plane data D31 and DONE plane data D32, and vertically arranged two words are equivalent to one sample as to the positive and negative sign plane data D36 and SIG plane data D30.

And if one symbol equivalent of the symbol data D34 is given from the arithmetic decoder portion 113 (FIG. 41), the CU pass decoding processing portion 177 performs the CU pass decoding process or SP pass decoding process as required as with the CU pass decoding processing portion 123 (FIG. 34) of the decoding apparatus 100 (FIG. 32) according to the first embodiment, and sends the context CX obtained then to the arithmetic decoder portion 113 (FIG. 41) via the output switcher 124 as the context data D33 and also stores the decoded processing bit plane data D35 and the decoded positive and negative sign plane data D36 obtained together with it in the corresponding positions in the bit plane buffers 116A, 116B or the positive and negative sign plane buffer 171. Furthermore, the CU pass decoding processing portion 177 updates the SIG plane data D30, REF plane data D31 and/or DONE plane data D32 as required, and writes back the updated SIG plane data D30, REF plane data D31 and DONE plane data D32 to their original address positions in the SRAMs 172 and 52B.

Thus, it is possible for the bit demodel portion 173 to reduce the number of times of memory access on processing one stripe column 23A of the processing bit plane data D35 by deviating the phase of an access unit (one word) of the positive and negative sign plane data and the SIG plane data on the CBM-processing by 2 bits from the stripe column on the processing bit plane 22.

(3-3) Operation and Effects of the Second Embodiment

In the above configuration, the bit model portion 163 and the bit demodel portion 173 according to this embodiment perform the CBM processing with the four pixels constituting the stripe column 23A on the processing bit plane 22 as a unit. At this time, the positive and negative sign plane data D20, D36 and the SIG plane data D22, D30 are read from the positive and negative sign plane buffers 161, 171 or the SRAMs 162, 172 with the 4 bits deviated vertically by 2 bits from the stripe column 23A as an access unit (one word).

Therefore, as is evident by comparing FIG. 28 to FIG. 39, the bit model portion 54 and bit model portion 114 according to the first embodiment required reading (memory access) of the positive and negative sign plane data D20, D36 and the SIG plane data D22, D30 equivalent to 9 words on CBM-processing the processing bit plane data D21 and D35 equivalent to one stripe column 23A. In comparison, the bit model portion 163 and bit demodel portion 173 according to the second embodiment only require reading (memory access) of the positive and negative sign plane data D20, D36 and the SIG plane data D22, D30 equivalent to 6 words so that it can further dramatically reduce the number of times of accessing the positive and negative sign plane buffers 50, 115 and the SRAMs 52A, 111A on the CBM processing.

To calculate the number of times of reading the SIG plane data D22, D30 from the memory on processing the processing bit plane 22 of 64×64 size in reality for instance, according to the technique of the first embodiment, it requires 8,740 times of memory access in the case of the overlap reading configuration and 2,944 times of memory access in the case of the updated portion limited reading configuration. According to the technique of this embodiment, however, it only requires 6,080 times of memory access in the case of the overlap reading configuration and 2,048 times of memory access in the case of the updated portion limited reading configuration as with this embodiment.

Thus, it is possible, by adopting the above-mentioned configuration of the second embodiment as the configuration of the bit model portion 163 or the bit demodel portion 173 of the encoding apparatus 40 and the decoding apparatus 100 in compliance with the JPEG 2000 standard, to further speed up the CBM processing in the bit model portion 163 or the bit demodel portion 173. And it is also possible to thereby reduce the power consumption of the bit model portion 163 or the bit demodel portion 173.

According to the above configuration, it is possible to perform the CBM processing with the four pixels constituting the stripe column 23A on the processing bit plane 22 as a unit and read the positive and negative sign plane data D20, D36 and the SIG plane data D22, D30 from the positive and negative sign plane buffers 161, 171 or the SRAMs 162, 172 with the 4 bits deviated vertically by 2 bits from the stripe column 23A as an access unit (one word) then so as to further dramatically reduce the number of times of accessing the positive and negative sign plane buffers 50, 115 and the SRAMs 52A, 111A on the CBM processing in comparison with the first embodiment. Thus, it is possible to implement the encoding apparatus and the decoding apparatus capable of further speeding up the encoding process and the decoding process.

Figure 43:
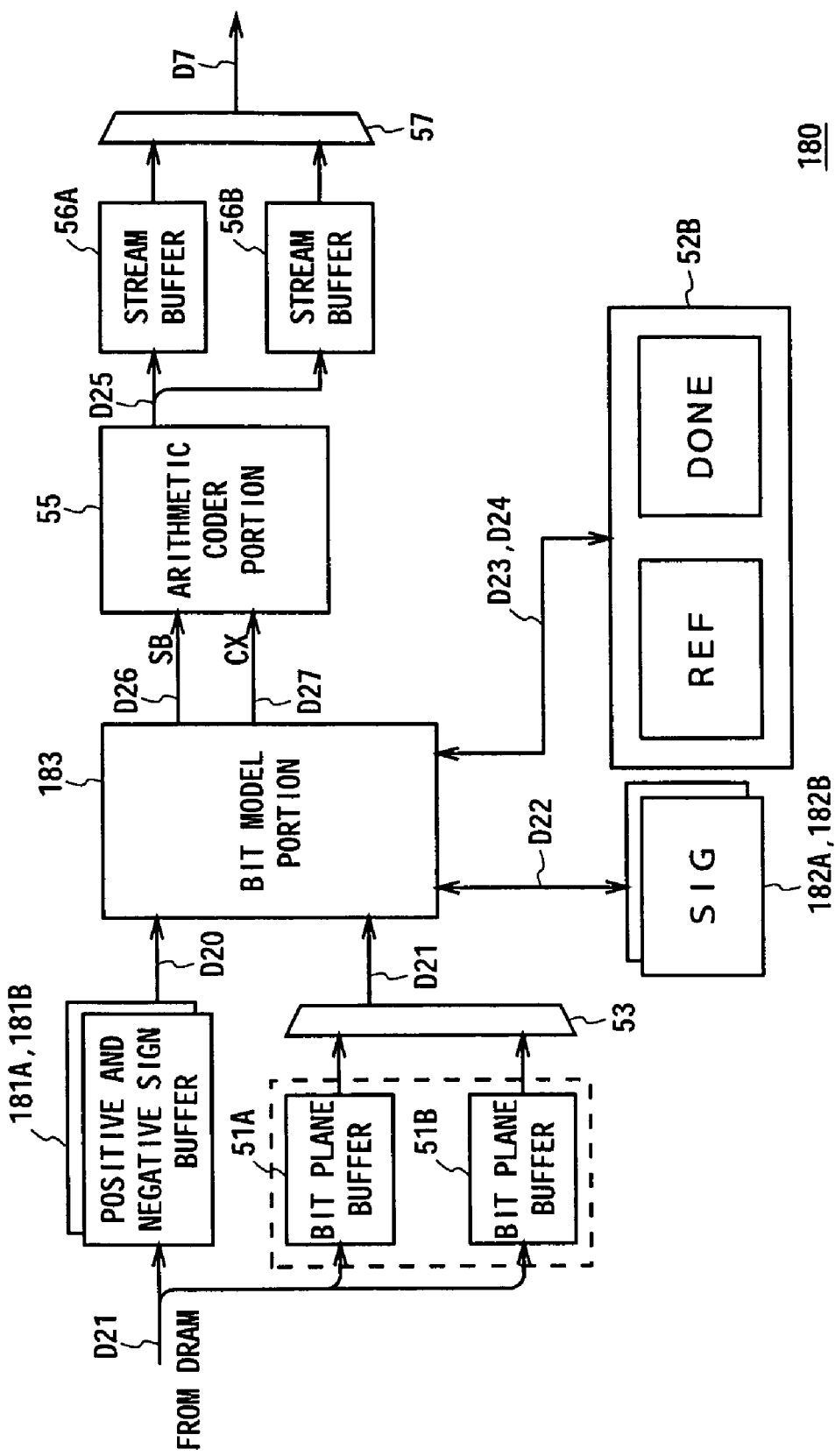
FIG. 43 is a block diagram showing the configuration of the EBCOT block of the encoding apparatus according to a third embodiment.

(4) Third Embodiment (4-1) Configuration of an EBCOT Block of the Encoding Apparatus 40 According to a Third Embodiment FIG. 43 indicates the portions corresponding to FIG. 38 by giving them the same symbols, and shows an EBCOT block 180 according to a third embodiment applied to the encoding apparatus 40 in compliance with the JPEG 2000 standard as to FIG. 24. The EBCOT block 180 has approximately the same configuration as the EBCOT block 160 (FIG. 38) according to the second embodiment except that the positive and negative sign plane data D20 and the SIG plane data D22 equivalent to two words can be read by one clock.

Figure 45:
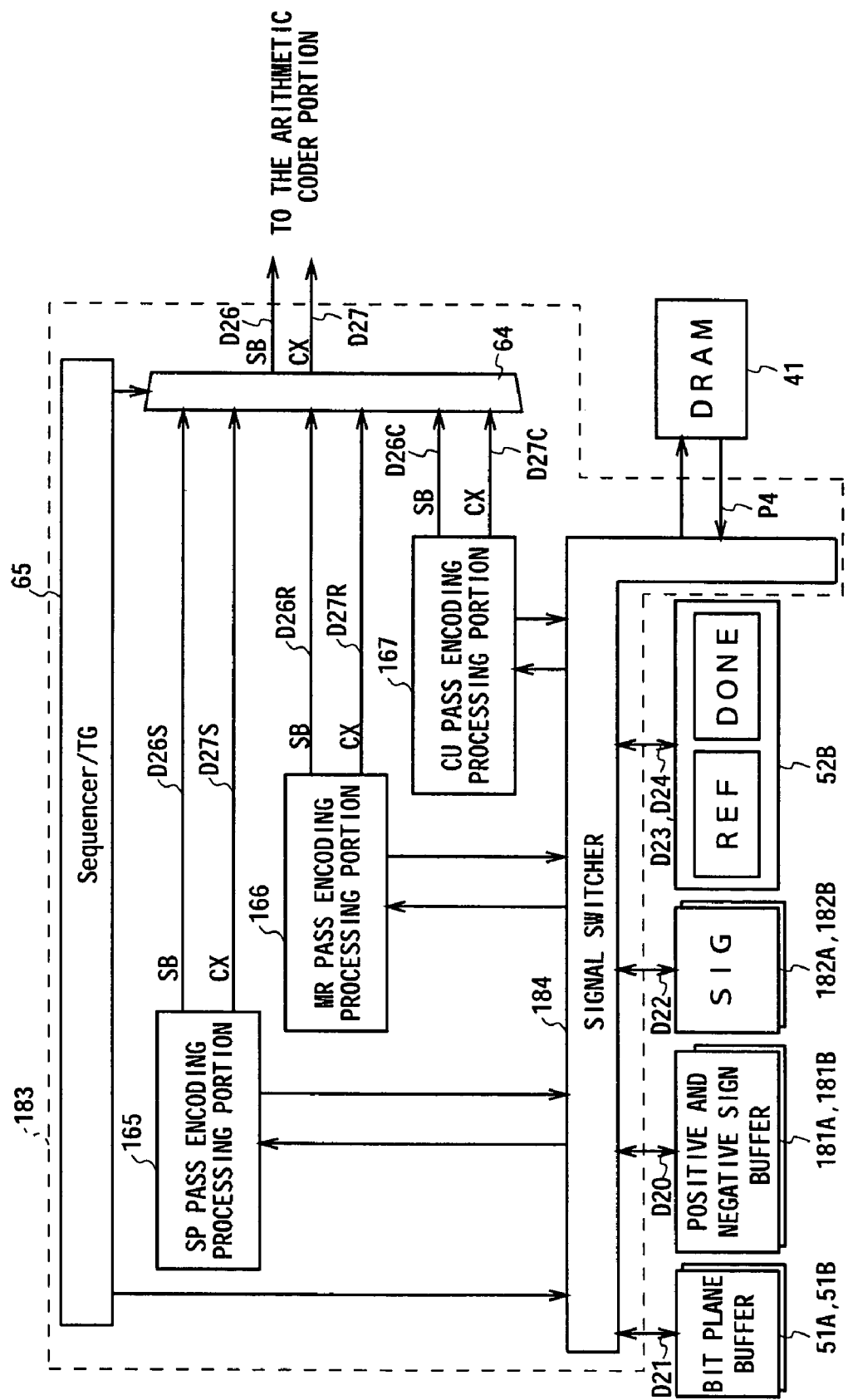
FIG. 45 is a block diagram showing the configuration of the bit model portion of the EBCOT block shown in FIG. 43.

To be more specific, in the case of the EBCOT block 180, two positive and negative sign plane buffers 181A and 181B are provided. As shown in FIG. 45, of the positive and negative sign plane data D20 read from the DRAM 41 (FIG. 24) in compliance with the scan order in the bit plane, the positive and negative sign plane data D20 belonging to one group is stored and held in one positive and negative sign plane buffer (hereafter, referred to as a first positive and negative sign plane buffer) 181A and the positive and negative sign plane data D20 belonging to the other group is stored and held in the other positive and negative sign plane buffer (hereafter, referred to as a second positive and negative sign plane buffer) 181B in the case of sequentially and alternately dividing the positive and negative sign plane 30 with a strip as a unit.

As described above about FIG. 39, each of the first and second positive and negative sign plane buffers 181A and 181B has a storage area for the positive and negative sign plane data D20 assigned to itself extended by 2 bits upward and downward over the area used for actual storage of the positive and negative sign plane data D20 respectively. It is thus possible to collectively read and write them by one clock with the positive and negative sign plane data D20 of vertically arranged 4 bits of which phase is deviated by 2 bits from the four pixels constituting one stripe column 23A on the processing bit plane 22 as one word.

Figure 44:
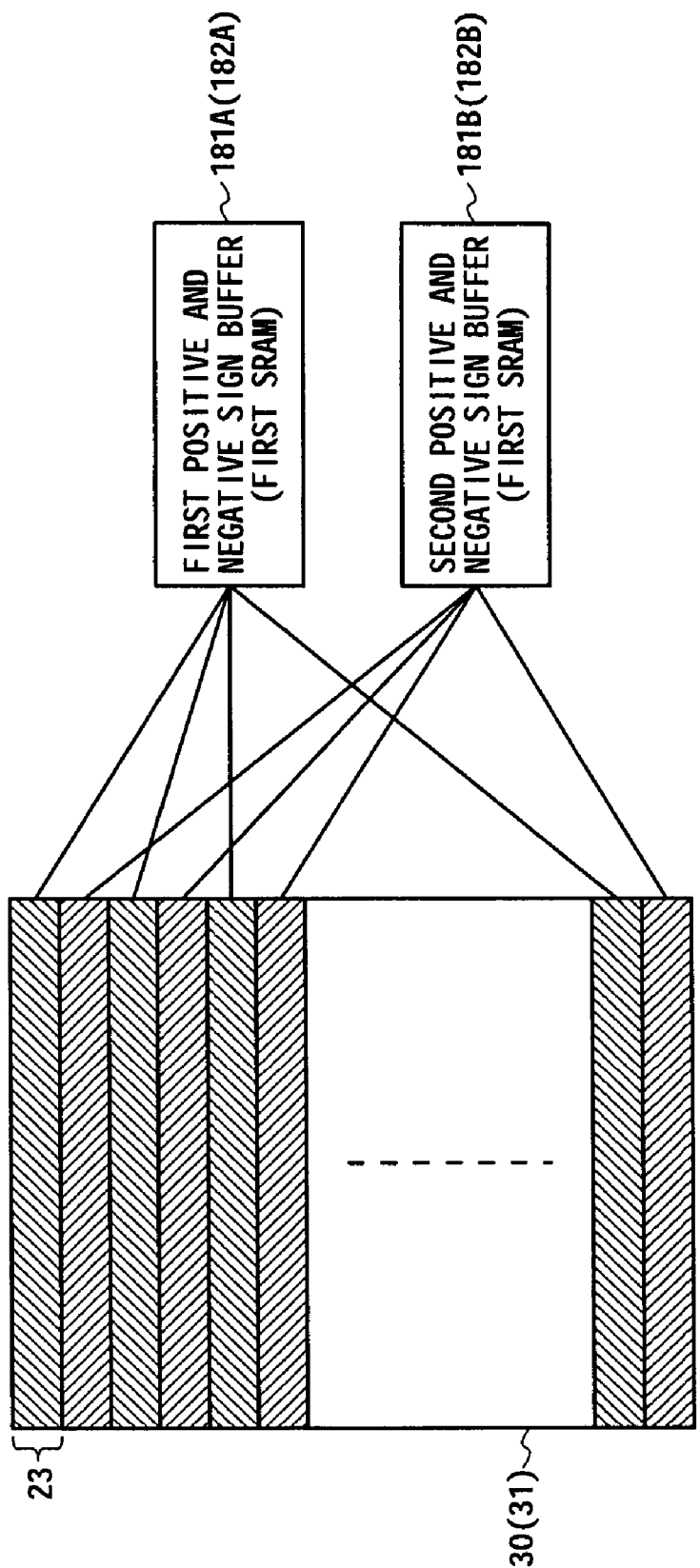
FIG. 44 is a conceptual diagram for explaining distribution of positive and negative sign plane data or SIG plane data.

The EBCOT block 180 also has two SRAMs 182A and 182B for storing and holding the SIG plane data D22 provided thereto. As shown in FIG. 44, of the SIG plane data D22, the SIG plane data D22 belonging to one group is stored and held in one SRAM (hereafter, referred to as a first SRAM) 182A and the SIG plane data D22 belonging to the other group is stored and held in the other SRAM (hereafter, referred to as a second SRAM) 182B in the case of sequentially and alternately dividing the SIG plane 31 with a strip as a unit.

In this case, as described above about FIG. 39, each of the first and second SRAMs 182A and 182B has a storage area for the SIG plane data D22 assigned to itself extended by 2 bits upward and downward over the area used for actual storage of the SIG plane data D22 respectively. It is thus possible to collectively read and write them by one clock with the SIG plane data D22 of vertically arranged 4 bits of which phase is deviated by 2 bits from the four pixels constituting one stripe column 23A on the processing bit plane 22 as one word.

As shown in FIG. 45 giving the same symbols to the portions corresponding to FIG. 40, a bit model portion 183 of the EBCOT block 180 has the same configuration as the bit model portion 163 of the encoding apparatus 40 (FIG. 24) according to the second embodiment except the configuration of a signal switcher 184.

And when CBM-processing the processing bit plane 22 other than the top bit plane 22T, the signal switcher 184 sequentially reads the processing bit plane data D21 word by word from the processing bit plane buffers 51A and 51B with the four pixels constituting one stripe column 23A shown in FIG. 27A as one word according to the scan order in the bit plane under control of the control portion 65 so as to send it first to the SP pass encoding processing portion 165.

In synchronization therewith, the signal switcher 184 sequentially reads from the first and second positive and negative sign plane buffers 181A and 181B the positive and negative sign plane data D20 of the 4 bits and upper and lower bits thereof (6 bits in total, refer to FIG. 27C) on the positive and negative sign plane 30 at the same coordinates as the four pixels required on performing the SP pass encoding process to the processing bit plane data D21 equivalent to the four pixels read from the processing bit plane buffers 51A and 51B so as to send it to the SP pass encoding processing portion 165.

In this case, as against the positive and negative sign plane data of total 6 bits required on performing the SP pass encoding process to the processing bit plane data D21 equivalent to the four pixels read from the processing bit plane buffers 51A and 51B, the signal switcher 184 reads from the corresponding first and second positive and negative sign plane buffers 181A and 181B each of the positive and negative sign plane data D20 equivalent to one word (4 bits) deviated upward by 2 bits from the 4 bits and the positive and negative sign plane data D20 equivalent to one word (4 bits) deviated downward by 2 bits from the 4 bits on the positive and negative sign plane 30 at the same coordinates as the four pixels in reality respectively by one clock simultaneously so as to send it to the SP pass encoding processing portion 165.

Furthermore, in synchronization therewith, the signal switcher 184 sequentially reads from the first and second SRAMs 182A and 182B the SIG plane data D22 of the 4 bits and upper and lower bits thereof (6 bits in total, refer to FIG. 27B) on the SIG plane 31 at the same coordinates as the four pixels respectively required on performing the SP pass encoding process to the processing bit plane data D21 equivalent to the four pixels so as to send it to the SP pass encoding processing portion 165.

In this case, as against the SIG plane data D22 of total 6 bits required on performing the SP pass encoding process to the processing bit plane data D21 equivalent to the four pixels read from the processing bit plane buffers 51A and 51B, the signal switcher 184 reads from the first and second SRAMs 182A and 182B the SIG plane data D22 equivalent to one word (4 bits) deviated upward by 2 bits from the 4 bits and the SIG plane data D22 equivalent to one word (4 bits) deviated downward by 2 bits from the 4 bits on the SIG plane 31 at the same coordinates as the four pixels in reality respectively by one clock simultaneously so as to send it to the SP pass encoding processing portion 165.

Furthermore, in synchronization therewith, the signal switcher 184 sequentially reads from the SRAM 52B the REF plane data D23 equivalent to one word (refer to FIG. 27E) on the REF plane 32 at the same coordinates as the four pixels and the DONE plane data D24 equivalent to one word (refer to FIG. 27D) on the DONE plane 33 at the same coordinates as the four pixels required on performing the SP pass encoding process to the processing bit plane data D21 equivalent to the four pixels as with the signal switcher 164 (FIG. 40) of the second embodiment so as to send it to the SP pass encoding processing portion 165.

Thus, the bit model portion 183 has the SP pass encoding process performed by the SP pass encoding processing portion 165 thereafter as required as with the second embodiment, and the symbol SB obtained then is sent to the output switcher 64 as the symbol data D26S and the context CX is sent to the output switcher 64 as the context data respectively. And the SIG plane data D22, REF plane data D23 and/or DONE plane data D24 are updated as required, and the updated SIG plane data D22, REF plane data D23 and DONE plane data D24 are further written back to their original address positions in the first or second SRAM 182A, 182B or the SRAM 52B.

On thus finishing the SP pass encoding process for the data of 1 bit plane (processing bit plane data D21) stored in the processing bit plane buffers 51A and 51B, the signal switcher 184 sequentially reads the same processing bit plane data D21 word by word from the processing bit plane buffers 51A and 51B with the four pixels constituting one stripe column 23A shown in FIG. 27A as one word in compliance with the scan order in the bit plane under control of the control portion 65 likewise thereafter so as to send it to the MR pass encoding processing portion 166.

In synchronization therewith, the signal switcher 184 sequentially reads from the first and second SRAM 182A and 182B the SIG plane data D22 of the 4 bits and upper and lower bits thereof (6 bits in total, refer to FIG. 27B) on the SIG plane 31 at the same coordinates as the four pixels required on performing the MR pass encoding process to the processing bit plane data D21 equivalent to the four pixels read from the processing bit plane buffers 51A and 51B so as to send it to the MR pass encoding processing portion 166.

In this case, as against the SIG plane data D22 of total 6 bits, the signal switcher 184 reads from the first or second SRAM 182A or 182B the SIG plane data D22 equivalent to one word (4 bits) deviated upward by 2 bits from the 4 bits and the SIG plane data D22 equivalent to one word (4 bits) deviated downward by 2 bits from the 4 bits on the SIG plane 31 at the same coordinates respectively as the four pixels corresponding thereto in reality respectively by one clock simultaneously so as to send it to the MR pass encoding processing portion 166.

Furthermore, in synchronization therewith, the signal switcher 184 sequentially reads from the SRAM 52B the REF plane data D23 equivalent to one word (refer to FIG. 27E) on the REF plane 32 at the same coordinates as the four pixels and the DONE plane data D24 equivalent to one word (refer to FIG. 25D) on the DONE plane 33 at the same coordinates as the four pixels respectively required on performing the MR pass encoding process to the processing bit plane data D21 equivalent to the four pixels as with the signal switcher 164 (FIG. 40) according to the second embodiment so as to send it to the MR pass encoding processing portion 166.

Thus, the bit model portion 183 has the MR pass encoding process performed by the MR pass encoding processing portion 166 as required as with the second embodiment, and the symbol SB obtained then is sent to the output switcher 64 as the symbol data D26S and the context CX is sent to the output switcher as the context data respectively. And the SIG plane data D22, REF plane data D23 and/or DONE plane data D24 are updated as required, and the updated SIG plane data D22, REF plane data D23 and DONE plane data D24 are further written back to their original address positions in the first or second SRAM 182A, 182B or the SRAM 52B.

On thus finishing the MR pass encoding process for the data of 1 bit plane (processing bit plane data D21) stored in the processing bit plane buffers 51A and 51B, the signal switcher 184 sequentially reads the same processing bit plane data D21 word by word from the processing bit plane buffers 51A and 51B in compliance with the scan order in the bit plane under control of the control portion 65 likewise thereafter so as to send it to the CU pass encoding processing portion 167.

In synchronization therewith, the signal switcher 184 sequentially reads from the first and second positive and negative sign plane buffers 181A and 181B the positive and negative sign plane data D20 of the 4 bits and upper and lower bits thereof (6 bits in total, refer to FIG. 27C) on the positive and negative sign plane 30 at the same coordinates as the four pixels required on performing the CU pass encoding process to the processing bit plane data D21 equivalent to the four pixels read from the processing bit plane buffers 51A and 51B so as to send it to the CU pass encoding processing portion 167.

In this case, as against the positive and negative sign plane data D20 of total 6 bits, the signal switcher 184 reads from the first and second positive and negative sign plane buffers 181A and 181B the positive and negative sign plane data D20 equivalent to one word (4 bits) deviated upward by 2 bits from the 4 bits and the positive and negative sign plane data D20 equivalent to one word (4 bits) deviated downward by 2 bits from the 4 bits on the positive and negative sign plane 30 at the same coordinates respectively as the four pixels corresponding thereto in reality respectively by one clock simultaneously as with the SP pass encoding processing portion 165 so as to send it to the CU pass encoding processing portion 167.

In synchronization therewith, the signal switcher 184 sequentially reads from the first and second SRAM 182A and 182B the SIG plane data D22 of the 4 bits and upper and lower bits thereof (6 bits in total, refer to FIG. 27B) on the SIG plane 31 at the same coordinates as the four pixels respectively required on performing the CU pass encoding process to the processing bit plane data D21 equivalent to the four pixels so as to send it to the CU pass encoding processing portion 167.

In this case, as against the SIG plane data D22 of total 6 bits, the signal switcher 184 reads from the first or second SRAM 182A or 182B the SIG plane data D22 equivalent to one word (4 bits) deviated upward by 2 bits from the 4 bits and the SIG plane data D22 equivalent to one word (4 bits) deviated downward by 2 bits from the 4 bits on the SIG plane 31 at the same coordinates respectively as the four pixels corresponding thereto in reality respectively by one clock simultaneously so as to send it to the CU pass encoding processing portion 167.

Furthermore, in synchronization therewith, the signal switcher 184 reads from the SRAM 52B the REF plane data D23 equivalent to one word (refer to FIG. 27E) on the REF plane 32 at the same coordinates as the four pixels and the DONE plane data D24 equivalent to one word (refer to FIG. 27D) on the DONE plane 33 at the same coordinates as the four pixels respectively required on performing the CU pass encoding process to the processing bit plane data D21 equivalent to the four pixels as with the signal switcher 164 (FIG. 40) according to the second embodiment so as to send it to the CU pass encoding processing portion 167.

Thus, the bit model portion 183 has the CU pass encoding process or the SP pass encoding process performed thereafter by the CU pass encoding processing portion 167 as required as with the second embodiment, and the symbol SB obtained then is sent to the output switcher 64 as the symbol data D26S and the context CX is sent to the output switcher as the context data respectively. And the SIG plane data D22, REF plane data D23 and/or DONE plane data D24 are updated as required, and the updated SIG plane data D22, REF plane data D23 and DONE plane data D24 are further written back to their original address positions in the first or second SRAM 52A or SRAM 52B.

Thus, the bit model portion 183 has the two positive and negative sign plane buffers 181A and 181B as the memory for storing and holding the positive and negative sign plane data D20 and two first and second SRAMs 182A and 182B as the memory for storing and holding the SIG plane data D22 provided thereto so as to further reduce the number of times of memory access on processing one stripe column 23A of the processing bit plane data D21.

Figure 46:
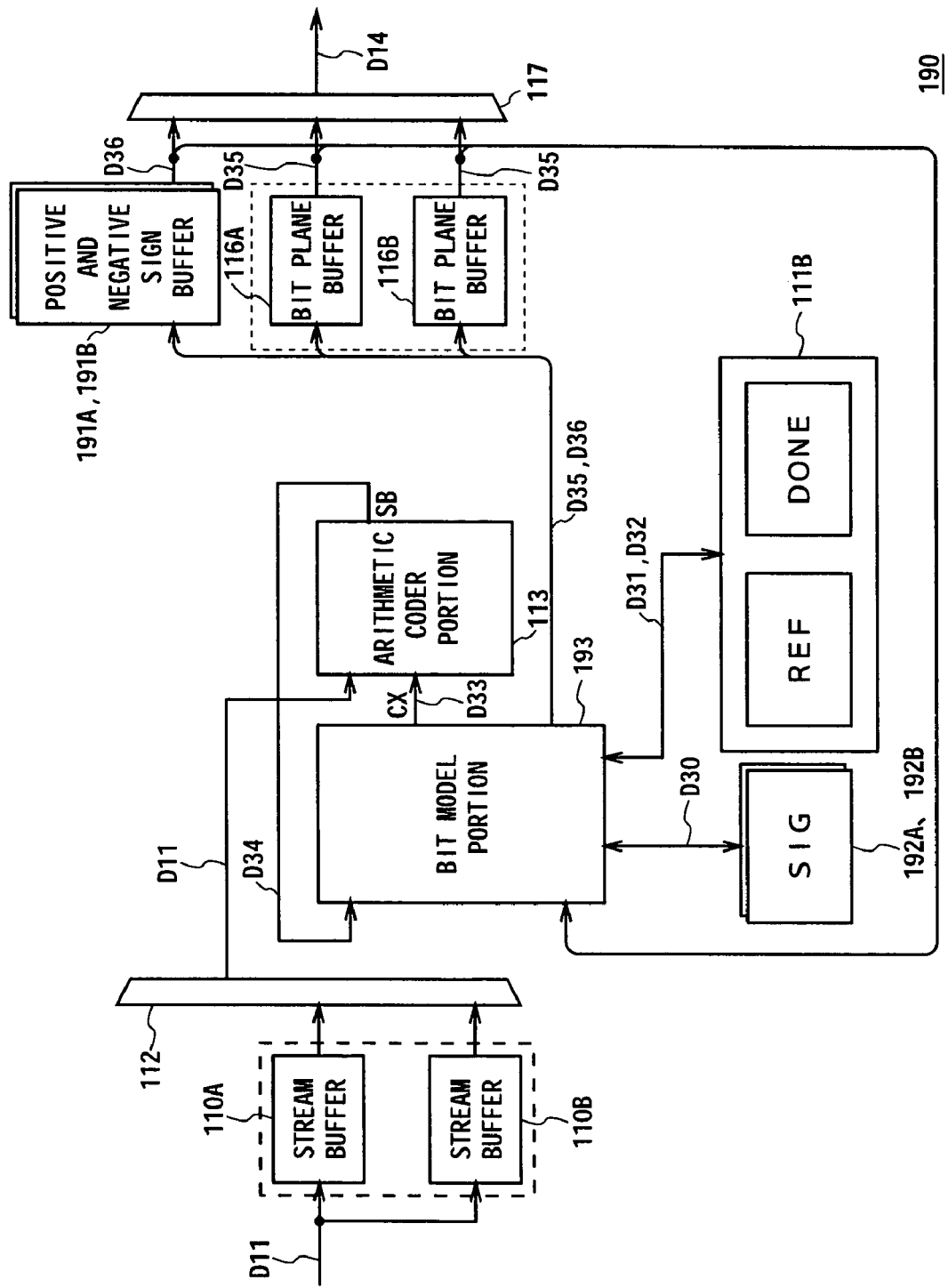
FIG. 46 is a block diagram showing the configuration of the EBCOT block of the decoding apparatus according to the third embodiment.

(4-2) Configuration of an EBCOT Block 190 of the Decoding Apparatus 100 According to the Third Embodiment FIG. 46 indicates the portions corresponding to FIG. 41 by giving them the same symbols, and shows an EBCOT block 190 according to the third embodiment applied to the decoding apparatus 100 in compliance with the above-mentioned JPEG 2000 standard as to FIG. 32. The EBCOT block 190 has approximately the same configuration as the EBCOT block 170 (FIG. 40) of the decoding apparatus 100 (FIG. 32) according to the second embodiment except that the positive and negative sign plane data D36 and the SIG plane data D30 equivalent to two words can be read by one clock.

To be more specific, in the case of the EBCOT block 190, two positive and negative sign plane buffers 191A and 191B are provided. As shown in FIG. 44, of the decoded positive and negative sign plane data D36, the positive and negative sign plane data D36 belonging to one group is stored and held in one positive and negative sign plane buffer (hereafter, referred to as a first positive and negative sign plane buffer) 191A and the positive and negative sign plane data D36 belonging to the other group is stored and held in the other positive and negative sign plane buffer (hereafter, referred to as a second positive and negative sign plane buffer) 191B in the case of sequentially and alternately dividing the positive and negative sign plane 30 with a stripe as a unit.

As described above about FIG. 39, each of the first and second positive and negative sign plane buffers 191A and 191B has a storage area for the positive and negative sign plane data D36 assigned to itself extended by 2 bits upward and downward over the area used for actual storage of the positive and negative sign plane data D36 respectively. It is thus possible to collectively read and write them by one clock with the positive and negative sign plane data D36 of vertically arranged 4 bits of which phase is deviated by 2 bits from the four pixels constituting one stripe column 23A on the processing bit plane 22 as one word.

The EBCOT block 190 also has two SRAMs 192A and 192B for storing and holding the SIG plane data D30 provided thereto. As shown in FIG. 44, of the SIG plane data D30, the SIG plane data D30 belonging to one group is stored and held in one SRAM (hereafter, referred to as a first SRAM) 192A and the SIG plane data D30 belonging to the other group is stored and held in the other SRAM (hereafter, referred to as a second SRAM) 192B in the case of sequentially and alternately dividing the SIG plane 31 with a stripe as a unit.

In this case, as described above about FIG. 39, each of the first and second SRAMs 192A and 192B has a storage area for the SIG plane data D30 assigned to itself extended by 2 bits upward and downward over the area used for actual storage of the SIG plane data D30 respectively. It is thus possible to collectively read and write them by one clock with the SIG plane data D30 of vertically arranged 4 bits of which phase is deviated by 2 bits from the four pixels constituting one stripe column 23A on the processing bit plane 22 as one word.

Figure 47:
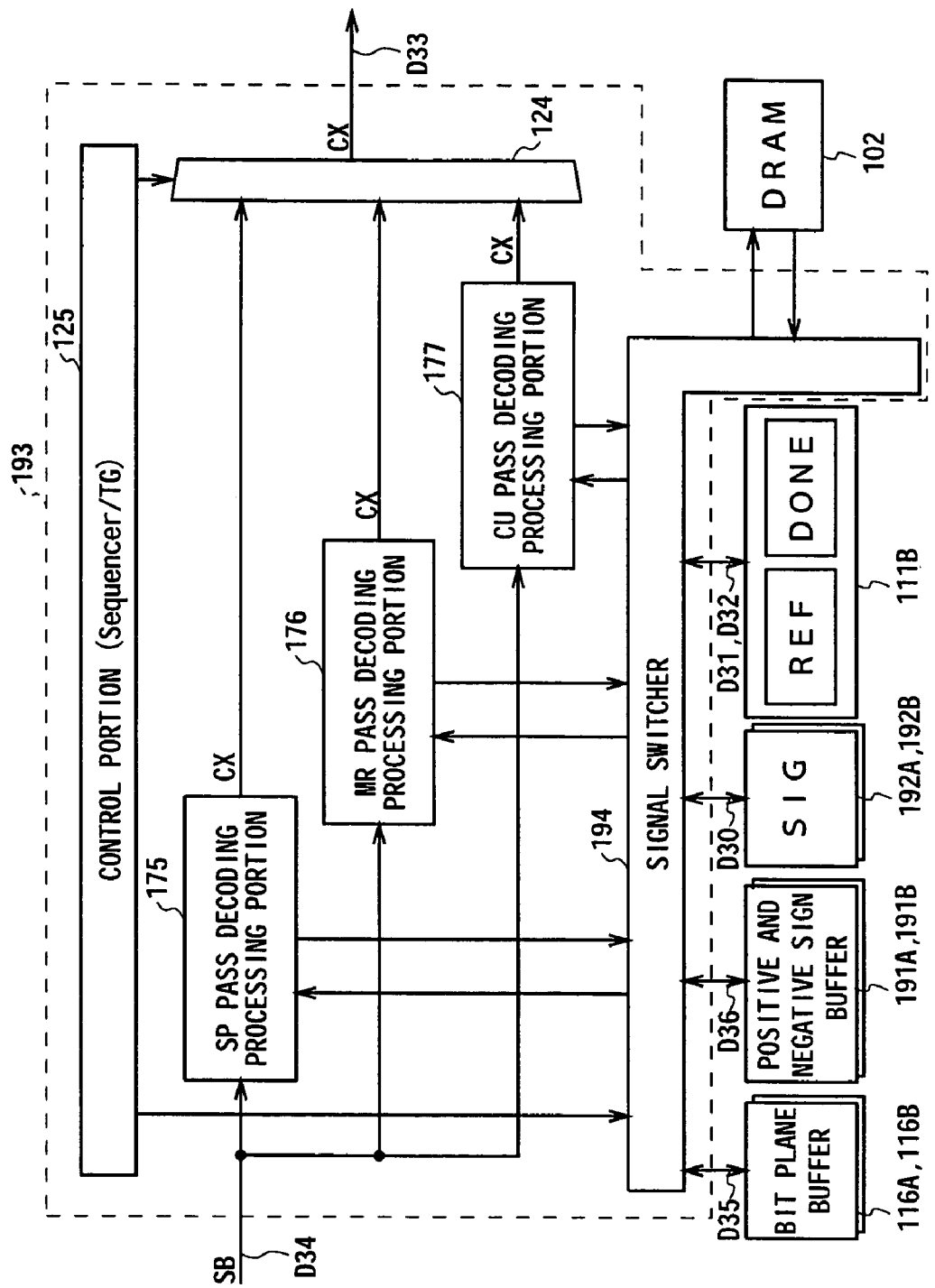
FIG. 47 is a block diagram showing the configuration of the bit model portion of the EBCOT block shown in FIG. 46.

As shown in FIG. 47 giving the same symbols to the portions corresponding to FIG. 42, a bit demodel portion 193 of the EBCOT block 190 has the same configuration as the bit demodel portion 173 (FIG. 42) of the decoding apparatus 100 (FIG. 32) according to the second embodiment except the configuration of a signal switcher 194.

And the signal switcher 194 sequentially reads the processing bit plane data D35 before decoding or partially decoded stored and held in the bit plane buffers 116A and 1161B word by word from the bit plane buffers 116A and 1161B with the four pixels constituting one stripe column 23A shown in FIG. 27A as one word according to the scan order in the bit plane under control of the control portion 125 so as to send it first to the SP pass decoding processing portion 175.

In synchronization therewith, the signal switcher 194 sequentially reads from the first and second positive and negative sign plane buffers 191A and 191B the positive and negative sign plane data D36 before decoding or partially decoded of the 4 bits and upper and lower bits thereof (6 bits in total, refer to FIG. 27C) on the positive and negative sign plane 30 at the same coordinates as the four pixels respectively required on performing the SP pass decoding process to the processing bit plane data D35 equivalent to the four pixels read from the bit plane buffers 116A and 116B so as to send it to the SP pass decoding processing portion 175.

In this case, an access unit (one word) for the signal switcher 194 is the positive and negative sign plane data D36 of the vertical 4 bits of which phase is deviated vertically on the positive and negative sign plane 30 by 2 bits from the stripe column 23A on the processing bit plane 22 as described above. Therefore, as against the positive and negative sign plane data D36 of total 6 bits, the signal switcher 194 reads from the corresponding first or second positive and negative sign plane buffer 191A or 191B each of the positive and negative sign plane data D36 equivalent to one word (4 bits) deviated upward by 2 bits from the 4 bits and the positive and negative sign plane data D36 equivalent to one word (4 bits) deviated downward by 2 bits from the 4 bits on the positive and negative sign plane 30 at the same coordinates as the four pixels in reality respectively by one clock simultaneously so as to send it to the SP pass decoding processing portion 175.

Furthermore, in synchronization therewith, the signal switcher 194 sequentially reads from the first and second SRAMs 192A and 192B the SIG plane data D30 of the 4 bits and upper and lower bits thereof (6 bits in total, refer to FIG. 27B) on the SIG plane 31 at the same coordinates as the four pixels respectively required on performing the SP pass decoding process to the processing bit plane data D35 equivalent to the four pixels so as to send it to the SP pass decoding processing portion 175.

In this case, as against the SIG plane data D30 of total 6 bits required on performing the SP pass decoding process to the processing bit plane data D21 equivalent to the four pixels read from the processing bit plane buffers 51A and 51B, the signal switcher 194 reads from the corresponding first and second SRAMs 192A and 192B each of the SIG plane data D30 equivalent to one word (4 bits) deviated upward by 2 bits from the 4 bits and the SIG plane data D30 equivalent to one word (4 bits) deviated downward by 2 bits from the 4 bits on the SIG plane 31 at the same coordinates as the four pixels in reality respectively by one clock simultaneously so as to send it to the SP pass decoding processing portion 175.

Furthermore, in synchronization therewith, the signal switcher 194 sequentially reads from the SRAM 111B the REF plane data D31 equivalent to one word (refer to FIG. 27E) on the REF plane 32 at the same coordinates as the four pixels respectively and the DONE plane data D32 equivalent to one word (refer to FIG. 27D) on the DONE plane 33 at the same coordinates as the four pixels required on performing the SP pass decoding process to the processing bit plane data D35 equivalent to the four pixels as with the signal switcher 174 (FIG. 42) of the second embodiment so as to send it to the SP pass decoding processing portion 175.

Thus, the bit demodel portion 193 has the SP pass decoding process performed by the SP pass decoding processing portion 175 thereafter as required as with the second embodiment, and the context CX obtained then is sent to the arithmetic decoder portion 113 (FIG. 46) via the output switcher 124 as the context data D33, and the decoded processing bit plane data D35 obtained along with it and the decoded positive and negative sign plane data D36 are stored at the corresponding positions in the bit plane buffers 116A and 116B or the first or second positive and negative sign plane buffer 191A or 191B respectively. The SIG plane data D30, REF plane data D31 and/or DONE plane data D32 are updated as required, and the updated SIG plane data D30, REF plane data D31 and DONE plane data D32 are further written back to their original address positions in the first or second SRAM 192A or 192B or the SRAM 111B.

Of the encoded data D11 read from the stream buffers 110A and 110B, the arithmetic decoder portion 113 (FIG. 46) sends to the MR pass decoding processing portion 176 the symbol data D34 acquired by performing the above-mentioned arithmetic decoding calculation process to the encoded data D11 obtained by performing the MR pass encoding process in the encoding apparatus 40 (FIG. 24).

In this case, the signal switcher 194 sequentially reads from the bit plane buffers 116A and 116B the processing bit plane data D35 partially decoded by a preceding SP pass decoding process and stored and held in the bit plane buffers 116A and 116B word by word with the four pixels constituting one stripe column 23A shown in FIG. 27A as one word in compliance with the scan order in the bit plane under control of the control portion 125 so as to send it to the MR pass decoding processing portion 176.

In synchronization therewith, the signal switcher 194 sequentially reads from the first and second SRAMs 192A and 192B the SIG plane data D30 of the 4 bits and upper and lower bits thereof (6 bits in total, refer to FIG. 27B) on the SIG plane 31 at the same coordinates as the four pixels respectively required on decoding by the MR pass decoding process the processing bit plane data D35 equivalent to the four pixels read from the bit plane buffers 116A and 116B so as to send it to the MR pass decoding processing portion 176.

In this case, as against the SIG plane data D30 of total 6 bits required on performing the MR pass decoding process to the processing bit plane data D35 equivalent to the four pixels read from the bit plane buffers 116A and 116B, the signal switcher 194 reads from the corresponding first and second SRAMs 192A and 192B each of the SIG plane data D30 equivalent to one word (4 bits) deviated upward by 2 bits from the 4 bits and the SIG plane data D30 equivalent to one word (4 bits) deviated downward by 2 bits from the 4 bits on the SIG plane 31 at the same coordinates as the four pixels in reality respectively by one clock simultaneously as in the case of the SP pass decoding processing portion 175 so as to send it to the MR pass decoding processing portion 176.

Furthermore, in synchronization therewith, the signal switcher 194 sequentially reads from the SRAM 111B the REF plane data D31 equivalent to one word (refer to FIG. 27E) on the REF plane 32 at the same coordinates as the four pixels and the DONE plane data D32 equivalent to one word (refer to FIG. 27D) on the DONE plane 33 at the same coordinates as the four pixels required on performing the MR pass decoding process to the processing bit plane data D35 equivalent to the four pixels so as to send it to the MR pass decoding processing portion 176.

Thus, the bit demodel portion 193 has the SP pass decoding process performed by the MR pass decoding processing portion 121 thereafter as required as with the second embodiment, and the context CX obtained then is sent to the arithmetic decoder portion 113 (FIG. 46) via the output switcher 124 as the context data D33, and the decoded processing bit plane data D35 obtained along with it and the decoded positive and negative sign plane data D36 are stored at the corresponding positions in the bit plane buffers 116A and 116B or the first or second positive and negative sign plane buffer 191A or 191B respectively. The SIG plane data D30, REF plane data D31 and/or DONE plane data D32 are updated as required, and the updated SIG plane data D30, REF plane data D31 and DONE plane data D32 are further written back to their original address positions in the first or second SRAM 192A or 192B or the SRAM 111B.

Likewise, of the encoded data D11 read from the stream buffers 110A and 110B, the arithmetic decoder portion 113 (FIG. 46) sends to the CU pass decoding processing portion 177 the symbol data D34 acquired by performing the arithmetic decoding calculation process to the encoded data D11 obtained by performing the CU pass encoding process in the encoding apparatus 40 (FIG. 24).

In this case, the signal switcher 194 sequentially reads from the bit plane buffers 116A and 116B the processing bit plane data D35 partially decoded by the preceding SP pass decoding process and MR pass decoding process (except the case of the decoding process for the top bit plane 22T) and stored and held in the bit plane buffers 116A and 116B word by word with the four pixels constituting one stripe column 23A shown in FIG. 27A as one word in compliance with the scan order in the bit plane under control of the control portion 125 so as to send it to the CU pass decoding processing portion 177.

In synchronization therewith, the signal switcher 194 sequentially reads from the first and second positive and negative sign plane buffers 191A and 191B the positive and negative sign plane data D36 before decoding or partially decoded of the 4 bits and upper and lower bits thereof (6 bits in total, refer to FIG. 27C) on the positive and negative sign plane 30 at the same coordinates as the four pixels respectively required on decoding by the CU pass decoding process the processing bit plane data D35 equivalent to the four pixels read from the bit plane buffers 116A and 116B so as to send it to the CU pass decoding processing portion 177.

In this case, as against the positive and negative sign plane data D36 of total 6 bits required on performing the CU pass decoding process to the processing bit plane data D35 equivalent to the four pixels read from the processing bit plane buffers 51A and 51B, the signal switcher 194 reads from the corresponding first or second positive and negative sign plane buffers 191A or 191B each of the positive and negative sign plane data D36 equivalent to one word (4 bits) deviated upward by 2 bits from the 4 bits and the positive and negative sign plane data D36 equivalent to one word (4 bits) deviated downward by 2 bits from the 4 bits on the positive and negative sign plane at the same coordinates as the four pixels in reality respectively by one clock simultaneously as in the case of the above-mentioned SP pass decoding processing portion 175 so as to send it to the CU pass decoding processing portion 177.

Furthermore, in synchronization therewith, the signal switcher 194 sequentially reads from the first and second SRAMs 192A and 192B the SIG plane data D30 of the 4 bits and upper and lower bits thereof (6 bits in total, refer to FIG. 27B) on the SIG plane 31 at the same coordinates as the four pixels respectively required on decoding by the CU pass decoding process the processing bit plane data D35 equivalent to the four pixels so as to send it to the CU pass decoding processing portion 177.

In this case, as against the SIG plane data D30 of total 6 bits required on performing the CU pass decoding process to the processing bit plane data D35 equivalent to the four pixels read from the processing bit plane buffers 51A and 51B, the signal switcher 194 reads from the corresponding first and second SRAMs 192A and 192B each of the SIG plane data D30 equivalent to one word (4 bits) deviated upward by 2 bits from the 4 bits and the SIG plane data D30 equivalent to one word (4 bits) deviated downward by 2 bits from the 4 bits on the SIG plane 31 at the same coordinates as the four pixels in reality respectively by one clock simultaneously so as to send it to the CU pass decoding processing portion 177.

Furthermore, in synchronization therewith, the signal switcher 194 reads from the SRAM 111B the REF plane data D31 equivalent to one word (refer to FIG. 27E) on the REF plane 32 at the same coordinates as the four pixels and the DONE plane data D32 equivalent to one word (refer to FIG. 27D) on the DONE plane 33 at the same coordinates as the four pixels required on performing the CU pass decoding process to the processing bit plane data D35 equivalent to the four pixels as with the signal switcher 174 of the second embodiment (FIG. 42) so as to send it to the CU pass decoding processing portion 177.

Thus, the bit demodel portion 193 has the CU pass decoding process or the SP pass decoding process performed by the CU pass decoding processing portion 177 thereafter as required as with the second embodiment, and the context CX obtained then is sent to the arithmetic decoder portion 113 (FIG. 46) via the output switcher 124 as the context data D33, and the decoded processing bit plane data D35 and the decoded positive and negative sign plane data D36 obtained along with it are stored at the corresponding positions in the bit plane buffers 116A and 116B or the first or second positive and negative sign plane buffer 191A or 191B respectively. The SIG plane data D30, REF plane data D31 and/or DONE plane data D32 are updated as required, and the updated SIG plane data D30, REF plane data D31 and DONE plane data D32 are further written back to their original address positions in the first or second SRAM 192A or 192B or the SRAM 111B.

Thus, the bit demodel portion 193 has the two first and second positive and negative sign plane buffers 191A and 191B as the memory for storing and holding the positive and negative sign plane data D36 and the two first and second SRAMs 192A and 192B as the memory for storing and holding the SIG plane data D30 provided thereto so as to further reduce the number of times of memory access on processing one stripe column 23A of the processing bit plane data D35.

(4-3) Operation and Effects of the Third Embodiment

In the above configuration, the bit model portion 183 and the bit demodel portion 193 according to this embodiment store and hold the positive and negative sign plane data D20 and D36 in the positive and negative sign plane buffers 181A and 181B sequentially and alternately for each stripe 23 on the positive and negative sign plane 30, and store and hold the SIG plane data D22 and D30 in the corresponding first and second SRAM plane buffers 192A and 192B sequentially and alternately for each stripe 23 on the SIG plane 31. On the CBM processing, they read the necessary positive and negative sign plane data D20 and D30 equivalent to two words from each of the first and second positive and negative sign plane buffers 181A and 181B simultaneously by one clock and also read the necessary SIG plane data D22 and D30 equivalent to two words from each of the first and second SRAM plane buffers 192A and 192B simultaneously by one clock.

Therefore, on CBM-processing the processing bit plane data D21 and D35 equivalent to one stripe column 23A, the bit model portion 163 and bit demodel portion 173 according to the second embodiment require six clocks to read the necessary positive and negative sign plane data D20, D30 and SIG plane data D22 and D30. In comparison, the bit model portion 163 and bit demodel portion 173 according to the third embodiment only require three clocks so as to further dramatically reduce the number of times of memory access on the CBM processing.

To calculate the number of times of reading the SIG plane data D22 and D30 from the memory on processing the bit plane 22 of 64×64 size in reality, the technique of the second embodiment requires 6,080 times of memory access in the case of the overlap reading configuration and 2,048 times of memory access in the case of the updated portion limited reading configuration as described above. In comparison, the technique of this embodiment only requires 3,040 times of memory access in the case of the overlap reading configuration and 1,024 times of memory access in the case of the updated portion limited reading configuration as with this embodiment.

As shown in FIG. 48, the number 1,024 is about ⅕ of the overlap reading configuration in the conventional technique of reading the SIG plane data D22 and D30 from the memory bit by bit.

Therefore, it is possible to further speed up the CBM processing in the bit model portion 183 or the bit demodel portion 193 of the encoding apparatus 40 and the decoding apparatus 100 in compliance with the JPEG 2000 standard by adopting the above-mentioned configuration of the second embodiment as the configuration of the bit model portion 183 or the bit demodel portion 193. And it is also possible to thereby reduce the power consumption of the bit model portion 183 or the bit demodel portion 193.

According to the above configuration, in addition to the configuration of the second embodiment, the positive and negative sign plane data D20 and D30 are stored and held in the first and second positive and negative sign plane buffers 181A and 181B sequentially and alternately for each stripe 23 on the positive and negative sign plane 30, and the SIG plane data D22 and D30 are stored and held in the corresponding first and second SRAM plane buffers 192A and 192B sequentially and alternately for each stripe 23 on the SIG plane 31. On the CBM processing, the necessary positive and negative sign plane data D20 and D30 equivalent to two words are read from each of the first and second positive and negative sign plane buffers 181A and 181B simultaneously by one clock, and also the necessary SIG plane data D22 and D30 equivalent to two words are read from each of the first and second SRAM plane buffers 192A and 192B simultaneously by one clock. Thus, it is possible to further dramatically reduce the number of times of memory access on the CBM processing compared to the second embodiment so as to implement the encoding apparatus and the decoding apparatus capable of further speeding up the encoding process and the decoding process.

(5) Other Embodiments

The above-mentioned first to third embodiments described the cases of applying the present invention to the encoding apparatus 40 (FIG. 24) or the decoding apparatus 100 (FIG. 32) in compliance with the JPEG 2000 standard. However, the present invention is not limited thereto but is, in short, applicable to various encoding apparatuses and decoding apparatuses of other kinds which perform the encoding process or the decoding process by using state quantity information representing a predetermined state quantity sequentially updated according to processing situation of the encoding process for image information.

The above-mentioned first to third embodiments described the cases of constituting the bit model portions 54, 163 and 183 as encoding means for performing the encoding process to the processing bit plane data D21 as the image information for each stripe column 23A with the four pixels constituting one stripe column 23A as a processing unit as in FIG. 26, 37 or 42. However, the present invention is not limited thereto but various other configurations are applicable.

Furthermore, the above-mentioned first to third embodiments described the cases of applying the positive and negative sign plane buffers 50 and 115 comprised of SRAMs and the SRAMs 52A, 111A, 192A and 192B as storage means for storing the positive and negative sign plane data D20, SIG plane data D22, REF plane data D23 and DONE plane data D24 as the state quantity information to be used by the bit model portions 54, 163 and 183 on performing the CBM processing. However, the present invention is not limited thereto but memories other than the SRAMs are widely applicable.

Furthermore, the above-mentioned first to third embodiments described the cases of handling the vertically arranged 4 bits on the positive and negative sign plane 30, SIG plane 31, REF plane 32 and DONE plane 33 as one word correspondingly to one stripe column 23A of the processing bit plane data D21. However, the present invention is not limited thereto but may handle something other than this (vertically arranged 4 bits) as one word.

Furthermore, the above-mentioned first to third embodiments described the cases of performing the encoding process by a hardware process. However, the present invention is not limited thereto but may perform by a software process all of a first process of storing the positive and negative sign plane data D20, SIG plane data D22, REF plane data D23 and DONE plane data D24 in the corresponding positive and negative sign plane buffers 50, 161, 181A and 181B or SRAMs 52A, 52B, 162, 182A and 182B and a second process of reading the corresponding positive and negative sign plane data D20, SIG plane data D22, REF plane data D23 and/or DONE plane data D24 from the positive and negative sign plane buffers 50, 161, 181A and 181B or the SRAMs 52A, 52B, 162, 182A and 182B in the unit of a word for each stripe column 23A of the processing bit plane data D21 and performing the encoding process by using the read positive and negative sign plane data D20, SIG plane data D22, REF plane data D23 and/or DONE plane data D24.

Furthermore, the above-mentioned embodiments described the cases of constituting the bit model portions 114, 163 and 193 as decoding means for performing the decoding process to the encoded data D11 as encoded image information comprised of the image information which is encoded for each stripe column 23A with the four pixels constituting one stripe column 23A as a processing unit as in FIG. 34, FIG. 42 or FIG. 47. However, the present invention is not limited thereto but may have various other configurations widely applied thereto.

Furthermore, the above-mentioned first to third embodiments described the cases of applying the positive and negative sign plane buffers 115, 171, 191A and 191B comprised of the SRAMs and the SRAMs 111A, 111B, 172, 192A and 192B as the storage means for storing the positive and negative sign plane data D36, SIG plane data D30, REF plane data D31 and DONE plane data D32 as the state quantity information to be used when the bit model portions 114, 163 and 193 perform the CBM processing. However, the present invention is not limited thereto but may have memories and so on other than the SRAMs widely applied thereto.

Furthermore, the above-mentioned first to third embodiments described the cases of performing the decoding process by the hardware process. However, the present invention is not limited thereto but may perform by the software process all of the first process of storing the positive and negative sign plane data D35, SIG plane data D30, REF plane data D31 and DONE plane data D32 in the corresponding positive and negative sign plane buffers 115, 171, 191A and 191B or the SRAMs 111A, 111B, 172, 192A and 192B and the second process of reading the corresponding positive and negative sign plane data D36, SIG plane data D30, REF plane data D31 and/or DONE plane data D32 from the positive and negative sign plane buffers 115, 171, 191A and 191B or the SRAMs 111A, 111B, 172, 192A and 192B in the unit of a word for each stripe column 23A of the processing bit plane data D35 and performing the encoding process by using the read positive and negative sign plane data D35, SIG plane data D30, REF plane data D31 and DONE plane data D32.

The present invention is applicable to the encoding apparatus and decoding apparatus in compliance with the JPEG 2000 standard for instance, and besides, to the encoding apparatus and decoding apparatus in compliance with an encoding or decoding standard having an algorithm of encoding or decoding similar to it.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An encoding apparatus for encoding inputted image information, comprising:

encoding means for, with a predetermined plurality of pixels as a processing unit, performing a predetermined encoding process to the image information for each processing unit;

storage means for storing state quantity information representing a predetermined state quantity to be used while being sequentially updated according to a processing status of the encoding process when the encoding means performs the encoding process to the image information, wherein the storage means stores the state quantity information with the plurality of pixels corresponding to the processing unit of the image information as one word, and wherein the encoding means reads in the units of the word the state quantity information necessary to perform the encoding process to the image information of the processing unit from the storage means.

2. The encoding apparatus according to claim 1, comprising the number of the storage means according to the number of the words of the state quantity information necessary to perform the encoding process when the encoding means performs the encoding process to the image information of the processing unit, wherein the state quantity information equivalent to the number of the words is stored by being dispersed on the storage means so as to be simultaneously readable.

3. The encoding apparatus according to claim 1, wherein the storage means stores the state quantity information by shifting the processing unit and a phase of the image information by a predetermined amount.

4. The encoding apparatus according to claim 3, comprising the number of the storage means according to the number of the words of the state quantity information necessary when the encoding means performs the encoding process to the image information of the processing unit, wherein the state quantity information equivalent to the number of the words is stored by being dispersed on the storage means so as to be simultaneously readable.

5. An encoding method for encoding inputted image information, comprising:

storing in storage means state quantity information representing a predetermined state quantity to be used while being sequentially updated according to a processing status of the encoding process when performing a predetermined encoding process to the image information;

performing the encoding process to the image information for each of the processing units by using the state quantity information corresponding thereto with a predetermined plurality of pixels as a processing unit, wherein the state quantity information is stored in the storage means with the plurality of pixels corresponding to the processing unit of the image information as one word, and wherein the state quantity information necessary to perform the encoding process to the image information of the processing unit is read from the storage means in the units of the word.

6. The encoding method according to claim 5, wherein the number of the storage means are provided according to the number of the words of the state quantity information necessary to perform the encoding process to the image information of the processing unit, and the state quantity information equivalent to the number of the words is stored by being dispersed on the storage means so as to be simultaneously readable.

7. The encoding method according to claim 5, wherein the state quantity information is stored in the storage means by shifting the processing unit and a phase of the image information by a predetermined amount.

8. The encoding method according to claim 7, wherein the number of the storage means are provided according to the number of the words of the state quantity information necessary to perform the encoding process to the image information of the processing unit, and the state quantity information equivalent to the number of the words is stored by being dispersed on the storage means so as to be simultaneously readable.

9. A program embodied in a computer readable medium for causing a computer to perform a process comprising:
 a first step of, with a plurality of pixels corresponding to the processing unit of the image information as one word, storing in storage means state quantity information representing a predetermined state quantity to be used while being sequentially updated according to a processing status of a predetermined encoding process when performing the encoding process to the image information,
 a second step of, with a predetermined plurality of pixels as the processing unit, performing the encoding process to the image information for each of the processing units by reading the state quantity information corresponding thereto from the storage means in the units of the word and using the read information.

10. A decoding apparatus for decoding encoded image information comprised of inputted encoded image information, comprising:
 decoding means for, with a predetermined plurality of pixels as a processing unit, performing a predetermined decoding process to the encoded image information for each of the processing units;
 storage means for storing state quantity information representing a predetermined state quantity to be used while being sequentially updated according to a processing status of the decoding process when the decoding means performs the decoding process to the encoded image information, wherein
 the storage means stores the state quantity information with the plurality of pixels corresponding to the processing unit of the encoded image information as one word, and wherein
 the decoding means reads in the units of the word the state quantity information necessary to perform the decoding process to the encoded image information of the processing unit from the storage means.

11. The decoding apparatus according to claim 10, comprising the number of the storage means according to the number of the words of the state quantity information necessary when the decoding means performs the decoding process to the encoded image information of the processing unit, wherein the state quantity information equivalent to the number of the words is stored by being dispersed on the storage means so as to be simultaneously readable.

12. The decoding apparatus according to claim 10, wherein the storage means stores the state quantity information by shifting the processing unit and a phase of the encoded image information by a predetermined amount.

13. The decoding apparatus according to claim 12, comprising the number of the storage means according to the number of the words of the state quantity information necessary when the decoding means performs the decoding process to the encoded image information of the processing unit, wherein the state quantity information equivalent to the number of the words is stored by being dispersed on the storage means so as to be simultaneously readable.

14. A decoding method for decoding encoded image information that includes inputted encoded image information, comprising:
 storing in storage means state quantity information representing a predetermined state quantity to be used while being sequentially updated according to a processing status of the decoding process when performing a predetermined decoding process to the encoded image information;
 performing the decoding process to the encoded image information for each processing unit by using the state quantity information corresponding thereto with a predetermined plurality of pixels as a processing unit, wherein
 the state quantity information is stored in the storage means with the plurality of pixels corresponding to the processing unit of the encoded image information as one word, and wherein
 the state quantity information necessary to perform the decoding process to the encoded image information of the processing unit is read from the storage means in the units of the word.

15. The decoding method according to claim 14, wherein the number of the storage means are provided according to the number of the words of the state quantity information necessary to perform the decoding process to the encoded image information of the processing unit, and the state quantity information equivalent to the number of the words is stored by being dispersed on the storage means so as to be simultaneously readable.

16. The decoding method according to claim 14, wherein the state quantity information is stored in the storage means by shifting the processing unit and a phase of the encoded image information by a predetermined amount.

17. The decoding method according to claim 16, wherein the number of the storage means are provided according to the number of the words of the state quantity information necessary to perform the decoding process to the encoded image information of the processing unit, and the state quantity information equivalent to the number of the words is stored by being dispersed on the storage means so as to be simultaneously readable.

18. A program embodied in a computer readable medium for causing a computer to perform a process comprising:
 a first step of, with a plurality of pixels corresponding to the processing unit of the encoded image information as one word, storing in storage means state quantity information representing a predetermined state quantity to be used while being sequentially updated according to a processing status of a predetermined decoding process when performing a predetermined decoding process to the encoded image information in which image information is encoded,
 a second step of, with a predetermined plurality of pixels as a processing unit, performing the decoding process to the encoded image information for each processing unit by reading the state quantity information corresponding thereto from the storage means in the units of the word and using the read information.

* * * * *